(12) United States Patent
Takahashi et al.

(10) Patent No.: US 12,118,136 B2
(45) Date of Patent: Oct. 15, 2024

(54) AIR FLOATING VIDEO DISPLAY APPARATUS

(71) Applicant: Maxell, Ltd., Kyoto (JP)

(72) Inventors: Hiroaki Takahashi, Kyoto (JP); Koji Hirata, Kyoto (JP); Koji Fujita, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/265,266

(22) PCT Filed: Dec. 20, 2021

(86) PCT No.: PCT/JP2021/046981
§ 371 (c)(1),
(2) Date: Jun. 5, 2023

(87) PCT Pub. No.: WO2022/158209
PCT Pub. Date: Jul. 28, 2022

(65) Prior Publication Data
US 2024/0036634 A1 Feb. 1, 2024

(30) Foreign Application Priority Data
Jan. 25, 2021 (JP) ................. 2021-009640

(51) Int. Cl.
G06F 3/01 (2006.01)
G02F 1/13357 (2006.01)
(Continued)

(52) U.S. Cl.
CPC ........ *G06F 3/011* (2013.01); *G02F 1/133603* (2013.01); *G06F 3/0346* (2013.01); *H04N 13/346* (2018.05); *H04R 1/403* (2013.01)

(58) Field of Classification Search
CPC .. G06F 3/011; G06F 3/0346; G02F 1/133603; H04N 13/346; H04R 1/403
See application file for complete search history.

(56) References Cited

U.S. PATENT DOCUMENTS

2010/0110384 A1* 5/2010 Maekawa .............. G03B 35/18
353/10
2013/0120247 A1 5/2013 Imai et al.
(Continued)

FOREIGN PATENT DOCUMENTS

JP 2012-138040 A 7/2012
JP 5720684 B2 5/2015
(Continued)

OTHER PUBLICATIONS

International Search Report and Written Opinion mailed on Mar. 1, 2022, received for PCT Application PCT/JP2021/046981, filed on Dec. 20, 2021, 12 pages including English Translation.
(Continued)

*Primary Examiner* — Sahlu Okebato
(74) *Attorney, Agent, or Firm* — XSENSUS LLP

(57) ABSTRACT

A technique suitable when an air floating video is used as a non-contact user interface is provided. An air floating video display apparatus includes: a sensor for detecting a state of operation including a position of a hand finger of a user with respect to an air region including a plane of the air floating video or an object displayed on the plane; and a fingertip tactile sense generator which generates texture of a sense of touch on the hand finger by forming, based on information detected by the sensor, sound pressure based on an ultrasonic wave in vicinity of a position of the hand finger.

18 Claims, 28 Drawing Sheets

30 : SUPER-DIRECTIVE LOUDSPEAKER

(51) Int. Cl.
*G06F 3/0346* (2013.01)
*H04N 13/346* (2018.01)
*H04R 1/40* (2006.01)

(56) References Cited

U.S. PATENT DOCUMENTS

| | | | | |
|---|---|---|---|---|
| 2017/0227929 | A1* | 8/2017 | Suginohara | G02B 30/40 |
| 2018/0136730 | A1* | 5/2018 | Hayashi | G06F 3/165 |
| 2018/0335845 | A1* | 11/2018 | Matsunami | G06F 3/16 |
| 2019/0196213 | A1 | 6/2019 | Yamamoto et al. | |
| 2019/0227489 | A1 | 7/2019 | Tokuchi | |
| 2023/0221771 | A1* | 7/2023 | Castro | G06F 1/1626 |
| | | | | 700/275 |

FOREIGN PATENT DOCUMENTS

| | | |
|---|---|---|
| JP | 2017-131340 A | 8/2017 |
| JP | 2017-142370 A | 8/2017 |
| JP | 2018-195143 A | 12/2018 |
| JP | 2019-128722 A | 8/2019 |
| JP | 2019-133284 A | 8/2019 |
| JP | 2020-160874 A | 10/2020 |
| WO | 2008123500 A1 | 7/2010 |
| WO | 2018/043673 A1 | 3/2018 |

OTHER PUBLICATIONS

Japanese Office Action issued Jul. 2, 2024, in corresponding Japanese Patent Application No. 2021-009640, 6pp.

\* cited by examiner

30 : SUPER-DIRECTIVE LOUDSPEAKER

FIG. 7
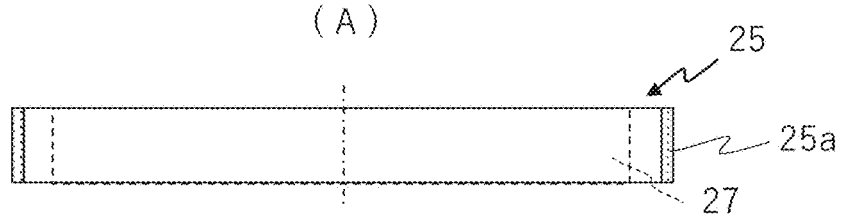
(A)
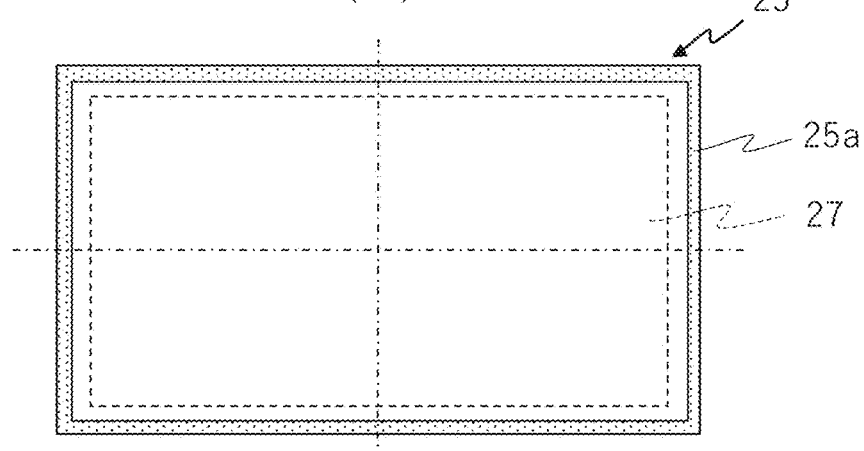
(B)
FIG. 8
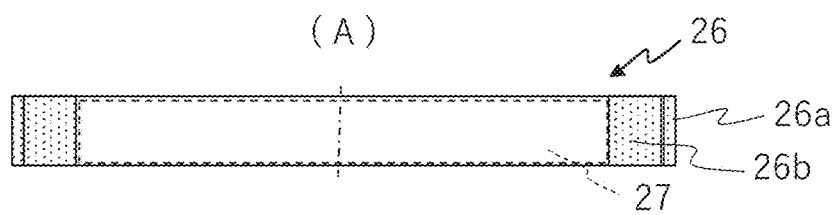
(A)
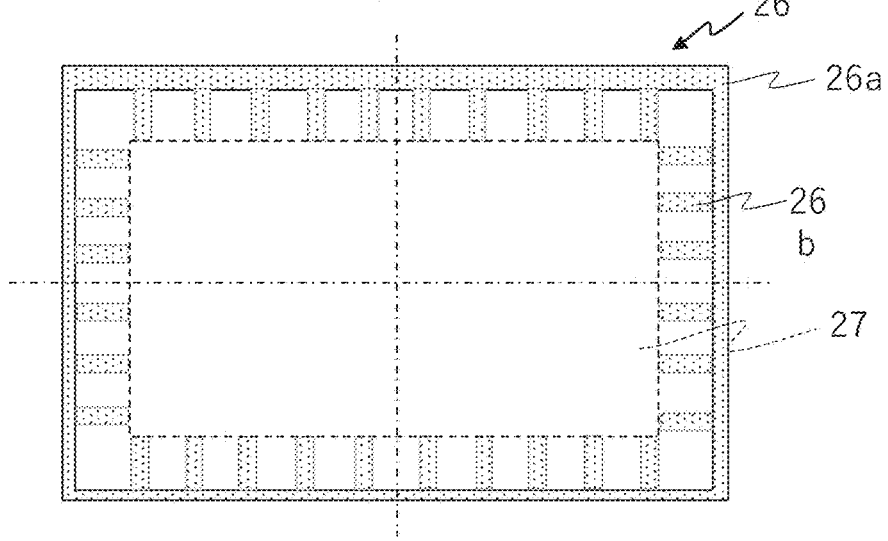
(B)

H: HORIZONTAL DIRECTION
V: VERTICAL DIRECTION

FIG. 37
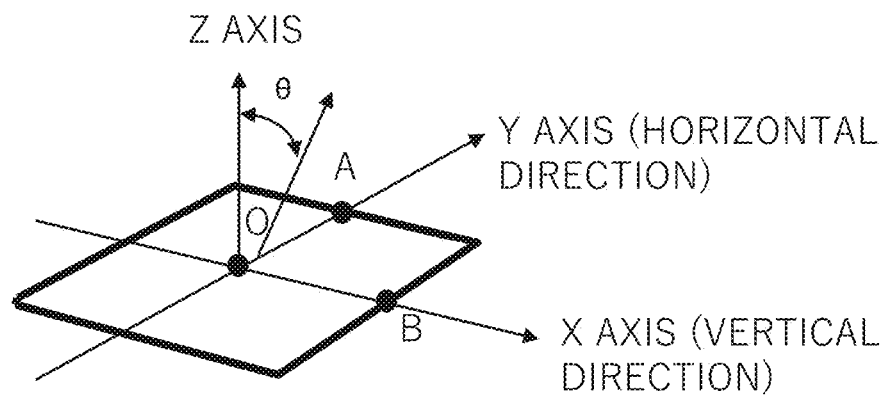
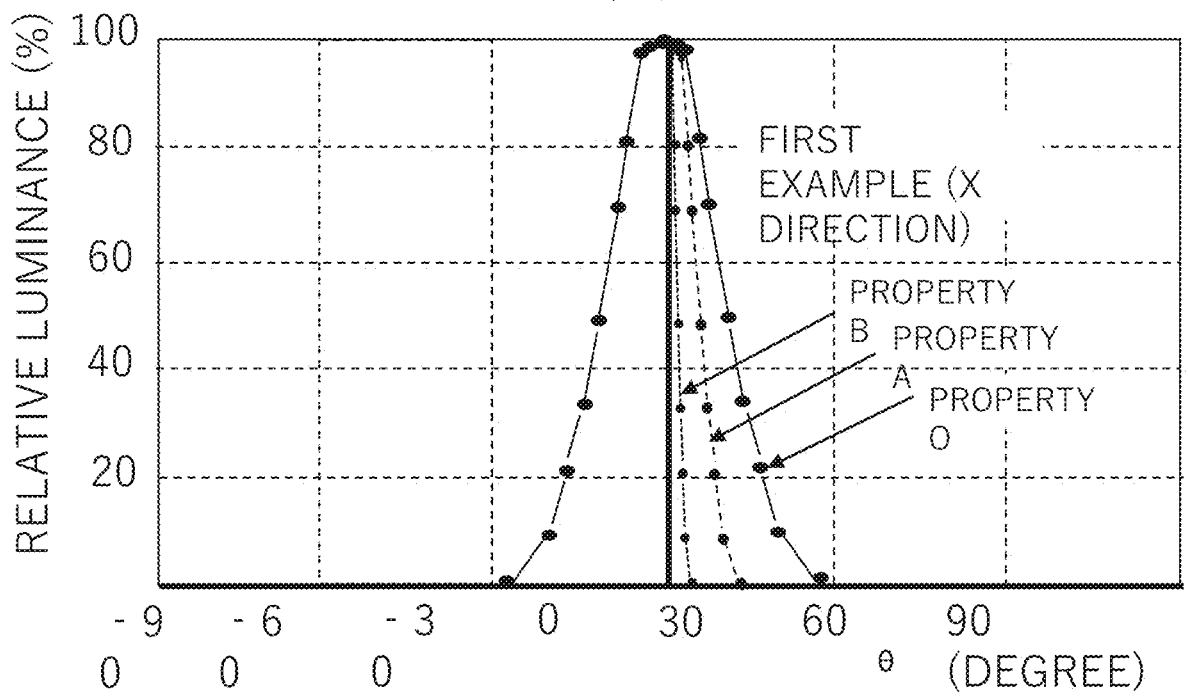

AIR FLOATING VIDEO DISPLAY APPARATUS

CROSS-REFERENCE TO RELATED APPLICATIONS

The present application is based on PCT filing PCT/JP2021/046981, filed Dec. 20, 2021, which claims priority to JP 2021-009640, filed Jan. 25, 2021, the entire contents of each are incorporated herein by reference.

TECHNICAL FIELD

The present invention relates to a technique for an air floating video display apparatus.

BACKGROUND ART

As air floating information display systems, a video display apparatus which displays an air floating video toward outside, a display method of displaying, as a user interface or man-machine interface, an air floating video enabling a user to perform input operation, and so forth have been already known. In contrast to a "contact user interface" such as a related-art liquid-crystal touch panel which requires a hand finger of the user to make contact with a physical display surface, this air floating video can be used as a "non-contact user interface".

As an example of related art, Japanese Patent Application Laid-open Publication No. 2019-128722 (Patent Document 1) discloses that a display operation apparatus which can reliably provide a feeling of operation to an operator who operates video of an operation target without actual substance displayed in air is provided.

RELATED ART DOCUMENT

Patent Document

Patent Document 1: Japanese Patent Application Laid-open Publication No. 2019-128722

SUMMARY OF THE INVENTION

Problems to be Solved by the Invention

In the example of related art, it is disclosed that, for a purpose of decreasing erroneous detection of operation on an image formed in the air, the purpose is achieved by acceptance of motion of a user as the operation when the user approaches an image from a predetermined direction.

The air floating video which is a video displayed by an air floating video display apparatus is displayed as floating in the air. The user can visually recognize this air floating video. However, "an image as material substance" is not present at an aerial position where this air floating video is displayed. In other words, at that position, there is no contactable surface or others as a subject other than the air.

Therefore, when the air floating video is used as the non-contact user interface, the user cannot get, for example, the exact touch texture (for example, touch feeling) of the "contact with the subject" as different from a push button (object configured as a GUI image) on a related-art touch panel screen. Thus, this tends to induce erroneous operation and erroneous input. For example, there is a possibility of occurrence of a case in which the touch operation is not detected even if the user has intended to touch the button or a case in which the touch operation is detected even if the user has not intended to touch the button.

An object of the present invention relates to a technique of air floating video display apparatuses, and is to provide a technique with better usability and higher visual recognition and operability for users and suitable for prevention and reduction in erroneous operation and erroneous input and so forth when a generated air floating video is used as a non-contact user interface.

Means for Solving the Problems

A typical embodiment of the present invention has the following structure. An air floating video display apparatus of an embodiment is an air floating video display apparatus configured to form an air floating video, and the apparatus includes: a display apparatus configured to display a video; and a retroreflector configured to retroreflect video light from the display apparatus, the apparatus forms the air floating video based on reflected light from the retroreflector, and the apparatus includes: a sensor for detecting an operation state including a position of a hand finger of a user with respect to a plane of the air floating video or an aerial region including an object displayed on the plane; and a tactile sense generator configured to provide a sense of touch to the hand finger by forming, based on information detected by the sensor, sound pressure based on an ultrasonic wave in vicinity of the position of the hand finger.

Effects of the Invention

The typical embodiment of the present invention regarding the technique of the air floating video display apparatuses provides a technique with better usability and higher visual recognition and operability for users and suitable for prevention and reduction in erroneous operation and erroneous input and so forth when a generated air floating video is used as a non-contact user interface. Problems, structures, effects, and so forth other than the above will be described in a chapter [Detailed Description of Preferred Embodiments].

BRIEF DESCRIPTIONS OF THE DRAWINGS

FIG. 7 shows a configurational example of a light-shielding member in the air floating video display apparatus according to one embodiment.

FIG. 8 shows another configurational example of the light-shielding member in the air floating video display apparatus according to one embodiment.

FIG. 37 is a descriptive diagram regarding diffuse property of the display apparatus in one embodiment.

DETAILED DESCRIPTION OF PREFERRED EMBODIMENTS

Figure 1:
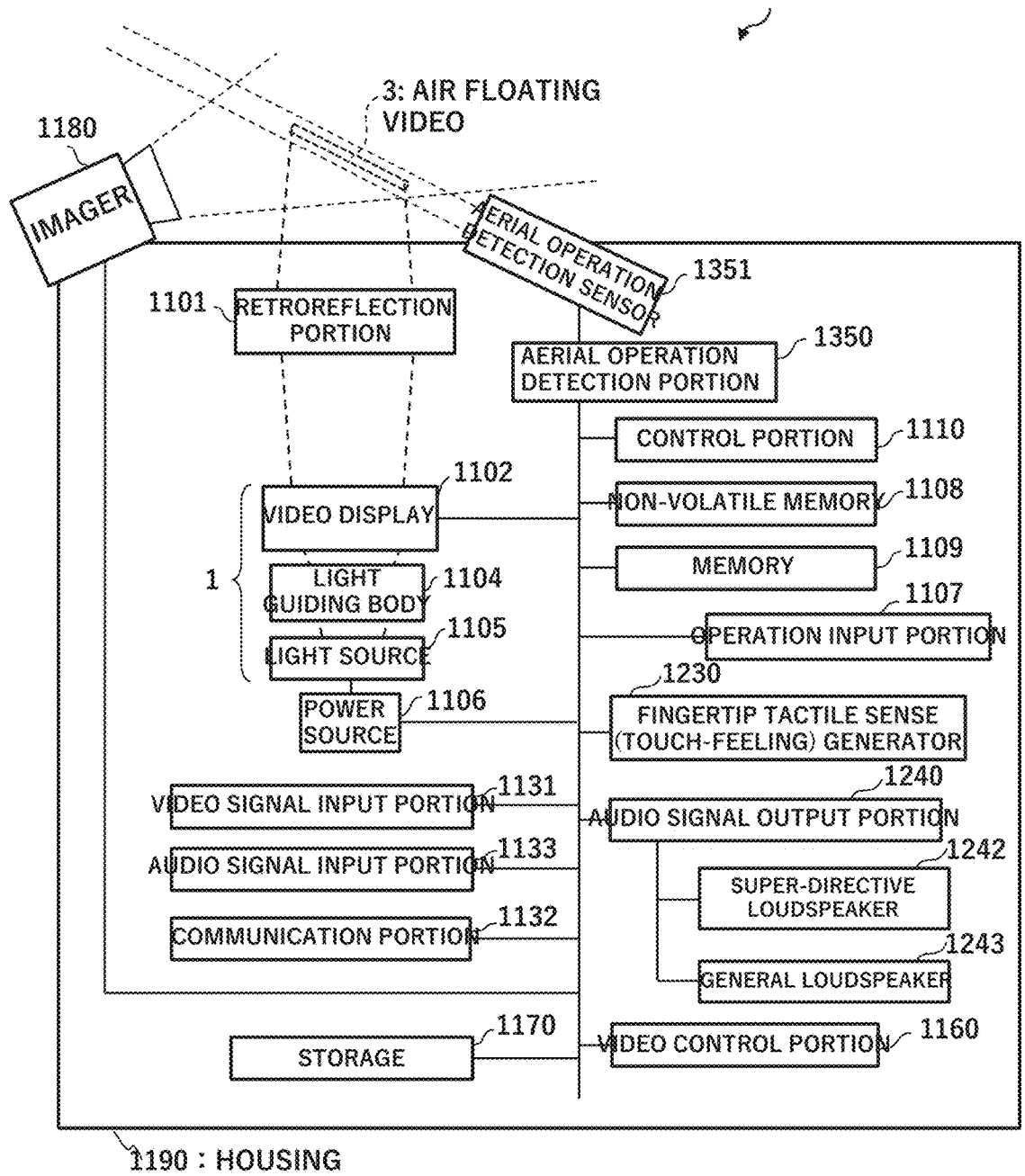
FIG. 1 shows an example of functional block structure of an air floating video display apparatus according to one embodiment of the present invention.

Hereinafter, embodiments of the present invention will be described in detail with reference to the accompanying drawings. The same components are denoted by the same reference signs throughout the drawings for describing the embodiment, and the repetitive description thereof will be omitted. In the drawings, for ease of understanding the invention, representation of each component may not represent its actual position, size, shape, range, and so forth, and the present invention is not limited to the structures disclosed in the drawings.

For description, when a process made by a program is described, the program, a function, a processor and so forth may be described as main subjects. However, main subjects regarding these as hardware are a processor or a controller, apparatus, computer, system, or the like configured of that processor and so forth. In the computer, a process following a program retrieved on a memory is executed by the processor while appropriately using resources such as the memory, a communication interface and so forth. With this, a predetermined function, processor, and so forth are implemented. The processor is configured of a semiconductor device such as a CPU, GPU, or the like, and so forth. The processor is configured of a device or circuit enabling predetermined computation. The process is not limited to software program process, and can be implemented also on a dedicated circuit. As the dedicated circuit, an FPGA, ASIC, CPLD, or the like can be applied.

The program may be installed as data in a target computer in advance or may be installed as being distributed as data from a program source to the target computer. The program source may be a program distribution server on a communication network, or a non-transient computer-readable storage medium. The program may be configured of a plurality of program modules. The computer system may be configured of a plurality of computers. The program may be configured of a plurality of program modules. The computer system may be configured of a client server system or a cloud computing system.

<Related-Art Example>

Figure 4:
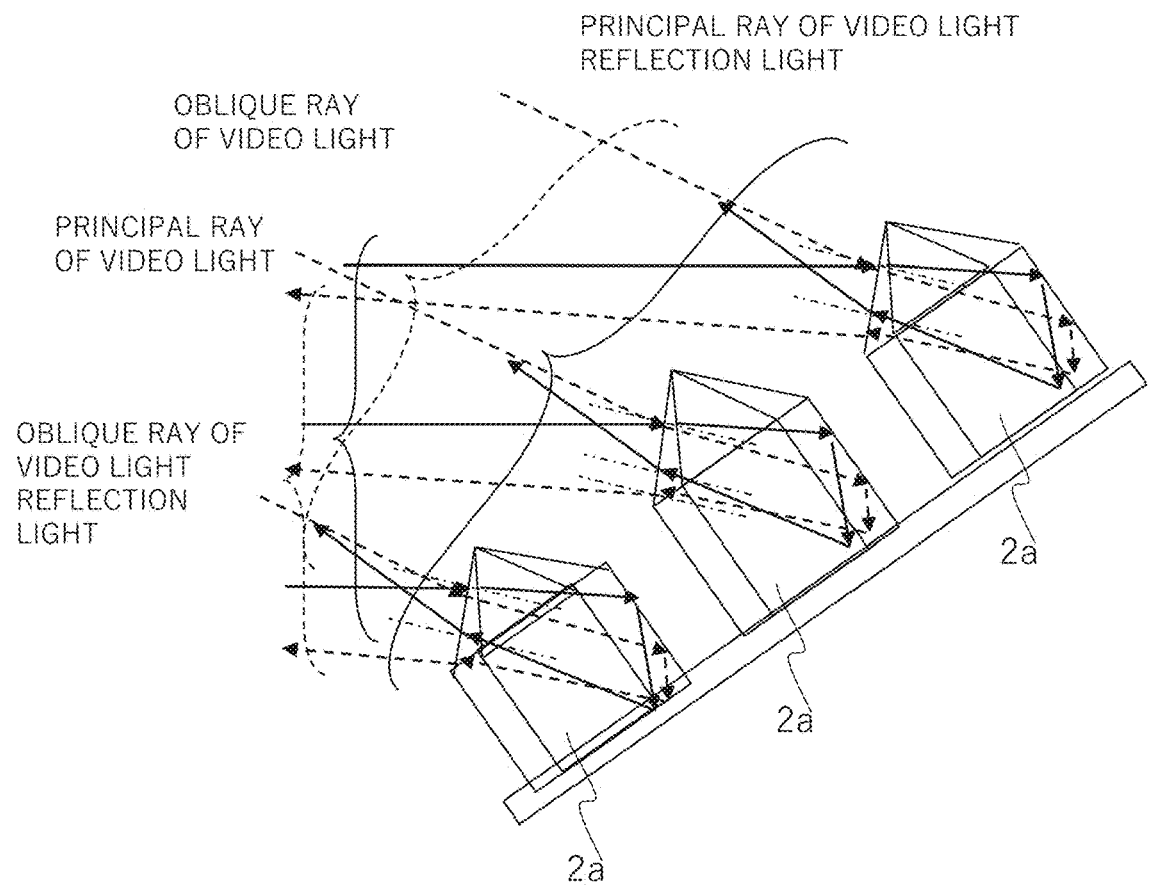
FIG. 4 shows an example of incidence and reflection of light beams to/from the retroreflector.
Figure 5:
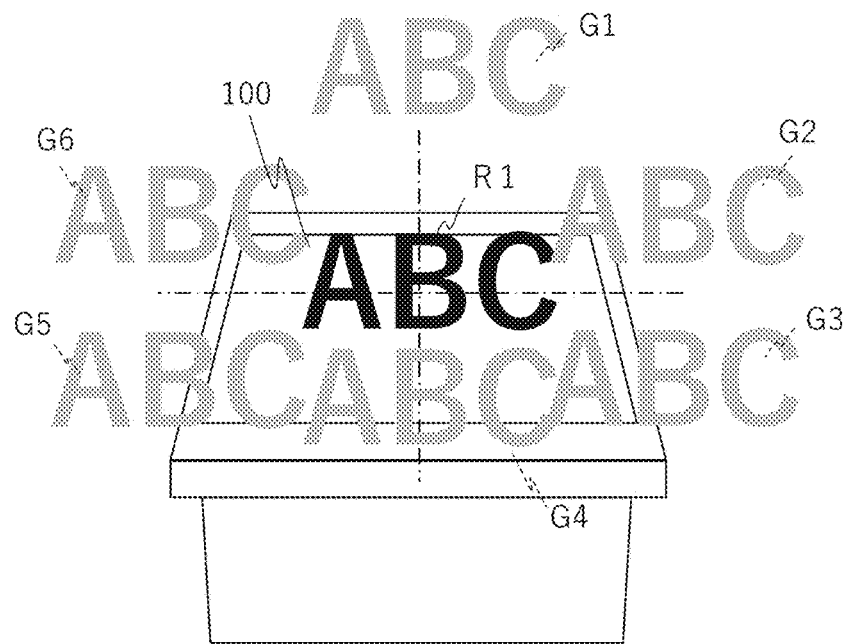
FIG. 5 is a schematic descriptive diagram illustrating a regular image and ghost images in the air floating video display apparatus.

As an air floating video display apparatus of a related-art example, combination of a retroreflector with a video display apparatus such as an organic EL panel or liquid-crystal panel as a high-resolution color display image source is exemplified in a structure. In the air floating video display apparatus of the related-art example, video light is diffused with a wide angle. Also, in the air floating video display apparatus of the related-art example, each retroreflection portion 2a configuring a retroreflector 2 has a hexahedron shape, as shown also in FIG. 3 and FIG. 4. Thus, in the air floating video display apparatus of the related-art example, by not only normally-reflected reflected light but also video light incident obliquely to the retroreflector 2 (plurality of retroreflection portions 2a) as shown in FIG. 4, not only a regular image R1 as a regular air floating video 3 but also a plurality of ghost images from a first ghost image G1 to a sixth ghost image G6 as ghost images are generated as shown in FIG. 5. This impairs the image quality of the air floating video.

FIG. 5 shows an example of how the air floating video is viewed when it is visually recognized from a regular visual point (eyepoint at a standard correct position) of a user. In the related-art example, the ghost images G1 to G6 are generated. In the embodiments, these ghost images are prevented, and only the regular image R1 is obtained. The generation of ghost images is not only bothersome for the user, but also causes a possibility that the ghost images having the same contents as those of the air floating video are undesirably viewed by a person other than the original user (for example, different person in the vicinity of the user), and this poses a big problem.

Moreover, in a non-contact user interface based on the air floating video in the air floating video display apparatus of the related-art example, a unique problem that is occurrence of erroneous input is revealed, the erroneous input being caused by the adoption and operation of an object different from an object (for example, a push button) which the user has intended to adopt and operate, due to shift between the air floating video and the eye line of the user. In apparatuses and systems to which the non-contact user interface based on the air floating video is applied, the related-art example can induce this erroneous input not intended by the user as described above. For example, when this is applied to an ATM apparatus at a bank, there is a possibility of causing a big error such as an error in input of an amount of money. Also, when the user is a person with relatively poor eyesight such as a senior, there is a risk of high frequency of occurrence of the erroneous input as described above. Erroneous input and erroneous operation as described above become a big problem also in the viewpoint of popularization and employment of the air floating video display apparatus to various use purposes in the future.

On the other hand, the air floating video display apparatus of the embodiments has a structure of improving the visual recognition by eliminating the ghost images, which significantly reduce visual recognition of the air floating video on the air floating video display apparatus of the related-art example, and enhancing the brightness of the air floating video. Moreover, the air floating video display apparatus of the embodiments has a function of generating a physical feeling of contact (such as touch feeling) on a fingertip of a user who performs operation such as a touch on a plane of the air floating video with the fingertip, at a location where the air floating video is displayed in air of outside location. For example, the air floating video is used as a non-contact user interface of a type in which at least one button is touched. In that case, when the user touches that button with the fingertip, in the air floating video display apparatus, a sense as if the user has touched a physical button is generated and provided as a touch feeling to the fingertip by this function.

Furthermore, the air floating video display apparatus of the embodiments has a function of producing audio (for example, audio representing a numerical character or the like written on the button) corresponding to a location touched by the fingertip (for example, touched button) from the vicinity of the location when the user performs touch operation on a plane of the air floating video.

In the air floating video display apparatus according to one embodiment described below, a case of usage of the generated air floating video as a non-contact user interface including an object such as a push button is exemplified and described. Note that this object is an element or component configuring the air floating video and a graphical user interface (GUI), and is a video/image that does not have physical material substance other than air but can be visually recognized.

<Air Floating Video Display Apparatus>

FIG. 1 shows an example of functional block structure of an air floating video display apparatus according to one embodiment. An air floating video display apparatus 1000 of FIG. 1 includes a retroreflection portion 1101, a video display 1102, a light guiding body 1104, a light source 1105, a power supply 1106, an operation input portion 1107, a non-volatile memory 1108, a memory 1109, a control portion 1110, a video signal input portion 1131, an audio signal input portion 1133, a communication portion 1132, an aerial operation detection sensor 1351, an aerial operation detector 1350, a fingertip tactile sense generation portion (in other words, a touch-feeling generator) 1230, an audio signal output portion 1240, a super-directive loudspeaker 1242, a normal loudspeaker 1243, a video control portion 1160, a storage 1170, an imager 1180, and so forth. These components are mutually connected via buses and so forth. Each main component of the air floating video display apparatus 1000 is housed in a housing 1190. The imager 1180 and the aerial operation detection sensor 1351 may be provided as a part of the housing 1190 or outside the housing 1190.

Figure 2:
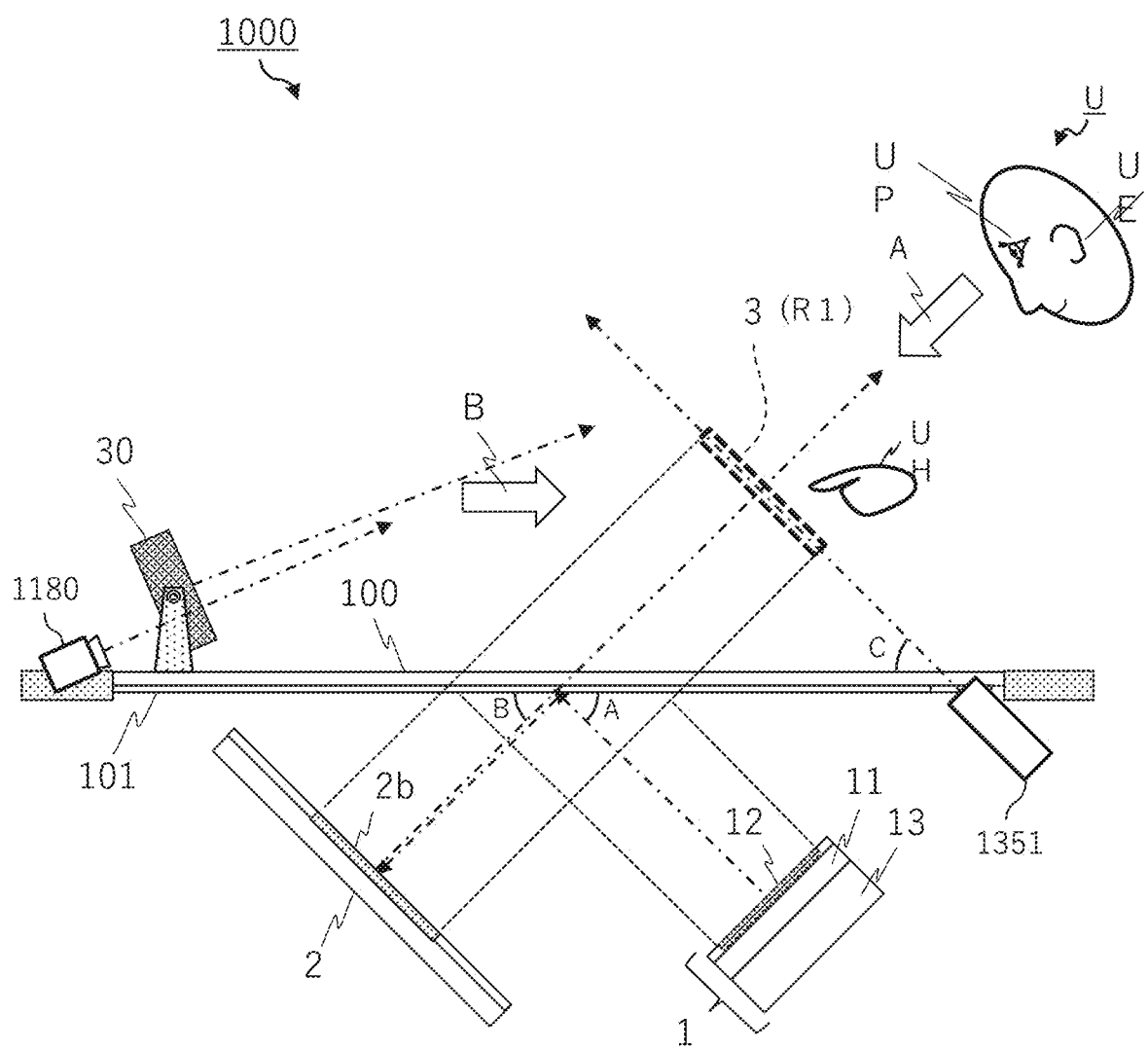
FIG. 2 shows an example of a principal-part configuration of the air floating video display apparatus according to one embodiment.

The retroreflection portion 1101 of FIG. 1 corresponds to the retroreflector 2 of FIG. 2. The retroreflection portion 1101 retroreflects light modulated by the video display 1102. The air floating video 3 is formed by light emitted to the outside of the air floating video display apparatus 1000 among reflected light from the retroreflection portion 1101. The video display 1102 of FIG. 1 corresponds to a liquid-crystal display panel 11 of FIG. 2, which is equivalent to a color display video source. The light source 1105 of FIG. 1 corresponds to a light source 13 of FIG. 2. And, the video display 1102, the light guiding body 1104, and the light source 1105 of FIG. 1 correspond to a display apparatus 1 (video display apparatus) of FIG. 2.

The video display 1102 is a display portion which generates a video by modulating transmitted light, based on a video signal input in accordance with control made by the video control portion 1160. As the video display 1102, for example, a transmission-type liquid-crystal panel is used. Also, as the video display 1102, for example, a reflection-type liquid-crystal panel, a DMD (Digital Micromirror Device: registered trademark) panel, or the like using a scheme of modulating the reflected light may be used. The light source 1105 generates light for the video display 1102, and is a solid light source such as an LED light source, a laser light source, or the like. The power supply 1106 converts externally-input AC current to DC current to supply electric power to the light source 1105. Also, the power supply 1106 supplies respective DC currents necessary for the respective portions inside the air floating video display apparatus 1000.

The light guiding body 1104 guides light generated at the light source 1105 to irradiate the video display 1102. A combination of the light guiding body 1104 and the light source 1105 can be also called a backlight of the video display 1102. Various types of the combination of the light guiding body 1104 and the light source 1105 can be thought. Specific examples of structure of the combination of the light guiding body 1104 and the light source 1105 will be described later.

The aerial operation detection sensor 1351 is a sensor for detecting operation on the air floating video 3 operated with a hand finger UH of a user U of FIG. 2. The aerial operation detection sensor 1351 performs sensing of a range, for example, overlapping the entire display range of the air floating video 3. Note that the aerial operation detection sensor 1351 may perform sensing of only a range overlapping at least part of the display range of the air floating video 3. A specific example of the aerial operation detection sensor 1351 is a distance sensor using non-visible light such as infrared light, non-visible light laser, ultrasonic waves, or the like. Also, the aerial operation detection sensor 1351 may be configured of a plurality of combinations of a plurality of sensors so as to detect position coordinates on a two-dimensional plane corresponding to a principal plane of the air floating video 3. Also, the aerial operation detection sensor 1351 may be configured of a LiDAR (Light Detection and Ranging) of a ToF (Time Of Flight) scheme or an image sensor (in other words, camera). In the aerial operation detection sensor 1351, it is only necessary to perform sensing for detecting the operation such as touch operation on an object displayed as the air floating video 3 operated with the hand finger UH of the user U. To this sensing, any existing technique can be applied.

The aerial operation detector 1350 acquires a sensing signal (in other words, detection information) from the aerial operation detection sensor 1351, and, for example, determines a state including the presence or absence of the touch on the object of the air floating video 3 operated with the hand finger UH of the user U or calculates a position at which the fingertip and the object make contact with each other, based on the sensing signal. The aerial operation detector 1350 may be configured of a circuit such as an FPGA. Also, part of the functions of the aerial operation detector 1350 may be implemented by, for example, software using a program for the aerial operation detection executed on a processor of the control portion 1110.

The aerial operation detection sensor 1351 and the aerial operation detector 1350 may be configured to be embedded in the air floating video display apparatus 1000, but may be externally provided as separated from the air floating video display apparatus 1000. When they are provided as separate, the aerial operation detection sensor 1351 and the aerial operation detector 1350 are configured so as to be able to transmit information and signals to the air floating video display apparatus 1000 (such as a controller described later) via a wired or wireless communication connection path or signal transmission path. When the aerial operation detection sensor 1351 and the aerial operation detector 1350 are provided as separate, it is possible to architect a system in which only the aerial operation detection function can be optionally added to an air floating video display apparatus as a main body without the aerial operation detection function. Alternatively, only the aerial operation detection sensor 1351 may be provided as separate while the aerial operation detector 1350 may be embedded in the air floating video display apparatus. For example, when it is more desirable to freely arrange the aerial operation detection sensor 1351 from the installation position of the air floating video display apparatus, the structure in which only the aerial operation detection sensor 1351 is as separate is advantageous.

Each component such as the aerial operation detection sensor 1351, the imager 1180 (in particular, camera) and a super-directive loudspeaker and an ultrasonic element array described later is basically configured to be arranged at a previously-designed fixed position or direction. However, the position or direction may be configured to be variably adjustable by the user.

The imager 1180 is configured of, for example, a camera having an image sensor, and captures a video of a space in the vicinity of the air floating video 3 and/or the body (at least part of the head, face, eyes, arms, hand finger, and so forth) of the user U who is operating the air floating video 3. A plurality of imagers 1180 may be provided. For example, the imager 1180 may be configured as a stereo camera with two or more cameras. The imager 1180 may be an imager with a depth sensor. Also, by using the aerial operation detection sensor 1351 and the aerial operation detector 1350, the imager 1180 may assist the detection of operation on the air floating video 3 operated by the user U. In particular, by using the plurality of imagers 1180 or the imager with the depth sensor, it is possible to assist the detection process of the aerial operation detector 1350 so that the process becomes more facilitated.

For example, while targeting a plane (also denoted as a penetration detection plane) including a display plane of the air floating video 3, the aerial operation detection sensor 1351 is configured to be a substance penetration sensor which detects the presence or absence of penetration of a substance into this penetration detection plane, a contact detection sensor which detects the presence or absence of contact of the hand finger UH on the plane of the air floating video 3, or the like. In this case, it may be difficult or impossible for only the aerial operation detection sensor 1351 to detect information about how far from the penetration detection plane the substance (for example, the hand finger UH) not penetrating into the penetration detection plane is or how close to the penetration detection plane the substance is. In this case, by using depth calculation information of the substance based on the video captured by the camera of the above-described imager 1180, depth information of the substance sensed by the depth sensor, and so forth, it is possible to calculate a distance between the substance and the penetration detection plane or calculate it more accurately. And, various types of information including this distance sensed or calculated by various sensor devices can be effectively used for various display controls on the air floating video 3 and so forth.

Also, in a modification example, the aerial operation detector 1350 may be configured not to use the aerial operation detection sensor 1351 and to detect the operation on the air floating video 3 operated by the user U, based on the video captured by the imager 1180. From a different viewpoint, the position of the aerial operation detection sensor 1351 may be not a position on a side closer to the air floating video 3 and the user U as shown in FIG. 2 (position on a line extended from the plane of the air floating video 3) but may be a position on an opposite side to the air floating video 3 and the user U as shown in the position of the imager 1180 (position at which the two-dimensional plane of the air floating video 3 can be captured).

Also, an image of the face of the user U who is operating the air floating video 3 may be captured by the imager 1180, and the control portion 1110 may perform process of identifying the user U based on the captured video (for example, user authentication based on face recognition). Alternatively, such a function as a human detecting sensor may be simply implemented by the imager 1180. Also, there is a possibility that different person who is standing around or behind the authorized user U who is operating the air floating video 3 as facing straight to the air floating video 3 takes a peek at the contents of the air floating video 3 or the operation of the user U on the air floating video 3. When confidentiality of the contents of or the operation on the air floating video 3 is desired to be secured, that peek should be prevented. Thus, in order to determine whether different person takes such a peek, a structure for determining whether the presence or absence of the peek of different person or the like may be achieved by causing the imager 1180 to capture an image of a range including the user U who is operating the air floating video 3 and its peripheral region.

The operation input portion 1107 is, for example, an operation button or a remote controller light-receiver which receives an input of a signal about operation different from the aerial operation on the air floating video 3 operated by the user U. The operation input portion 1107 may be used by a person such as an administrator different from the user U who is operating the air floating video 3 to operate the air floating video display apparatus 1000.

The video signal input portion 1131 receives an input of video data from a connected external video output apparatus. The audio signal input portion 1133 receives input of audio data from a connected external audio output apparatus. On the other hand, the audio signal output portion 1240 can output an audio signal based on the audio data input to the audio signal input portion 1133. Also, the audio signal output portion 1240 may output audio signal based on data recorded on the storage 1170 in advance or data stored in the non-volatile memory 1108. For example, audio data about a numerical character, character string, and so forth, and audio data such as other operation sound and error alert sound are exemplified. The audio data includes data for generation of an audio signal associated with the air floating video 3 and an object. An example of the operation sounds is a sound (such as "pop (pong)") output when, for example, touch operation is performed on an object such as a push button in the air floating video 3.

The audio signal output portion 1240 may be connected to a loudspeaker (normal loudspeaker 1243 in FIG. 1) which outputs audio of a normal audible band. For audio with its confidentiality not required to be secured, the normal loudspeaker 1243 may be used. Also, the audio signal output portion 1240 may be connected to a super-directive loudspeaker 1242 in FIG. 1. When the air floating video display apparatus 1000 is applied to a system such as an ATM apparatus at bank in which security and so forth is required to be taken into consideration, the use of the super-directive loudspeaker 1242 is effective to prevent different person other than the user U from hearing the audio. The super-directive loudspeaker 1242 of FIG. 1 corresponds to a super-directive loudspeaker 30 in FIG. 2.

The super-directive loudspeaker 1242 is configured of an array in which a plurality of ultrasonic output elements capable of producing an ultrasonic signal of, for example, about 40 kHz, are aligned on a plane. In this case, in general, the larger the number of ultrasonic output elements for use is, the larger the sound volume of the audio provided by the super-directive loudspeaker is.

The super-directive loudspeaker is a loudspeaker which outputs super-directive audio so that only a person (corresponding ears) who is present in a specific limited space region can hear the audio of the audible band. In other words, the super-directive loudspeaker has a property not allowing a person (corresponding ears) who is outside the specific limited space region to hear the audio. The principles of the super-directive loudspeaker are briefly described. As well known, ultrasonic wave has higher rectilinear propagation than that of the audio of the audible band (such as talking voice of a person). Therefore, it is possible to make the audio audible only in the specific limited space region by, based on the audio signal of the audible band, modulating (for example, preforming amplitude modulation to) the above-described ultrasonic signal of 40 kHz taken as a carrier.

For example, by using the imager 1180 (for example, a plurality of cameras), the air floating video display apparatus 1000 identifies a position of the face, the eyes, the ears, or so forth of the user U in the space. Then, in response to the result of identification, the air floating video display apparatus 1000 can perform control so that the audio output from the super-directive loudspeaker 1243 is audible only in a specific region in vicinity of the ears of the user U. Specifically, the air floating video display apparatus 1000 controls a phase (in other words, delay time) of each ultrasonic signal input to each ultrasonic output element configuring the super-directive loudspeaker 1243. This manner makes the audio audible only in the specific limited space region.

Also, even when a structure in which the plurality of ultrasonic output elements are arranged on not a plane but, for example, a concave curved surface is used as the structure of the super-directive loudspeaker 1242, the audio can be made audible only in the above-described specific limited space region. The super-directive loudspeaker 1242 may be configured as part of the housing 1190 or may be configured as separate from the housing 1190. A specific example will be described later.

The fingertip tactile sense generation portion 1230 is a portion having a function of generating and providing a sense of touch to the fingertip at the time of operation on the air floating video 3 operated with the hand finger UH including the fingertip of the user U. When the touch operation on an object displayed as the air floating video 3 operated with the fingertip of the user U is detected, the fingertip tactile sense generation portion 1230 generates and provides a texture as a touch feeling as if any substance other than air is present somehow on the fingertip. The fingertip tactile sense generation portion 1230 is configured of, for example, an ultrasonic element array with a plurality of ultrasonic output elements aligned on a plane. A working example of the fingertip tactile sense generation portion 1230 will be described later.

The fingertip tactile sense generation portion 1230 uses information about a touch position on the object of the air floating video 3 touched with the fingertip of the user U and detected by the aerial operation detection sensor 1351 and the aerial operation detector 1350. The fingertip tactile sense generation portion 1230 has a function capable of emitting an ultrasonic wave with sound pressure of a predetermined strength from the ultrasonic element array toward that touch position. This ultrasonic wave has very strong directionality. When this ultrasonic wave is applied to the fingertip of the user U, the user U can acquire the texture as the touch feeling as if the user is actually touching any substance somehow. As a result, even if the user U performs the touch operation as the aerial operation onto the object which is not actually present other than air but is apparently the push button or the like displayed as the air floating video 3, the user can acquire the texture as if the user is touching the physical button with his/her own fingertip. That is, the user U can more reliably feel that the user is performing the touch operation.

Furthermore, in one embodiment, the fingertip tactile sense generation portion 1230 has a function of modulating an ultrasonic signal with the audio signal of the audible band, in other words, superposing audio on an ultrasonic wave. With this, when the ultrasonic signal is modulated with the audio signal, the audio based on the audio signal is emitted from the vicinity of the fingertip with which the user U is touching the object. This audio is directed omnidirectionally. With the touch operation, the user U can hear this audio. Thus, the user U can not only acquire the touch feeling at the fingertip but also more reliably recognize the touch operation performed by himself/herself because of the audio emitted from the vicinity of the fingertip.

The fingertip tactile sense generation portion 1230 may be configured as part of the housing 1190, or may be configured as an apparatus having a housing different from the housing 1190. The fingertip tactile sense generation portion 1230 may be arranged at a predetermined position outside the housing 1190, or may be configured so that its position or direction is variably adjustable. The fingertip tactile sense generation portion 1230 of FIG. 1 corresponds to a fingertip tactile sense generator 6 of FIG. 17 described later.

The non-volatile memory 1108 stores and retains various types of data for use in the air floating video display apparatus 1000. The data stored in the non-volatile memory 1108 includes, for example, video/image data for displaying the air floating video 3. This data includes data for configuring objects (such as characters, buttons, and icons) to be displayed as at least part of the air floating video 3. This data may include data for various operations, object layout information, object meta data, control information, related information, and so forth. In the memory 1109, video data to be displayed as the air floating video 3, data for control of the air floating video display apparatus 1000, and so forth are stored. Note that the video/image may be a still image or a moving image.

The control portion 1110 is equivalent to a controller of the air floating video display apparatus 1000, and controls operation of each connected portion. The control portion 1110 includes a processor, and performs arithmetic process and so forth based on information acquired from each portion in the air floating video display apparatus 1000 in cooperation with a program stored in the memory 1109.

The communication portion 1132 performs communication with an external apparatus, server, and so forth via a wired or wireless communication interface. By communication via the communication portion 1132, various types of data such as the video/image data and the audio data are transmitted and received. The air floating video display apparatus 1000 may acquire an instruction, video data, and so forth from outside via the communication portion 1132, and may output and store information about the operation result operated by the user to outside.

The storage 1170 is a storage apparatus which records various types of data and information such as the video/image data and the audio data. The storage 1170 may retain data similar to that in the non-volatile memory 1108. In the storage 1170, for example, various types of data and information such as the video/image data and the audio data may be recorded in advance at the time of product shipping. In the storage 1170, various types of data and information such as the video/image data and the audio data acquired from an external apparatus, server, and so forth via the communication portion 1132 may be recorded. The audio data recorded in the storage 1170 can be output as the audio via, for example, the audio signal output portion 1140.

A predetermined association is made between the video/image data and the audio data. For example, an object of certain push button is an object where a character such as "A", "1", "Yes", "No", and "Redo" is displayed, and the video data associated with the object has character information and display control information of that character or has a character image of that character. And, the audio data associated with the video data of that object has audio data used when that character is emitted as the audio in response to the predetermined operation on that object. Also, another object is an object where no character is displayed, but even in this case, the audio data of the audio emitted in response to the predetermined operation on that object can be associated.

The video control portion 1160 performs various controls regarding a video signal to be input to the video display 1102. For example, the video control portion 1160 generates a video signal, switches the video signal, and so forth. For example, the video control portion 1160 performs control to switch for an input source which is selected from the memory 1109, the storage 1170, the video signal input portion 1131, the communication portion 1132, and so forth as a source of the video signal to be input to the video display 1102. Also, for example, the video control portion 1160 can perform control to generate a superposed video signal by superposing a video signal on the memory 1109 and a video signal input from the video signal input portion 1131 and to input that superposed video signal to the video display 1102. With this, a synthesized video based on the superposed video signal can be formed as the air floating video 3.

Also, the video control portion 1160 may perform control to perform video processing on video signals of the respective sources. Examples of video processing include scaling processing of performing image expansion, shrinkage, deformation, and so forth, brightness adjustment processing of changing luminance, contrast adjusting processing of changing an image contrast curve, and Retinex processing of decomposing the image into optical components and changing weighting for each component. Also, on the video signal to be input to the video display 1102, the video control portion 1160 may perform special effect video processing for assisting the aerial operation such as the touch operation on the air floating video 3 operated by the user U.

The special effect video processing is performed based on, for example, the result of detection of touch operation detected by the aerial operation detector 1350 or the captured image of the user U captured by the imager 1180. Examples of special effect videos include an animation in which the button is sinking in a depth direction as emphatically representing that touch operation and an animation in which ripples occur around the button on the plane of the air floating video 3 when the touch operation is applied to the object of the push button.

The air floating video display apparatus 1000 (in particular, video control portion 1160) creates data (in other words, video signal) for display of the air floating video 3 based on the video/image data in the memory 1109, the storage 1170, and so forth, and inputs the data to the video display 1102 of the video display apparatus 1. Then, video light generated and emitted from the video display 1102 is reflected via the retroreflection portion 1101, and is emitted as video light having high directionality toward outside the air floating video display apparatus 1000. With this, the air floating video 3 is output and formed at an external predetermined position. As shown in FIG. 2, the authorized user U facing straight to this air floating video 3 can suitably look at the air floating video 3 in a direction as indicated by an arrow A from an eyepoint UP (in other words, eye) corresponding to a predetermined standard position in the space.

As described above, various functions are mounted on the air floating video display apparatus 1000. However, the air floating video display apparatus 1000 is not required to have all of these functions but only required to have at least a function of forming the air floating video 3, and can be of various modes.

First Example of Air Floating Video Display Apparatus

FIG. 2 shows an example of a principal-part configuration of the air floating video display apparatus 1000 and a configurational example of the retroreflection portion 1101 according to one embodiment. FIG. 2 shows a structure viewed from side of a direction in which the air floating video display apparatus 1000 and the authorized user U faces each other in the space. As shown in FIG. 2, a display apparatus 1 (video display apparatus) diffusing the video light of the specific polarized wave at a narrow angle is arranged in an oblique direction of a transparent member 100 arranged on the horizontal plane (that is a direction having an angle A from the horizontal plane). The display apparatus 1 includes a liquid crystal display panel 11 and a light source 13 generating the light of the specific polarized wave having the narrow-angle diffuse property.

The video light of the specific polarized wave emitted from the display apparatus 1 is reflected by a polarization splitter 101 having a film that is arranged on the transparent member 100 (such as glass) and selectively reflects the video light of the specific polarized wave, and enters the retroreflector 2. A retroreflector 2 is arranged in the other oblique direction of the transparent member 100 (that is a direction having an angle "B" from the horizontal plane). In the drawing, a sheet-shaped polarization splitter 101 is adhered as the polarization splitter 101 to a back surface side of the transparent member 100 (a lower surface side in a vertical direction).

As a waveplate, a λ/4 waveplate 2b is arranged on a video-light entering surface of the retroreflector 2. The video light is transmitted through the λ/4 waveplate plate 2b twice that is the entering and the emission to/from the retroreflector 2. In this manner, the video light is converted in terms of light polarization from the specific polarized wave (in other words, one polarized wave) to another polarized wave. In this case, the polarization splitter 101 that selectively reflects the video light of the specific polarized wave has a property that transmits the polarized light of another polarized wave that has been converted in terms of light polarization. Therefore, the video light of the specific polarized wave that has been converted in terms of light polarization is transmitted toward outside the polarization splitter 101 in the oblique direction corresponding to the angle B. The video light transmitted through the polarization splitter 101 forms the air floating video 3 that is the actual image, at a predetermined position outside the transparent member 100. As shown in the drawing, the air floating video 3 in this example is arranged at a position in vicinity of the transparent member 100. A main plane of the air floating video 3 also corresponds to a range enabling the touch operation.

Note that the light forming the air floating video 3 is aggregation of light rays converging from the retroreflector 2 to an optical image of the air floating video 3. These light rays propagate straight even after penetrating the optical image of the air floating video 3. Therefore, the air floating video 3 is different from the diffused video light formed on a screen by a general projector, and is a video having high directionality. Therefore, in the configuration of FIG. 2, the air floating video 3 is visually recognized as a bright video when being visually recognized by the user U (the corresponding eyepoint UP) in a direction of the arrow A corresponding to a direction of the video light having the high directionality. On the other hand, the air floating video 3 cannot be visually recognized as a video at all when being visually recognized by a different person in a direction different from the direction of the arrow A such as a direction of an arrow B (that is a horizontal direction in which the air floating video 3 is viewed from a backside). This property is very preferable when being applied to a system displaying a video that needs high security or displaying a video having high confidentiality that needs to be confidential to a person who faces the user.

Note that light polarization axes of the video light after the reflection are sometimes not equalized depending on a performance of the retroreflector 2. In this case, a part of the video light having the unequal light polarization axes is reflected by the polarization splitter 101, and returns to the display apparatus 1. This light is reflected again by a video display surface of the liquid crystal display panel 11 configuring the display apparatus 1, and, as a result, forms the ghost image (FIG. 5), and therefore, may be a cause of reduction of the image quality of the air floating video 3. Accordingly, in the present embodiment, the video display surface of the video display apparatus 1 is provided with an absorption-type light polarizer 12. The video light emitted from the video display apparatus 1 is transmitted through the absorption-type light polarizer 12, and the reflection light returning from the polarization splitter 101 is absorbed by the absorption-type light polarizer 12. Therefore, the retroreflection can be suppressed, and, as a result, the reduction of the image quality of the air floating video due to the ghost image can be prevented. The polarization splitter 101 may be made of, for example, a reflection-type light polarizer or a metal multilayer film that reflects the specific polarized wave.

In the present embodiment, a super-directive loudspeaker 30 (corresponding to the super-directive loudspeaker 1242 of FIG. 1) is arranged at a predetermined position on or around the transparent member 100 of FIG. 2, at which the optical path for forming the air floating video 3 is not blocked. The super-directive loudspeaker 30 outputs the audio of the super directionality in a direction of an allow illustrated with a dashed dotted line. The usage of the super-directive loudspeaker 30 as described above causes the property in which the user U can hear the audio of the audible band only in the specific limited space region in vicinity of the year UE of the user U although the person around the user U cannot hear the audio. This property is particularly suitable when the audio information having the high confidentiality (such as the passcode or the amount of money) is output by reading out and so forth.

Figure 3:
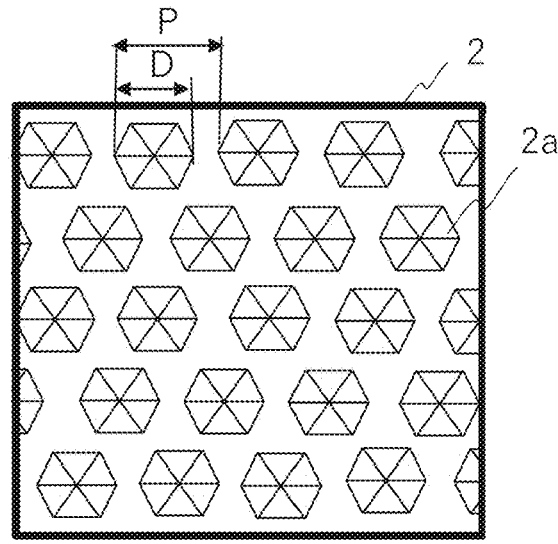
FIG. 3 shows a configurational example of a retroreflector.

Next, FIG. 3 shows a surface shape of a retroreflector produced by Nippon Carbide Industries Co., Inc., as a configurational example of the typical retroreflector 2. A surface of this retroreflector has a hexagonal prism serving as a plurality of retroreflector portions 2a (in other words, retroreflector elements) orderly arrayed. The light ray entering the hexagonal prism is reflected on a wall surface and a bottom surface of the hexagonal prism, and is emitted as retroreflection light in a direction corresponding to the incident light. As a result, a normal image R1 shown in FIG. 5 for exemplification is formed as the air floating video 3. On the other hand, as shown in FIG. 4, ghost images G1 to G6 different from the normal image R1 are formed in accordance with the video light having obliquely entered the retroreflector 2 (hexagonal prism) among the video light emitted from the display apparatus 1.

The air floating video display apparatus 1000 of the embodiment displays the air floating video 3 that is the actual image based on the video displayed on the video display apparatus 1. Resolution of this air floating video significantly depends on not only the resolution of the liquid crystal display panel 11 but also a diameter "D" and a pitch "P" of the hexagonal prism that is the retroreflection portion 2a of the retroreflector 2 shown in FIG. 3. For example, when a WUXGA liquid crystal display panel 11 of 7 inches (1920×1200 pixels) is used, even if one pixel (corresponding one triplet) is about 80 μm, if the diameter D and the pitch P are 240 μm and 300 μm, respectively, one pixel of the air floating video 3 is equivalent to 300 μm. Therefore, effective resolution of the air floating video 3 decreases down to about ⅓.

Accordingly, in order to make the resolution of the air floating video 3 equal to the resolution of the display apparatus 1, it is desirable to make the diameter D and the pitch P of the retroreflection portion 2a close to one pixel of the liquid crystal display panel 11. Meanwhile, in order to suppress the moire based on the pixels of the liquid crystal display panel 11 and the retroreflection portion 2a of the retroreflector 2, each pitch ratio may be designed to deviate from an integral multiple of one pixel. Regarding the shape, all sides of the retroreflection portion 2a may be arranged not to overlap all sides of one pixel of the liquid crystal display panel 11.

Meanwhile, in order to manufacture the retroreflector 2 at a low cost, the retroreflector 2 may be shaped by a roll press method. Specifically, this method is a method of arranging and forming the retroreflection portion 2a on a film. This method forms a necessary shape by forming an inverse shape of the formed shape on a roll surface, applying an ultraviolet curing resin onto a base material for fixation, and causing the portion to pass through a gap between the rolls, and then, hardens the shape by emitting the ultraviolet ray thereto. This manner provides the retroreflector 2 having a desirable shape.

In the present embodiment, the display apparatus 1 is made of the liquid crystal display panel 11 and the light source 13 generating the light of the specific polarized wave having the narrow-angle diffuse property described later. Therefore, a possibility of the oblique entering of the video into the retroreflector 2 is made small. Therefore, a system that is excellent in a structure in which a luminance of the gosht image is low even if the ghost image is generated can be provided.

Second Example of Air Floating Video Display Apparatus

Figure 6:
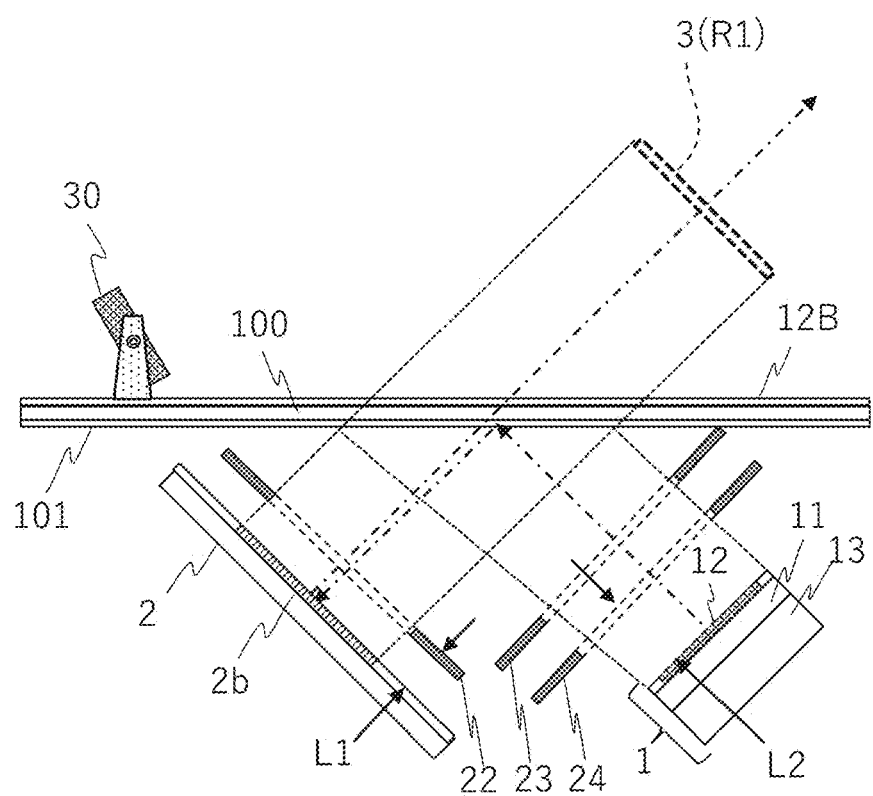
FIG. 6 shows another example of the principal-part configuration of the air floating video display apparatus according to one embodiment.

FIG. 6 is a diagram showing another example of the principal-part configuration of the air floating video information display apparatus according to an embodiment. The display apparatus 1 is configured to include the liquid crystal display panel 11 serving as a video display component 11 and a light source 13 generating the light of the specific polarized wave having the narrow-angle diffuse property. The liquid crystal display panel 11 is made of a liquid crystal display panel having an optional size ranging from a small screen size of about 5 inches to a large size excessing 80 inches. The video light emitted from the liquid crystal display panel 11 is reflected to the retroreflector 2 by, for example, the polarization splitter 101 such as the reflection-type light polarizer.

The light entering surface of the retroreflector 2 is provided with the λ/4 waveplate 2b, and, when transmitting the video light therethrough twice, converts the video light in terms of the light polarization (converts the specific polarized wave to another polarized wave). In this manner, the video light after the conversion in the light polarization is transmitted through the polarization splitter 101, and the air floating video 3 that is the actual image is formed outside the transparent member 100. The light polarization axes in the polarization splitter 101 are occasionally not equalized because of the retroreflection, and therefore, a part of the video light is reflected and returns to the display apparatus 1. This light component is reflected again by the video display surface of the liquid crystal display panel 11, and, as a result, may generate the ghost image, and may significantly reduce the image quality of the air floating video 3. Accordingly, in the present embodiment, the video display surface of the display apparatus 1 is provided with an absorption-type light polarizer 12. The video light is transmitted through the absorption-type light polarizer 12, and the reflection light is absorbed by the absorption-type light polarizer 12. By such a configuration, the reduction of the image quality of the air floating video 3 due to the ghost image is prevented.

Also, in the present embodiment, in order to suppress the reduction of the image quality due to external light such as sunlight or illumination light outside the set of the air floating video apparatus 1000, a surface (external-light entering surface) of a transparent member 100 may be provided with an absorption-type light polarizer 102B as shown in the drawing. The polarization splitter 101 is made of, for example, a reflection-type light polarizer or a metal multilayered film reflecting the specific polarized wave.

A difference between the configuration of FIG. 6 and the configuration of FIG. 2 is that both a light block member 24 and a light block member 23 used for blocking the oblique video light other than the normal video light forming the air floating video 3 are arranged in the middle of the optical path between the polarization splitter 101 and the liquid crystal display panel 11. The light block member 24 is arranged at a region of a distance L2 close to the liquid crystal display panel 11, and the light block member 23 is arranged at a region close to the polarization splitter 101. Also, a light block member 22 used for blocking the oblique video light other than the normal video light is arranged in the middle of the optical path between the polarization splitter 101 and the retroreflector 2. The light block member 22 is arranged at a region of a distance L1 to the retroreflector 2. By these light block members, the oblique video light that is the cause of the occurrence of the ghost image is blocked. Note that a broken-line portion of each of the light block members 22, 23 and 24 represents a transmittable (non-block) region. As a result, the occurrence of the ghost image as described above can be more suppressed.

From the experiments, the inventors of the present application have verified that the light block effect can be enhanced by the arrangement of both the light block member 24 and the light block member 23 in the space between the polarization splitter 101 and the liquid crystal display panel 11. It has been verified that the components can be manufactured and built with a component accuracy within a mechanical tolerance range when an area of the inner diameter of the light block member 24 and the light block member 23 (diameter of the broken-line portion) is set to 110% with respect to a region in which the normal video light flux forming the air floating video 3 is transmitted in the experiments. Also, it has been verified that the occurrence of the ghost image can be suppressed to a level that is acceptable in practical when this is set to 140% or lower with respect to the region of the light block member in which the normal video light flux is transmitted in order to more suppress the occurrence of the ghost image. Meanwhile, the occurrence of the ghost image can be more suppressed when the light block member 22 between the polarization splitter 101 and the retroreflector 2 is arranged at a position at which the distance L1 between the light block member 22 and the retroreflector 2 is equal to or lower than 50% of the distance between the retroreflector 2 and the polarization splitter 101. Also, the occurrence of the ghost image can be more suppressed to the level that is acceptable in view when the light block member 22 is arranged at a position at which the distance L1 between the light block member 22 and the retroreflector 2 is equal to or lower than 30% of the distance between the retroreflector 2 and he polarization splitter 101. It has been verified that the level of the ghost image can be more reduced by the arrangements of the three light block members 22, 23 and 24.

FIG. 7 shows an example of another configuration of a light block member for reducing the occurrence of the ghost image in the air floating video display apparatus according to an embodiment. FIG. 7(A) shows a cross-sectional shape of a light block member 25 according to the present embodiment. FIG. 7(B) shows a plane shape of the light block member 25 (plane viewed in a direction orthogonal to the optical axis), and shows an effective area of the light block member 25 with respect to a region 27 in which the normal video light flux forming the air floating video 3 is transmitted. In the example of FIG. 7(B), the area of the region 27 in which the normal video light flux is transmitted is set to be smaller than an area of an inner diameter of an outer frame 25a (that is a region having a light block property) of the light block member 25.

FIG. 8 shows another example of a light block member for reducing the occurrence of the ghost image in the air floating video display apparatus according to an embodiment. FIG. 8(A) shows a cross-sectional shape of a light block member 26 according to the present embodiment. FIG. 8(B) shows a plane shape of the light block member 26, and shows a configuration in which an effective area of the light block member 26 is the same in size as that of the region 27 in which the normal video light flux forming the air floating video 3 is transmitted. In the present example, a beam 26b extending inward from an outer frame 26a of the light block member 26 is provided. An end of the beam 26b extends to a position of an outer shape of the region 27. In this manner, the extraordinary light such as the external light that is the cause of the formation of the ghost image is reflected by a surface of the beam 26b plural times. Therefore, the extraordinary light can be more absorbed. In the present example, the area of the region 27 in which the normal video light flux is transmitted is made smaller than the area of the inner diameter of the outer frame 26a of the light block member 26, and is the same as the size of the inscribed surface of the beam 26b.

In the embodiment, a shape of the main surface of the retroreflector 2 is a plane shape facing the display apparatus 1 (including the reflection in the optical path). On the other hand, as a modification example, the shape of the retroreflector 2 may be not the plane shape facing the display apparatus 1 but a concave surface shape or a convex surface shape having a curvature radius of, for example, 200 mm or larger. This configuration can prevent the ghost image generated after the reflection from being viewed by the user U since the ghost image is away from the eyesight of the user even when the ghost image is generated by the oblique video light reflected by the retroreflector 2. A curvature radius of 100 mm or smaller causes a new problem of reduction of the quantity of the normal reflection light of the light reflected by a peripheral portion of the retroreflector 2 (a peripheral portion of the region where the λ/4 waveplate 2b is arranged and which mainly reflects the video light), resulting in the reduction of the quantity of the obtained peripheral light of the air floating video 3. Therefore, in order to reduce the ghost image level to the acceptable level in practical, the above-describe technical means may be adopted and applied or combined with one another.

<Video Display Method of Air Floating Video Display Apparatus>

Figure 9:
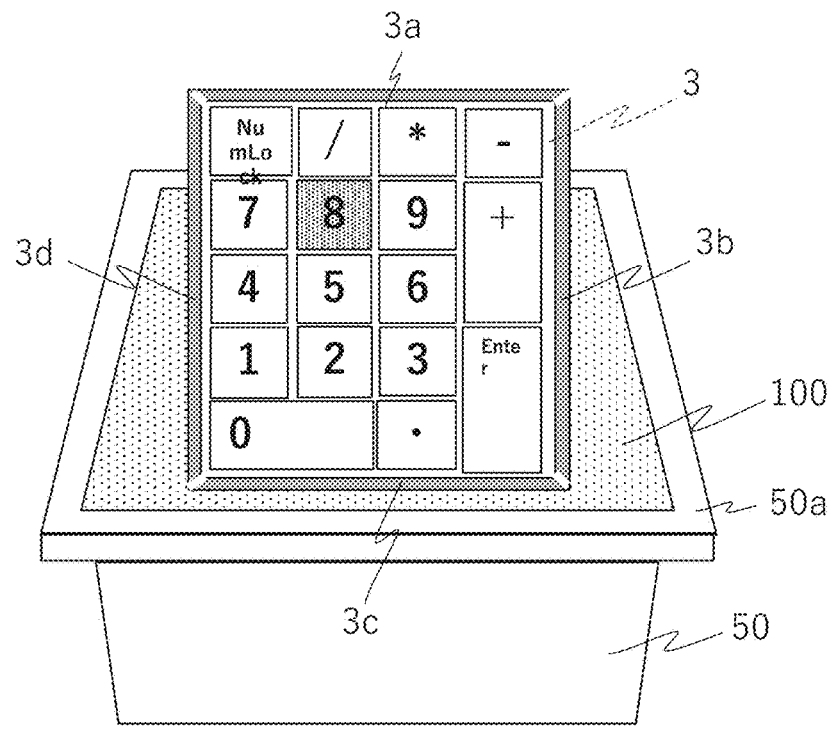
FIG. 9 shows one configurational example of a non-contact user interface based on an air floating video in the air floating video display apparatus according to one embodiment.

FIG. 9 is a descriptive diagram regarding a video display method for preventing erroneous input in the air floating video display apparatus according to one embodiment. FIG. 9 shows a display example of the air floating video 3 in the air floating video display apparatus 1000, and shows how the image is viewed when the air floating video 3 is viewed from the visual point of the user U. This example of the air floating video 3 is equivalent to a non-contact user interface having a plurality of objects such as ten keys and allowing input of a numeric character or the like. As described above, the display apparatus 1 includes the liquid-crystal display panel 11 and the light source 13 which generates the light of the specific polarized wave having the narrow-angle diffuse property, and is made of the one having an optional size ranging from a small screen size of about 5 inches to a large size excessing 80 inches. The video light emitted from the liquid crystal display panel 11 is reflected to the retroreflector 2 by, for example, the polarization splitter 101 such as the reflection-type light polarizer.

Figure 10:
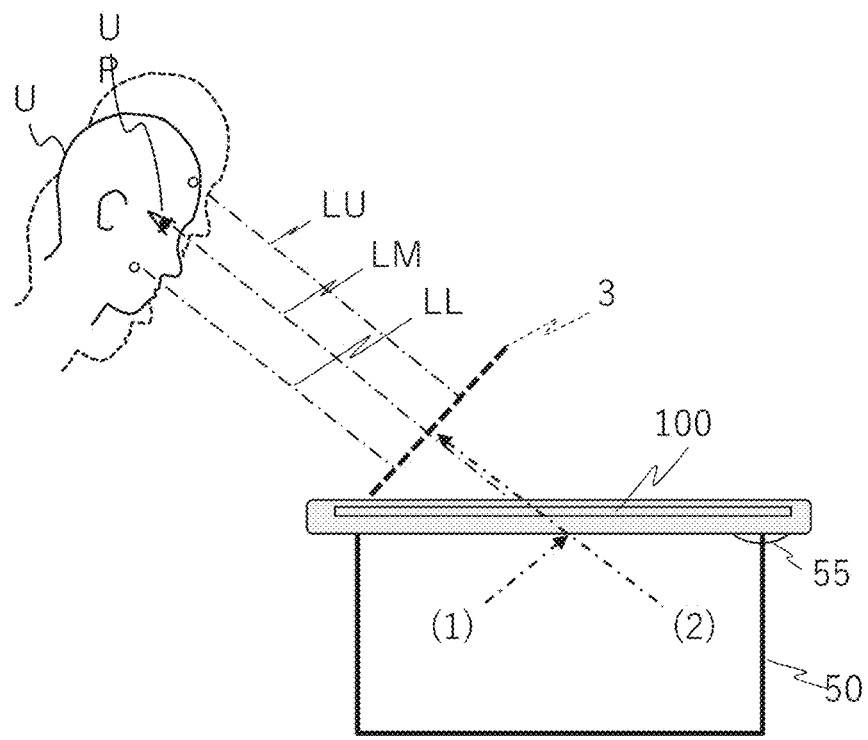
FIG. 10 shows an example of a visual line direction of a user with respect to the air floating video of FIG. 9.

FIG. 10 is a schematic diagram showing a state in which the user U visually recognizes the air floating video 3 when the air floating video display apparatus 1000 is viewed from side. In particular, the diagram shows a case in which the eyepoint UP of the user U at positions of three types different in a height direction, that is, upper, middle, and lower positions views the air floating video 3 in respective visual line directions LU, LM, and LL. In the present example, each of the above-described angles A, B, and C (FIG. 2) is about 45 degrees. The air floating video 3 is formed of light beams having high directionality, and therefore, when the air floating video 3 is visually recognized from a view direction shown in FIG. 10 (for example, the visual line direction LM corresponding to the middle position), the air floating video 3 is visually recognized as a bright image. In particular, when the user U operates at a correct position with respect to the air floating video display apparatus 1000 while the visual line is present in the visual line direction ML, the user U can suitably visually recognize the entire air floating video 3 as shown in FIG. 9.

On one hand, as a result of the experiments made by the inventors, it has been found that, if the eye (eyepoint UP) of the user U is not at an optimum position (position corresponding to the visual line direction LM in FIG. 10) in the structure of the combination of the light source 13 having the narrow-angle diffuse property and the liquid-crystal display panel 11 serving as the video image display element, a lower video of the air floating video 3 is difficult to be visually recognized at the time of viewing in, for example, the upper visual line direction LU in FIG. 10. In consideration of this from an opposite viewpoint, it can be said that the risk of the peek of the air floating video 3 by the different person from the authorized user U is less and this is effective from the viewpoint of security and so forth.

On the other hand, the inventors have studied a scheme easily enabling the touch operation on the air floating video 3 at an optimum view position. In the air floating video display apparatus 1000 of the present embodiment, as shown in FIG. 10, a camera portion 55 (corresponding to the imager 1180 in FIG. 1) for determining whether the standing position of the user U or the like is correct is provided on part (at a position on a depth side when viewed from the user U) of the housing 50 (housing 1190 in FIG. 1) of the air floating video display apparatus 1000. With the camera portion 55, the air floating video display apparatus 1000 determines the position and orientation of the face of the user U in space, and furthermore, the position of the pupil (eyepoint UP) as required. Then, in the air floating video 3 of FIG. 9, the air floating video display apparatus 1000 changes a display state of optimum view position display portions 3a, 3b, 3c, and 3d, which are frame display portions arranged on four outer sides of a video region of a main object such as ten keys. With this, the position and the visual line of the user U are guided to the visual line direction ML corresponding to the optimum position. For example, when the position of the eyepoint UP of the user U is lower than the optimum position and is in the view state such as the visual line direction LL, the air floating video display apparatus 1000 switches the display states of the optimum view position display portions on the four sides, such as causing the optimum view position display portion 3a corresponding to the upper side of the four sides to be lighted off. A state in which all of the optimum view position display portions 3a, 3b, 3c, and 3d on the four sides can be viewed from the user U, that is, a state in which the portions can be viewed as a frame, corresponds to a suitable view state. With this, the visual line of the user U can be guided to the visual line direction ML corresponding to the optimum position. As another display control example, a mode of displaying an arrow image or the like motivating movement of the visual point is displayed on the above-described frame display portions is possible.

Also, the air floating video display apparatus 1000 adjusts the brightness of the air floating video 3 and so forth by automatically adjusting the luminance of the display image based on information about outside brightness detected by the camera portion 55, and therefore, can reduce the power consumption and improve the visual recognition.

Figure 11:
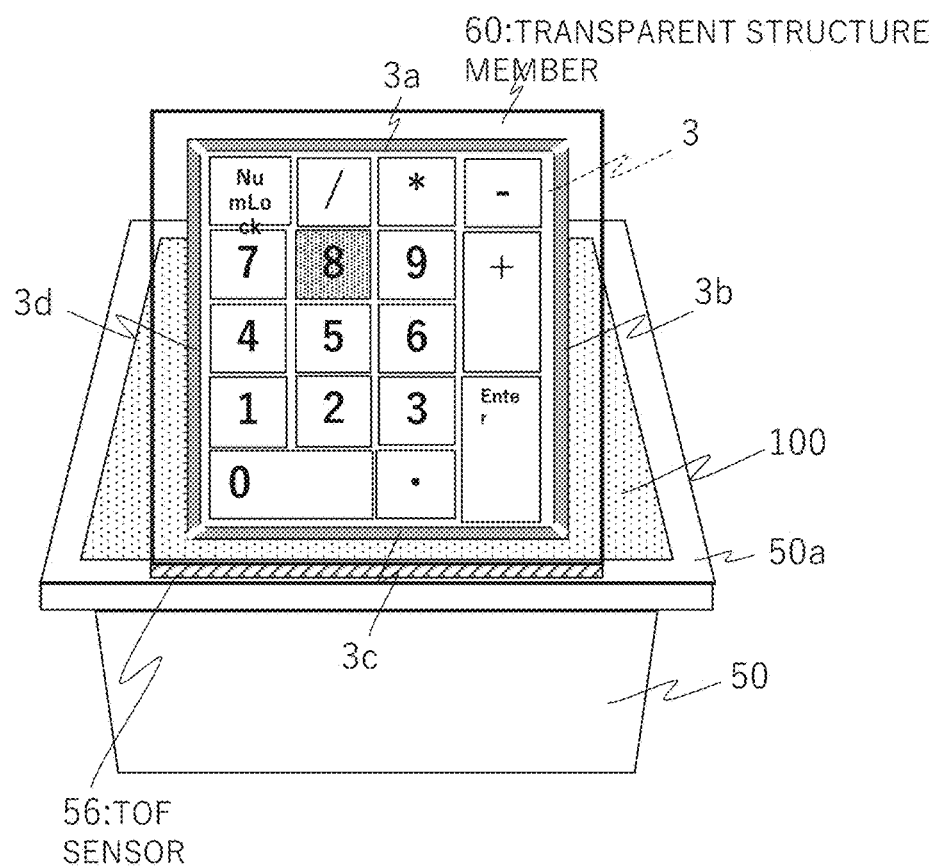
FIG. 11 shows another configurational example of the non-contact user interface based on the air floating video in the air floating video display apparatus according to one embodiment.
Figure 12:
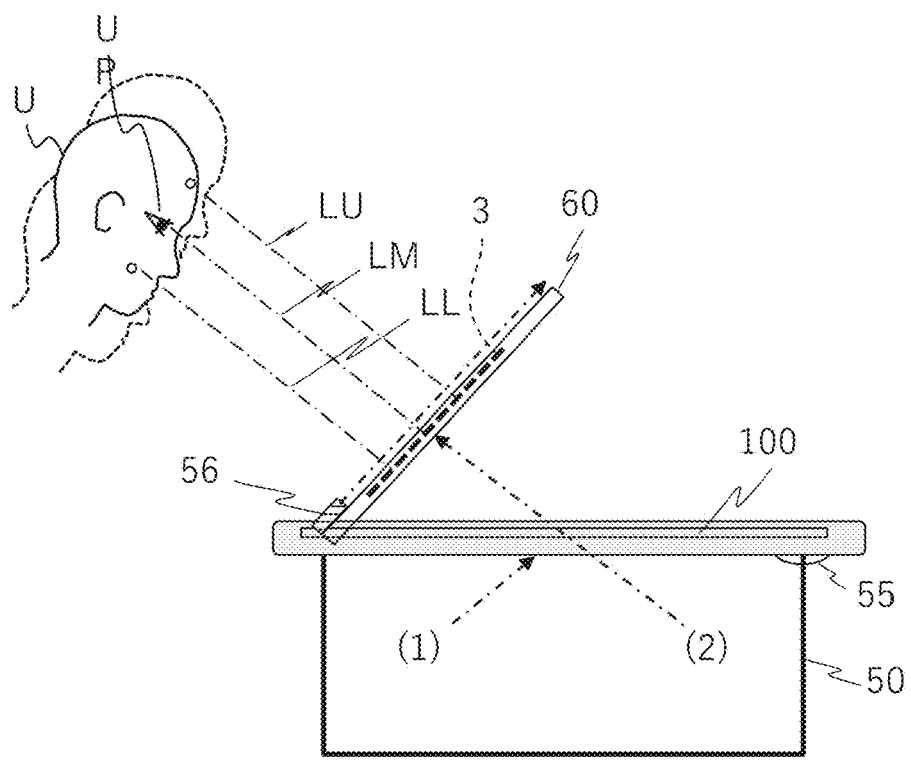
FIG. 12 shows an example of a visual line direction of the user with respect to the air floating video of FIG. 11.

Furthermore, a problem of making it difficult to recognize and determine the position in space where the air floating video 3 is floating when the user U uses the air floating video display apparatus 1000 has also been found. To solve this, the inventors have devised an embodiment as shown in FIG. 11 and FIG. 12. In this embodiment, a member having physical substance (other than air) for position recognition, such as a transparent structure member 60 made of plastic, is provided at the position where the air floating video 3 is displayed. In FIG. 11, the transparent structure member 60 having the frame shape is arranged on the outer circumferential four sides of the air floating video 3 (including the frame display portions) similar to that of FIG. 9. For example, a lower side portion of this transparent structure member 60 is fixed to one side on the front side of the housing 50. It has been found that this manner makes the user U easy to recognize and determine the display position of the air floating video 3 in a three-dimensional space. Note that in place of the transparent structure member 60, for example, a frame-shaped non-transparent structure member made of metal or the like may be provided. When a frame-shaped non-transparent structure member is provided, the user U easily recognizes that non-transparent structure member, and therefore, the display position of the air floating video 3 can be more quickly recognized even, for example, several meters away from that position in a lateral direction or an oblique above direction. After that recognition, the user U can operate the air floating video 3 with the finger at a front position.

Also, in the configurational example of FIG. 11 and FIG. 12, a TOF sensor 56 (distance sensor of a TOF scheme) as the aerial operation detection sensor 1351 is provided. The TOF sensor 56 senses a distance between a target such as a finger of the user U and the TOF sensor 56 and a relation of the position of the target or the like in the air floating video 3. This TOF sensor 56 is arranged below the air floating video 3. This TOF sensor 56 is arranged on part of the housing 50 (50a) corresponding to a lower side portion of the transparent structure member 60. This TOF sensor 56 can detect the state of the touch position of the fingertip or the like by scanning the entire region on the plane of the air floating video 3. This TOF sensor 56 and the control portion 1110 using the same can sense and measure not only the position coordinates (for example, touch position) of the target such as a finger in a coordinate system in a plane direction of the air floating video 3 but also a state such as a moving direction, moving speed, and so forth of the target. To find the distance and position on a two-dimensional plane, for example, as shown in FIG. 11, the TOF sensor 56 has a structure with a plurality of combinations of an infrared light emitter and a light receiver linearly arranged. In the TOF sensor 56, light emitted from the infrared light emitter is applied to the target, the reflected light is received at the light receiver, and the distance from the target is determined by multiplying a time difference from light emission to light reception by a speed of light. Also, the coordinates of the air floating video 3 on the plane can be found from coordinates of a portion where the above-described time difference is minimum in portions of the plurality of infrared light emitters and light receivers on a straight line.

Also, as a sensing method different from the above-described example, a method of using a structure including an infrared laser light generator and an imager using an infrared camera may be applied. Here, the shape of an irradiation region of infrared laser light generated from the infrared laser light generator is assumed to be a thin-film sheet shape in which a gap with the display plane of the air floating video 3 is nearby to be, for example, equal to or smaller than several millimeters. This irradiation region of infrared laser light is also called a "laser sheet". In the infrared camera of the imager, the laser sheet formed of infrared laser light generated from the infrared laser light generator (in other words, laser sheet generator) captures an image of light reflected by the target such as the finger of the user U. Then, the control portion 1110 can identify the position of the finger on the laser sheet by analyzing the captured image generated at the imager.

Furthermore, combination of a plurality of structures such as sensors each being capable of sensing the position coordinates of the target on the two-dimensional plane as described above may be adopted in a vertical direction (in other words, depth direction, front-rear direction) with respect to the plane of the air floating video 3. With this, information about the position coordinates of the target in the three-dimensional region including the vertical direction of the air floating video 3 and so forth can be found. That is, the state of operation such as touch on the air floating video 3 with a hand finger or the like can be found in more detail.

Also, the inventors have also studied a display method allowing the user U to visually recognize the air floating video 3 more clearly. As a result, as shown in FIG. 9 and so forth, the video can be visually recognized more clearly if part of the air floating video 3 is designed to lie on an outer frame 50*a* of the housing 50 on the outer periphery of the transparent member 100 serving as a window part from which video light is emitted in a state viewed from the user U. Also, to make the floating amount of the air floating video 3 larger in the view, it is only required to design the layout of the entire optical system so that the lower end of the air floating video 3 lies on the outer frame 50*a*.

Third Example of Air Floating Video Display Apparatus: Super-Directive Loudspeaker Next, the inventors have studied a structure capable of preventing the erroneous input such as touch operation on an object to be adopted by the user to reliably perform the input operation when the object displayed as the air floating video formed by the air floating video display apparatus is used as the non-contact user interface. For this, in particular, the inventors have studied a method of suitably outputting the audio in response to the input operation of the user such as a method of performing a user operation assist, operation guidance, or the like based on the audio.

Here, for example, in a system such as an ATM apparatus at a bank in which information with high confidentiality such as passcode and input information about the amount of money is handled, simply outputting the audio corresponding to an object (for example, numerical button) adopted by the user with touch operation or the like from a normal loudspeaker has a big problem in view of security and so forth. Thus, the inventors have studied an audio output scheme allowing only the authorized user to hear the audio by using a super-directive loudspeaker (super-directive loudspeaker 1242 in FIG. 1, super-directive loudspeaker 30 in FIG. 2).

As shown in FIG. 2 and so forth described above, in view from a user U side (direction of the arrow A), there is practically no substance (in particular, solid or liquid) other than air in a plane region where the air floating video 3 is displayed. Thus, the inventors have studied a structure for allowing the audio to be heard only in the vicinity of the ears of the user by arranging the super-directive loudspeaker 1242 (FIG. 1) at a position off from the optical path for forming the air floating video 3. As a result, the inventors have devised, for example, two schemes shown in FIG. 13 and FIG. 14.

Figure 13:
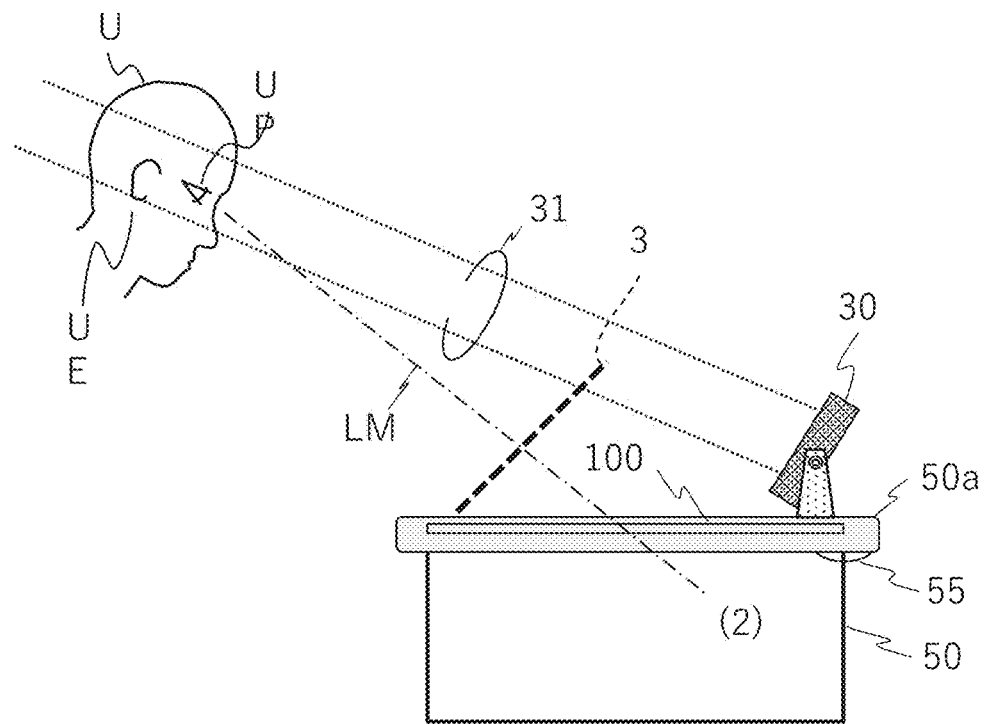
FIG. 13 shows an example of arrangement of a super-directive loudspeaker in the air floating video display apparatus according to one embodiment.

FIG. 13 shows a configurational example in which the super-directive loudspeaker 30 is arranged on the outer frame 50*a* of the housing 50 in the air floating video display apparatus 1000 according to one embodiment. Note that an example of application is directed to an ATM apparatus. In this configurational example, the audio emitted from the super-directive loudspeaker 30 is directly output toward the ears UE of the user U. The propagation path of super-directive audio is a straight path, in other words, a non-reflective path. In this structure, the super-directive loudspeaker 30 forms a sound field 31 with strong directionality. Audio emitted from the super-directive loudspeaker 30 directly reaches a region in the vicinity of the ears UE of the user U. The region in the vicinity of the ears UE of the user U at a normal position becomes a region where the strong sound field 31 is formed. Thus, only that user U can hear that audio, and others cannot hear it.

Figure 14:
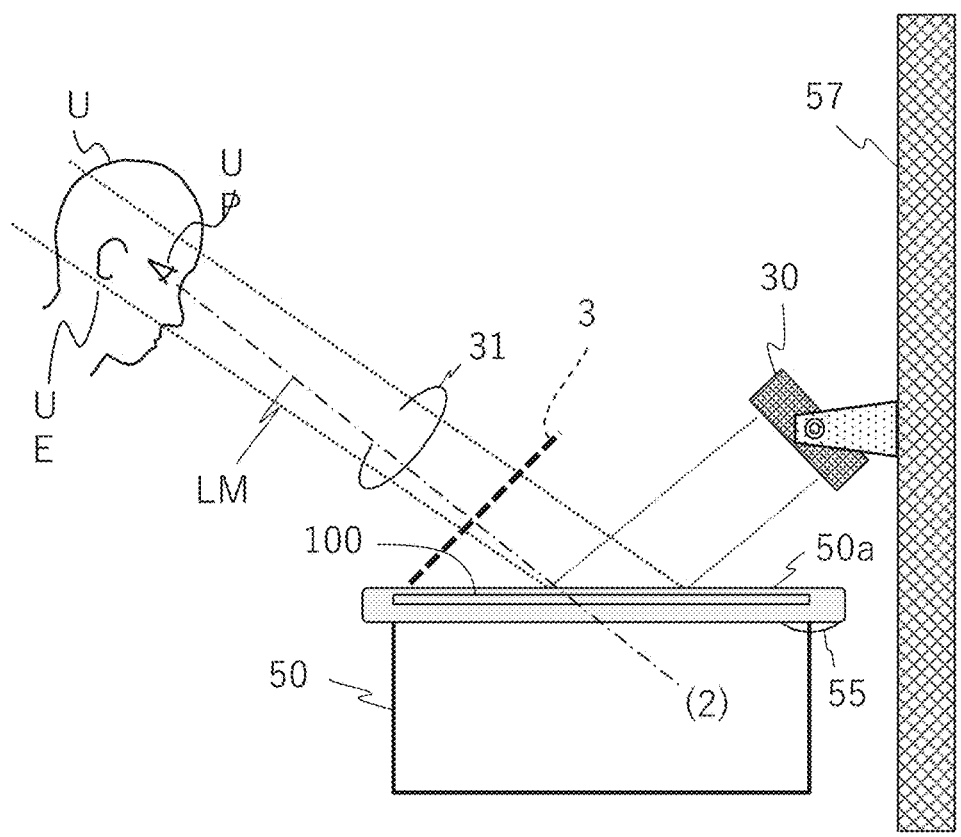
FIG. 14 shows another example of arrangement of a super-directive loudspeaker in the air floating video display apparatus according to one embodiment.

On the other hand, FIG. 14 shows a configurational example in which the super-directive loudspeaker 30 is arranged on a wall 57 opposite to the user U in the air floating video display apparatus 1000 according to one embodiment. In this configurational example, the audio emitted from the super-directive loudspeaker 30 is once reflected on the flat surface of the transparent member 100 (for example, glass), and the reflected audio reaches a region in the vicinity of the ears UE of the user U.

In both of the structures of FIG. 13 and FIG. 14, the super-directive loudspeaker 30 is arranged at a position off from the optical path for forming the air floating video 3 (such as the above-described optical path of video light travelling from the retroreflector 2 via the transparent member 100 toward the air floating video 3 or the eyepoint UP). Thus, the super-directive loudspeaker 30 does not hinder the optical path for forming the air floating video 3. Also, in comparison between these structures, similarity of directions between the optical path of video light and the audio path is higher in FIG. 14 than FIG. 13. Thus, the structure of FIG. 14 is more effective from a viewpoint in which the audio tends to be heard as if to be emitted from the air floating video 3 at the position of the authorized user U (position in the visual line direction LM).

A related art for controlling a three-dimensional position (in other words, sound field) where the audio output from the super-directive loudspeaker is audible has been known, the related art using a phase difference (or time difference) of ultrasonic signals input to the plurality of ultrasonic output elements in the structure of the array with the plurality of orderly-arranged ultrasonic output elements configuring the super-directive loudspeaker on a plane. For example, note that the paper "High-Realistic Acoustic Sound Field Reproduction: Research Trend with Parametric Array Loudspeaker" (IEICE Fundamentals Review Vol. 10, No. 1, pp. 57-64) describes technique related to super-directive loudspeakers.

To the super-directive loudspeaker 30 in the embodiment, such a technique of forming a sound field as a three-dimensional position may be applied. Also, a structure in which the plurality of ultrasonic output elements are arranged not on a plane but on a concave curved surface while changing the curvature of that concave surface may be applied. This structure can also control the sound field as the three-dimensional position where the audio output from the super-directive loudspeaker 30 is audible. If the above-described technique is used, an optimum sound field can be formed so that the audio is audible only in a region very close to the ears of the user.

Figure 15:
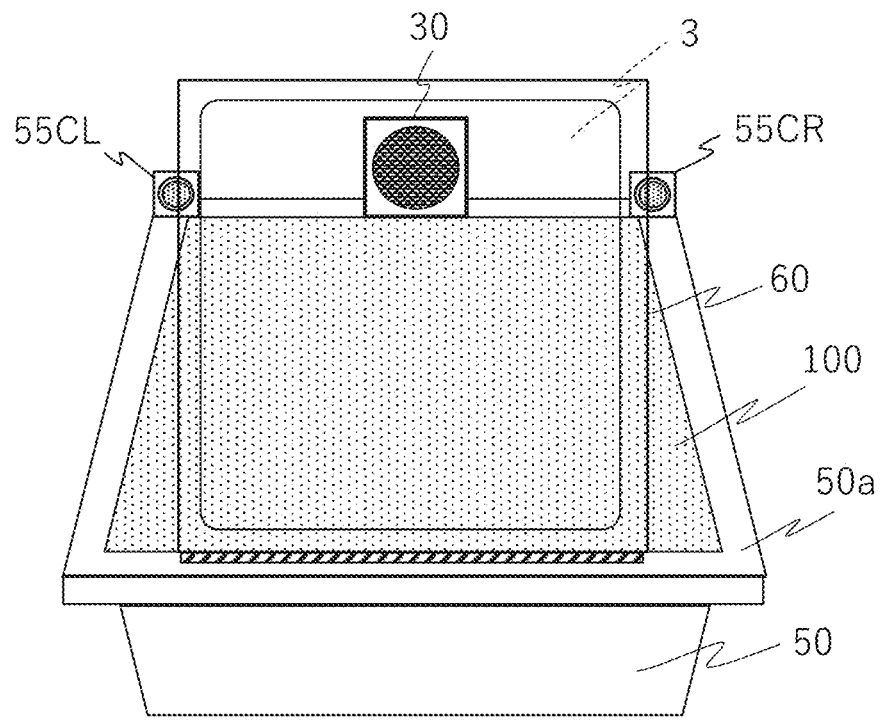
FIG. 15 shows an example of arrangement of the air floating video, the super-directive loudspeaker, and a camera in the air floating video display apparatus according to one embodiment.

Thus, in the air floating video display apparatus 1000 according to one embodiment, the apparatus has a structure as shown in FIG. 15. In this structure, for example, single super-directive loudspeaker 30 is arranged at a position on a depth side viewed from the user, the position being a center position of the housing 50 in a left-right direction. For fixation of the super-directive loudspeaker 30, the configurational example of FIG. 13 or FIG. 14 can be similarly applied. Furthermore, a camera 55CL is arranged at a position on a left side with respect to the super-directive loudspeaker 30 viewed from the user, and a camera 55CR is arranged at a position on a right side. The cameras 55CL and 55CR are a configurational example of the above-described imager 1180.

In this configurational example, stereo image can be captured by the two cameras (55CL, 55CR) on the left and right. Thus, based on the images captured by the two cameras, a face position of the user in space and a distance from the super-directive loudspeaker 30 to the face position can be calculated and acquired. From this calculation result, the control portion 1110 controls a phase difference (or time difference) of ultrasonic signals to be input to the plurality of ultrasonic output elements configuring the super-directive loudspeaker 30. With this, the optimum sound field can be formed so that the audio is audible only in the region in the vicinity of the face or ears of the user. As a result, the audio emitted from the super-directive loudspeaker 30 is not heard by the different person but can be heard by the user. In particular, when the non-contact user interface based on the air floating video 3 is used in the system such as the ATM apparatus requiring the high security, the structure as shown in FIG. 15 is extremely suitable in view of security.

The super-directive loudspeaker 30 and the cameras 55CL and 55CR may be provided at positions away from the housing 50 of the air floating video display apparatus 1000, may be installed in the housing 50, or may be fixed to the housing 50 at a predetermined position.

Figure 16:
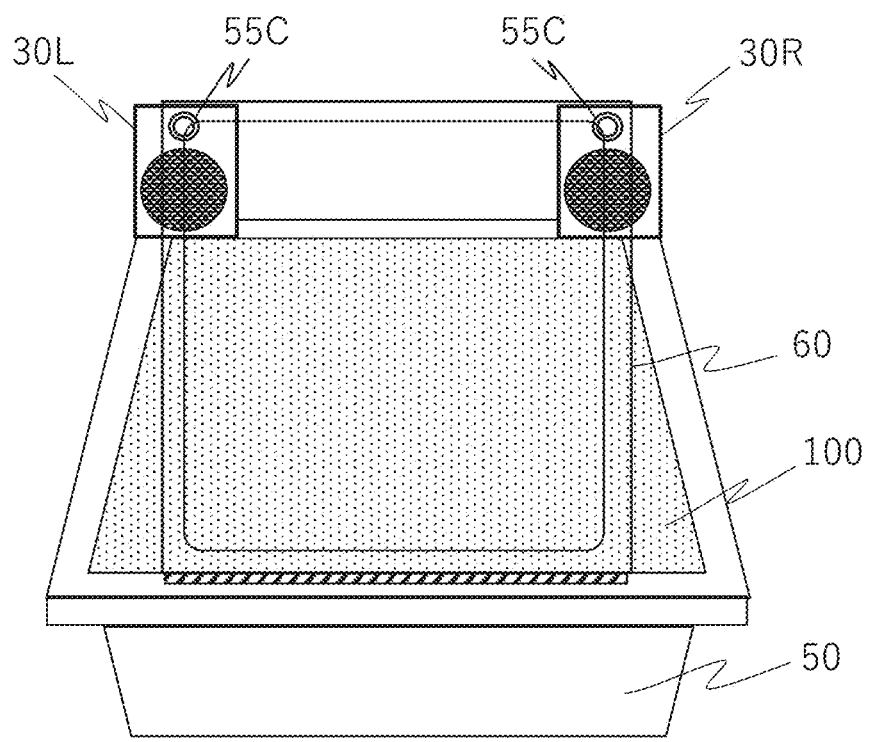
FIG. 16 shows another example of arrangement of the air floating video, the super-directive loudspeaker, and the camera in the air floating video display apparatus according to one embodiment.

Also, the air floating video display apparatus 1000 according to one embodiment has a structure as shown in FIG. 16. In this structure, cameras are embedded in the housing of the super-directive loudspeaker 30, and, in other words, the apparatus has a structure with united super-directive loudspeaker and cameras. A super-directive loudspeaker 30L is arranged at a position on a left side at a position on a depth side viewed from the user, and a super-directive loudspeaker 30R is arranged at a position on a right side. The super-directive loudspeaker 30L and the super-directive loudspeaker 30R are unified to include a camera 55C in its housing, and, in other words, are a loudspeaker/camera portion.

By the unification, this structure is excellent not only in view of a space factor, but allows stereo image captured by two left and right cameras (cameras 55C). Thus, a face position of the user and distances from the ultrasonic loudspeaker to the face potion can be acquired by calculation based on the image of each camera 55C.

Also, these loudspeaker/camera portions (super-directive loudspeakers 30L and 30R) may be each fixed to a predetermined position of the housing 50. In this case, the distance between the left and right portions is always constant. Thus, the position relation among the user, the cameras, and the super-directive loudspeakers can be more correctly calculated. Also in this structure, the positions of sound fields formed by the two super-directive loudspeakers 30L and 30R can be accurately calculated. With this, a focal area of the sound fields formed by the two super-directive loudspeakers 30L and 30R, that is, the audible region of the audio for only the authorized user can be accurately set. As a result, the audio made by the sound fields formed by the two super-directive loudspeakers 30L and 30R is audible for only the authorized user of, for example, the ATM apparatus, and is not audible for others in the vicinity of the user (positioned on, for example, left, right or behind).

Furthermore, according to the structure of FIG. 16, optimum sound fields can be comprehensively formed by causing the super-directive loudspeaker 30L on a left side to form a sound field for the left ear of the user, and causing the super-directive loudspeaker 30R on a right side to form a sound field for the right ear. With this, it is possible to provide the audio that can be easier to be heard by the user than the case of the single super-directive loudspeaker 30 of FIG. 15.

Note that the structures of FIG. 15 and FIG. 16 adopts a scheme of using a stereo camera to find the face position of the user. The present invention is not limited to this scheme, and is also applicable to a scheme of using not such a camera but a heat sensor or the like to identify the position of the face, eye, or the like.

Fourth Example of Air Floating Video Display Apparatus: Generation of Fingertip Tactile Sense Next, as the air floating video display apparatus according to one embodiment, a structure in which when an air floating video is applied as a non-contact user interface, a sense of touch is generated on the fingertip at the time of operation on the air floating video is described. In the present embodiment, the structure has a function of generating, when the user performs touch operation on an object (for example, push button) displayed as an air floating video, a sense as if the user has actually touched any substance as a touch feeling to the fingertip. This function is implemented by using the fingertip tactile sense generation portion 1230 of FIG. 1 described above.

[Air Floating Video Display Apparatus]

Figure 17:
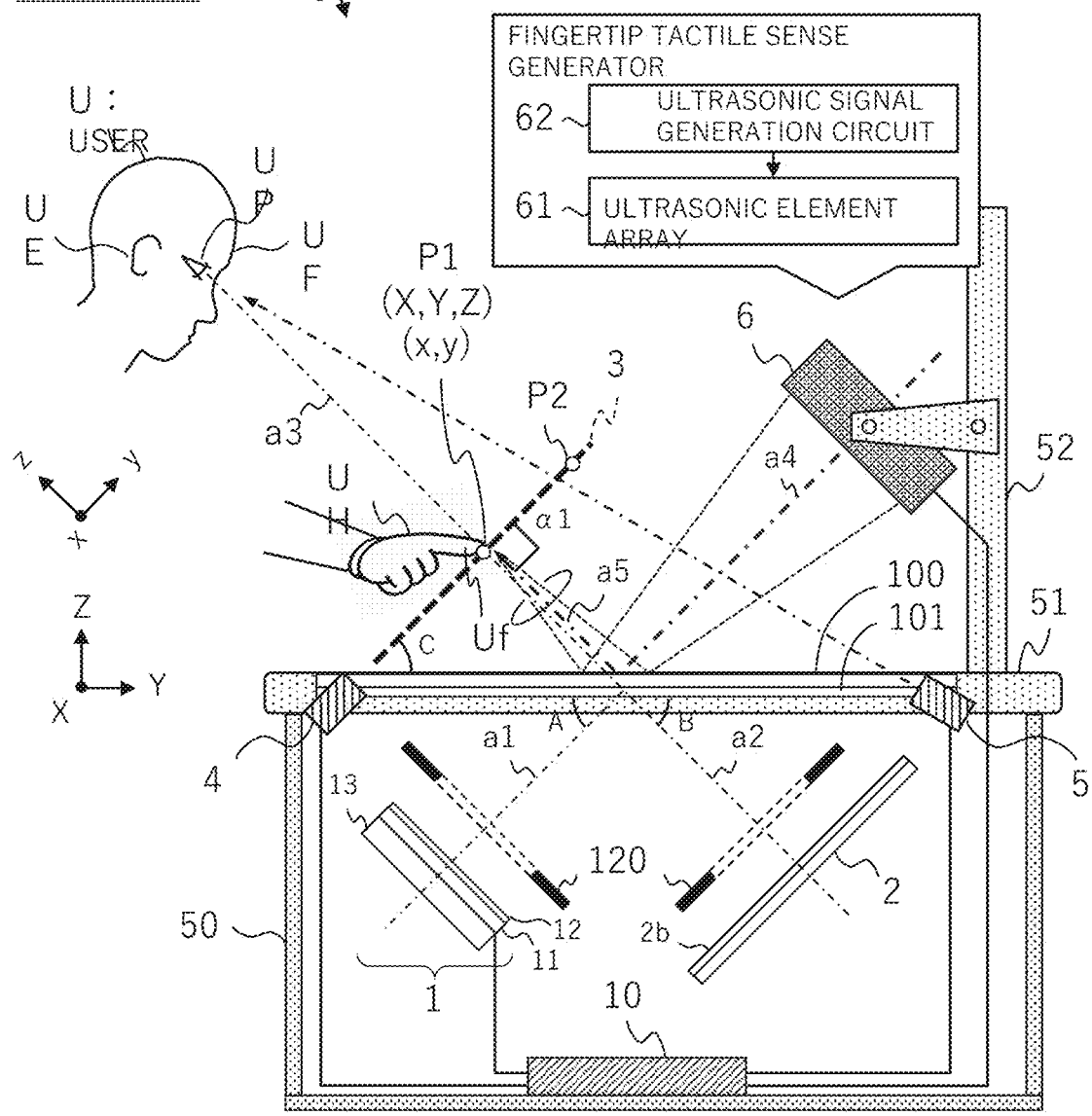
FIG. 17 shows the user, the air floating video, a fingertip tactile sense generator, and so forth as a structure of the air floating video display apparatus according to one embodiment viewed from a side surface.

FIG. 17 shows a schematic structure as the structure of the air floating video display apparatus 1000 of the present embodiment including the user U and so forth viewed from a side surface. Note that for description, a coordinate system and directions in space are represented by (X, Y, Z). The Z direction is a vertical direction and an up-down direction, the X direction and the Y direction are horizontal directions, the X direction is a left-right direction viewed from the user U, and the Y direction is a front-rear direction and a depth direction. Also, a coordinate system and directions in the air floating video 3 are represented by (x, y, z). The x direction and the y direction are two orthogonal directions configuring a main two-dimensional plane of the air floating video 3, the x direction is a lateral direction (in other words, in-screen horizontal direction), and the y direction is a longitudinal direction (in-screen perpendicular direction). The z direction is a direction perpendicular to that two-dimensional plane and a front-rear direction regarding penetration, approach, and so forth of the hand finger UH. This air floating video display apparatus 1000 is mounted as part of, for example, the ATM apparatus at the bank.

In the present example, the air floating video 3 is formed in an oblique direction at the above-described angle C (FIG. 2) of about 45 degrees from a position on a front side of the housing 50 viewed from the user U. The user U visually recognizes the air floating video 3 through the eyepoint UP corresponding to the eye. In FIG. 17, the position of the eyepoint UP and the visual line direction of the user U correspond to the above-described optimum visual line direction LM (FIG. 10), and correspond to an optical axis a3. The user U performs operation such as touch operation on the air floating video 3 with the hand finger UH (in particular, fingertip Uf). FIG. 17 shows a state in which the fingertip Uf is in contact with, for example, a center position P1 of the air floating video 3. This position P1 can be represented as position coordinates (X, Y, Z) in space or position coordinates (x, y) in the coordinate system on the two-dimensional plane of the air floating video 3, and these are convertible.

The structure of FIG. 17 includes the fingertip tactile sense generator 6 as a mount example corresponding to the fingertip tactile sense generation portion 1230 of FIG. 1. This fingertip tactile sense generator 6 is provided as separate outside the main housing 50 of the air floating video display apparatus 1000. The fingertip tactile sense generator 6 includes a housing as separated from the housing 50, and that housing has, for example, a rectangular parallelepiped shape, a surface of which has a plane of output of an ultrasonic element array 61. Inside that housing, an ultrasonic signal generation circuit 62 and so forth are embedded. The ultrasonic signal generation circuit 62 is connected to a controller 10 through a wired or wireless signal line and communication. In the example of arrangement of FIG. 17, the fingertip tactile sense generator 6 is installed on a stand 52 (part of the housing 50 or an optional component) standing in a vertical direction at a position on a depth side in the Y direction on a stage 51 corresponding to the upper surface part or the outer frame of the housing 50.

Inside the main housing 50 (housing 1190 in FIG. 1), as the above-described components, the video display apparatus 1, the retroreflector 2, and so forth are housed and fixed. The video display apparatus 1 is configured of the light source 13, the liquid-crystal display panel 11, an absorption-type polarizing plate 12, and so forth. The retroreflector 2 is provided with a λ/4 plate 2b. Also in the present embodiment, the controller 10, a light-shielding member 120 are provided inside the housing 50. The light-shielding member 120 has a function as shown in FIG. 6 described above.

The controller 10 is a mount example of the component such as the control portion 1110 and the video control portion 1160 in FIG. 1, and can be mounted as a control board or the like. To the controller 10, the components such as the video display apparatus 1, the sensor 4, the camera 5, and the fingertip tactile sense generator 6 are connected via a signal line or communication. Note that the controller 10 may transmit and receive data by communication with an external apparatus (for example, server).

The sensor 4 is a mount example of the aerial operation detection sensor 1351 of FIG. 1, and, for example, a TOF sensor can be applied. As shown in the drawing, the sensor 4 is arranged at a position on a front side of the housing 50 in the Y direction, the position acquired by extending the plane of the air floating video 3. The orientation of the detection axis is parallel to the direction (y direction) of the plane of the air floating video 3. In the X direction, the sensor 4 may be arranged at center similarly to, for example, FIG. 11 described above, or two sensors may be arranged at, for example, left and right positions. The angle C in the present example formed by the air floating video 3 and the sensor 4 is about 45 degrees.

The camera 5 is a mount example of the imager 1180 of FIG. 1. As shown in the drawing, the camera 5 is installed at a position on a depth side of the housing 50 in the Y direction. One or more cameras 5 may be arranged in the X direction, and two left and right cameras may be particularly set to configure the stereo camera. The orientation of the camera 5 for the image capture is set so as to be able to capture an image of a face UF of the user U at an authorized position as indicated by an arrow with a dashed dotted line, and the image-capturing range (in other words, angle of view) is set as a range covering at least part of the air floating video 3 and the face UF.

Figure 18:
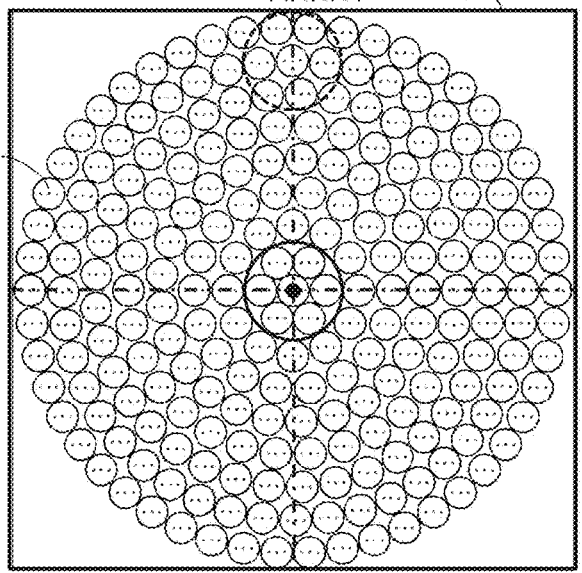
FIG. 18 shows a configurational example of the fingertip tactile sense generator which is a fingertip tactile sense generation portion in the air floating video display apparatus according to one embodiment.

The fingertip tactile sense generator 6 includes an ultrasonic element array 61 and the ultrasonic signal generation circuit 62, and is shown in detail in FIG. 18. As shown in FIG. 18, the ultrasonic element array 61 is an array with a plurality of ultrasonic elements 63 arrayed on a plane, and outputs an ultrasonic wave. The ultrasonic signal generation circuit 62 is a circuit which generates an ultrasonic driving signal c5 for driving the ultrasonic element array 61, based on control from the controller 10.

FIG. 17 shows a case in which phase-controlled ultrasonic waves (in other words, ultrasonic wave group) emitted from the ultrasonic element array 61 form a focal point based on sound pressure at a position (for example, position P1) at which the fingertip Uf of the user U touches the object on the plane (x-y) of the air floating video 3.

In the configurational example of FIG. 17, the path of the ultrasonic waves emitted from the ultrasonic element array 61 of the fingertip tactile sense generator 6 is a path causing the reflection on the transparent member 100. The ultrasonic wave group emitted from the ultrasonic element array 61 is once reflected on the surface of the transparent member 100, and forms the focal point at the position corresponding to the object of the air floating video 3 and the fingertip Uf as shown in the drawing. The ultrasonic wave is first obliquely emitted downward from the ultrasonic element array 61 as shown with an axis a4. The angle of this axis a4 is an angle similar to the angle A of an axis a1 of emission of video light emitted from the video display apparatus 1. Next, the ultrasonic wave is reflected (almost totally reflected) on the upper surface of the transparent member 100, and has a path in an obliquely upward direction as shown with an axis a5. The angle of this axis a5 is an angle similar to the angle B of an axis a2 of emission of video light emitted from the retroreflector 2. Then, the ultrasonic wave reaches the center position P1 of the air floating video 3 on the axis a5.

The axis a2 of the video light and the axis a5 of the ultrasonic wave are both set so as to be perpendicular to the plane of the air floating video 3 (angle α1=about 90 degrees). In this manner, in the present configurational example, the fingertip tactile sense generator 6 is arranged at the illustrated position outside the housing 50 so as not to block the optical path of the video light emitted from the retroreflector 2 and so forth in the housing 50. Also, in this configurational example, the ultrasonic wave emitted from the ultrasonic element array 61 is applied in an almost perpendicular direction from the back side of the air floating video 3. With this, the ultrasonic wave can be applied to the fingertip Uf of the user U in the perpendicular direction as shown with the axis a5, and a touch feeling can be more appropriately made than the case of application in a different direction.

Furthermore, in the present embodiment, the ultrasonic element array 61 is configured to be able to form, based on control, a region with relatively high sound pressure of the ultrasonic wave as the focal point. FIG. 17 shows a case in which the focal point of the ultrasonic wave is formed at the center position P1 of the air floating video 3. In the direction of the path (axis a4 and axis a5) of the emitted ultrasonic waves, the ultrasonic element array 61 can form the region with high sound pressure as the focal point at a predetermined distant position. The fingertip tactile sense generator 6 can variably control the position for formation of this focal point of the ultrasonic wave. That is, on a plane (x-y) of the air floating video 3, the focal point of the ultrasonic wave can be formed so as to match a desired region corresponding to the touch position of the fingertip Uf or the like. With this sound pressure of the ultrasonic wave, the sense of touch such as the touch feeling can be provided to the fingertip Uf when the user U performs touch operation.

The performance, position, orientation, and so forth of the ultrasonic element array 61 are designed so that the focal point with maximum sound pressure can be formed at a predetermined distant position on the path of the ultrasonic wave between the ultrasonic element array 61 and the air floating video 3. The predetermined distance is designed as a suitable distance based on the performance of the ultrasonic elements 63.

Also, the surface of the ultrasonic element array 61 is designed to have a size, shape, the number of elements, and so forth so as to be able to cover the formation of the focal point in all touch operable regions on the plane of the air floating video 3.

The camera 5 of the imager 1180 may be used for not only the above-described functions but also functions of detecting the approach of the user U to a predetermined position in front of the air floating video display apparatus 1000 by detecting, for example, the face of the user U. For example, predetermined control (for example, display of the air floating video 3, audio output, or the like) may start when the approach of the user U or the like to the predetermined position is detected based on the camera 5, and the predetermined control may stop when the leaving of the person from the predetermined position is detected based on that.

[Fingertip Tactile Sense Generation Portion]

FIG. 18 shows a configurational example of the fingertip tactile sense generator 6 corresponding to the fingertip tactile sense generation portion 1230. The ultrasonic element array 61 has an array structure in which the plurality of ultrasonic elements 63 are substantially equidistantly arranged on a plane so as to be able to generate ultrasonic waves in the vicinity of, for example, 40 kHz as a frequency. The number of ultrasonic elements 63 is set as N. For example, N=223. In the present example, as the ultrasonic element array 61, the plurality of (N=223) ultrasonic elements 63 are concentrically arranged to configure a circular array. An ultrasonic phased array is configured of this array of these ultrasonic elements 62. The ultrasonic phased array is an ultrasonic element array in which the position of the formation of the focal point of the ultrasonic wave is controllable.

Note that as the ultrasonic element array 61, the shape of array of the plurality of ultrasonic elements 63 is not only the concentric shape but also, for example, a square shape, a rectangular shape, a polygonal shape, or the like. Also, the arrangement of the plurality of ultrasonic elements 63 is set generally as a substantially equidistant arrangement without a gap, but is not limited to this and can be any arrangement.

An example of the ultrasonic element 63 (in other words, ultrasonic resonator) to be applied is MA40S4S produced by Murata Manufacturing Co., Ltd. In this configurational example of the ultrasonic element, piezoelectric ceramics is housed in a columnar case having a diameter of about 1 centimeter for each element, and two terminals protrude from the case (specifications of MA40S4S: 1639972367144_0.pdf)

As well known, the piezoelectric ceramics expands and contracts to change its shape when receiving a voltage applied thereto. By applying ultrasonic alternating voltage of, for example, 40 kHz as a frequency to the piezoelectric ceramics, the piezoelectric ceramics generates an ultrasonic wave at the frequency of that ultrasonic alternating voltage. As basic performance, when ultrasonic voltage of 10 V rms having a frequency of 40 kHz is applied between the above-described terminals, the case of MA40S4S serving as the ultrasonic element 63 used in the present embodiment can generate the sound pressure of about 120 dB at a position of 30 centimeters from an output side of the ultrasonic element 63.

Although will be described later, from the ultrasonic signal generation circuit 62, the phase (in other words, delay time) of an ultrasonic driving signal to be applied to the ultrasonic elements 63 is changed so that ultrasonic waves emitted from the respective ultrasonic elements 63 configuring the ultrasonic element array 61 mutually enhance or weaken each other. With this, a point with the strongest sound pressure of the ultrasonic wave can be formed at any point or in a small region on the ultrasonic element array 61. This any point on the ultrasonic element array 61 is equivalent to a position of the ultrasonic element 63 in a plane in which a coordinate system of the plane of the array as shown in FIG. 18 is taken as (Ax, Ay). For example, as a standard, a region including a center point indicated by a solid circle in the drawing can be set as the point with the strongest sound pressure (which corresponds to a region where the focal point is formed). Also, by the control for the ultrasonic driving signal c5, for example, a region (for example, an upper side in an Ay direction) indicated by a broken circle in the drawing can also be set. That is, in the example of FIG. 17, in the plane of the air floating video 3, for example, the above-described point with the strongest sound pressure can be formed as the focal point also at a position P2 on an upper side of the center position P1.

Also, by control for the ultrasonic driving signal c5, the fingertip tactile sense generator 6 can also form the above-described point with the strongest sound pressure as the focal point at a predetermined distant position on the path (axis a4 and axis a5) of the ultrasonic wave. In the example of FIG. 17, the above-described point with the strongest sound pressure can be set as the focal point at not only the position P1 in the plane of the air floating video 3 but also a position shifted to some extent forward or backward in the z direction.

The air floating video display apparatus 1000 (in particular, the controller 10) detects, based on the sensor 4, the touch position (in other words, fingertip position) on the plane of the air floating video 3 operated with the fingertip Uf of the user U, or the like. Then, the air floating video display apparatus 1000 controls output of the ultrasonic wave emitted from the fingertip tactile sense generator 6 so as to match that touch position or the like to form the above-described region with the strongest sound pressure in the vicinity of the fingertip Uf. As a result, the user U can feel the sound pressure based on the ultrasonic waves at the fingertip Uf at the time of touch operation. That is, the user U can acquire the texture as the touch feeling as if the user has touched any substance in air where there is actually nothing.

The ultrasonic signal generation circuit 62 of FIG. 18 has a circuit group for generating and supplying the ultrasonic driving signal c5 to the ultrasonic element array 61, based on control in the controller 10. This circuit group generates the ultrasonic driving signal c5 to be applied to each ultrasonic element 63 configuring the ultrasonic element array 61. For each ultrasonic element 63, the ultrasonic driving signal c5 is input from two terminals.

In an order from an input side to an output side, the circuit group of the ultrasonic signal generation circuit 62 includes an ultrasonic carrier signal generation circuit 621, a rectangular wave generation circuit 622, a phase shift circuit 623, an amplitude (AM) modulation circuit 624, and an inductance circuit 625. The ultrasonic carrier signal generation circuit 611 is an oscillation circuit which generates an ultrasonic carrier signal c1 with a frequency of, for example, 40 kHz. The generated ultrasonic carrier signal c1 is input to the rectangular wave generation circuit 612. The rectangular wave generation circuit 612 converts the ultrasonic carrier signal c1 into an ultrasonic carrier signal c2 serving as the rectangular wave. The ultrasonic carrier signal c2 serving as the rectangular wave output from the rectangular wave generation circuit 612 is input to the phase shift circuit 613.

The phase shift circuit 613 is a circuit which generates the ultrasonic carrier signals c3 as rectangular waves of an ultrasonic band having different phases of a plurality of types (for example, eight types). As a function, the phase shift circuit 623 is a circuit which generates signals for forming the sound pressure (focal point) corresponding to the fingertip position. Here, "having different phases" is synonymous with "having different delay times". That is, for example, the ultrasonic signals c3 of eight types are ultrasonic signals having eight delay times different from one another. For example, in N ultrasonic carrier signals c3 corresponding to N ultrasonic elements 63, each ultrasonic carrier signal c3 is a signal having one phase adopted based on control from among those phases of the plurality of types (for example, eight types). With this control of the phase or delay time, the above-described point with the strongest sound pressure can be formed at any point on the ultrasonic element array 61 or the like.

To the phase shift circuit 623 and the inductance circuit 625, sensor detection information b1 is input from an input terminal. The sensor detection information b1 is detection information made by the sensor 4 of FIG. 17 regarding the fact that the user U has performed the operation such as the touch on the object of the air floating video 3 or information resulted from processing made by the processor or the like based on that detection information. The sensor detection information b1 includes information about the position of the fingertip Uf in FIG. 17 and so forth, and includes, for example, the position coordinates (X, Y, Z) or (x, y) of the position P1. As the sensor detection information b1, the present example uses two-dimensional coordinates (x, y) of the position of the fingertip Uf in the case in which the air floating video 3 is of a two-dimensional plane.

The phase shift circuit 623 uses that sensor detection information b1 (such as fingertip position information) to perform control for the phase of the above-described ultrasonic signal, that is, control for changing the phase of the ultrasonic driving signal c5 to be input to each ultrasonic element 63. With this, regarding the ultrasonic wave group emitted from the entire ultrasonic element array 61, a signal for achieving the formation of the maximum sound pressure point (focal point) is generated to correspond to the touch position or the like. Specifically, the phase shift circuit 623 can be configured of, for example, a shift register. By changing the number of stages of the shift register, the above-described types of phase is not limited to eight types but can be any number of types.

The ultrasonic carrier signals c3 having the phases of the plurality of (eight) types output from the phase shift circuit 623 are input to the AM modulation circuit 624. As a function, the AM modulation circuit 624 is a circuit for superposing an audio signal on the ultrasonic carrier signals c3, and is a circuit which performs AM modulation of the ultrasonic carrier signals c3 based on the audio signal. To the AM modulation circuit 624, an audio signal b2 is input from an input terminal. The audio signal b2 is an audio signal for modulation for modulating the ultrasonic carrier signal c2. The AM modulation circuit 614 performs AM modulation of the ultrasonic carrier signal c3 based on the audio signal b2, and acquires a modulated signal c4 (modulated ultrasonic carrier signal).

The audio signal b1 input to the AM modulation circuit 624 is a signal for generating audio associated with the object on which the user U has performed operation such as a touch with the fingertip Uf on the air floating video 3. This audio is, for example, audio (for example, "one") of an audible band reading out a numeric character (for example, "1") displayed on a push button object. Also, this audio signal b1 may be an audio signal of a predetermined operation sound, error alert sound, or the like for notifying the user U that the object has been operated. Note that if and when there is no audio to be superposed on the ultrasonic wave, it is only required to turn input of the audio signal b1 OFF not to perform the process at the AM modulation circuit 624.

The modulated ultrasonic signal (modulated ultrasonic carrier signal) c4 output from the AM modulation circuit 624 is input to the inductance circuit 625. The inductance circuit 625 is a circuit configured of, for example, a coil or the like, and generates N ultrasonic driving signals c5 corresponding to the N ultrasonic elements 63 based on the modulated ultrasonic signal c4. The generated N ultrasonic driving signals c5 are supplied to the N ultrasonic elements 63 of the ultrasonic element array 61.

When the AM modulation circuit 624 performs the AM modulation based on the audio signal b1, the audio signal is superposed on the ultrasonic wave emitted from the ultrasonic element array 61. As a result, audio corresponding to the audio signal b1 is emitted from the vicinity of a location (for example, touched position P1) where the user U has operated the object of the air floating video 3 with the fingertip Uf. In other words, as a result of the contact of the ultrasonic wave with the fingertip Uf, an action of demodulating audio occurs. The audio emitted from that location basically propagates omnidirectionally to reach the ears UE of the user U. With this, when performing touch operation on the object, the user U can acquire the above-described touch feeling and can simultaneously hear the audio associated with the object from the vicinity of that object. From these, the user U can more reliably recognize that the touch operation on that object has been performed.

Figure 19:
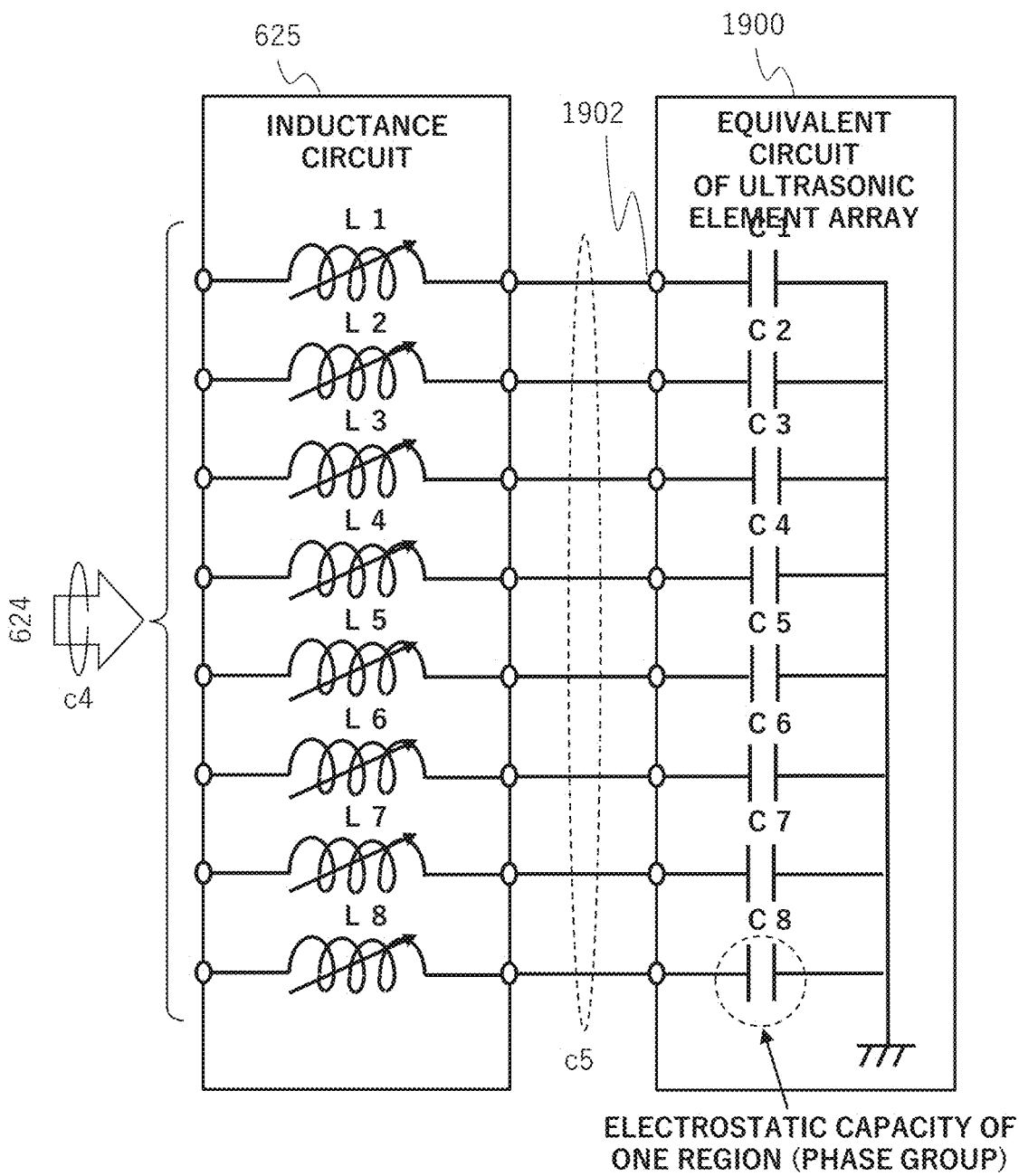
FIG. 19 shows a configurational example of an inductance circuit in the air floating video display apparatus according to one embodiment.

FIG. 19 shows one configurational example of the inductance circuit 625. FIG. 19 shows a configurational example in a case in which the ultrasonic driving signals c5 having the above-described phases of eight types are generated. The inductance circuit 625 is configured to have a plurality of inductances as variable-capacitance inductances, an inductance component of each of which is variable. Also FIG. 19 shows an example in which eight AM-modulated ultrasonic signals (modulated ultrasonic carrier signals) c4 having phases of eight types are input to the inductance circuit 625 configured of eight variable-capacitance inductances (L1 to L8).

Figure 20:
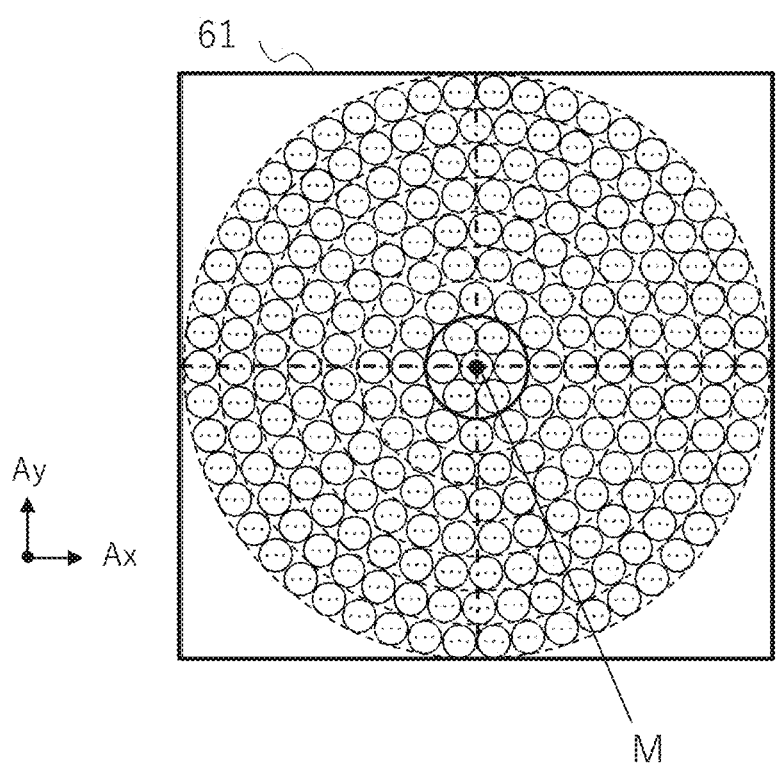
FIG. 20 shows a configurational example of a phase group on a surface of an ultrasonic element array in the air floating video display apparatus according to one embodiment.

Also, in the present example, the ultrasonic element array 61 is divided into eight regions based on the control for the above-described phases of eight types. FIG. 20 shows an example in which the surface of the ultrasonic element array 61 is divided into eight regions corresponding to the phases of eight types. In the present example, eight regions are concentrically formed while taking the center point of the array as a center. To the respective regions, the ultrasonic driving signals c5 of different phases are input. For each region (in other words, phase group), the adopted one phase is associated. For example, a center region indicated by solid lines becomes a region with the maximum sound pressure (point M), and there are other regions in which the closer to the outer periphery in a radial direction the region is, the lower the sound pressure is. For description, the plurality of ultrasonic elements 63 configuring a region for one phase group are also referred to as an ultrasonic element group, and the number of ultrasonic elements 63 configuring that group is taken as m. For example, the center region in the drawing has m=7.

Here, an inductance component of the inductance circuit 625 of FIG. 19 is taken as L, and a capacitance component obtained by multiplying the capacitance (for example, about 2400 pF/element) per one ultrasonic element 63 in the ultrasonic element array 61 by m which is the number of ultrasonic element groups configuring each of the above-described regions, is taken as C. Therefore, an LC resonant circuit is made of the inductance component L and the capacitance component C.

FIG. 19 shows that the capacitance components C1 to C8 corresponding to the eight regions of the above-described phases of eight types are as an equivalent circuit 1900 of the ultrasonic element group. FIG. 19 shows N signals as collected signal lines for each of the eight phase groups. The input terminal 1902 practically includes the above-described two input terminals for each ultrasonic element 63 of the phase group. The inductance circuit 625 has inductance components L1 to L8 connected to the capacitance components C1 to C8. In the present example, the respective inductance components L1 to L8 are adjusted so that the resonant frequency (taken as f) of the above-described LC resonant circuit is 40 kHz. As shown in the drawing, the resonant frequency f is determined by $1/\{2\pi\sqrt{(LC)}\}$. As a result, sine wave signals of 40 kHz of eight types having different phases are input as the ultrasonic driving signals c5 from the inductance circuit 625 to the ultrasonic element groups in the respective regions that are the divided eight regions configuring the ultrasonic element array 61.

Here, from the experiment conducted by the present inventors, as shown in FIG. 18, it has been verified that the ultrasonic phased array can be configured by the phase control on the ultrasonic elements 63 of the ultrasonic element array 61 in which N=223 ultrasonic elements 62 are concentrically arranged. By using the ultrasonic phased array based on this ultrasonic element array 61, the fingertip tactile sense generator 6 can form the point or the small region (taken as the point M, see, for example, FIG. 20) with the maximum sound pressure level of the ultrasonic wave in the region at any point on the array. More specifically, the phase control using the phase shift circuit 623 is made such that the phase is advanced when a distance between the point M and any ultrasonic element 63 configuring the ultrasonic element array 61 is large while the phase is delayed when the distance between the point M and that ultrasonic element 63 is small. By this method, the ultrasonic waves emitted from the respective ultrasonic elements 63 mutually enhance or, in contrast, weaken each other, and therefore, the region with the maximum sound pressure level of the ultrasonic wave can be formed as the focal point in the above-described region of the point M. As a more specific example of the sound pressure level, it has been verified that application of an ultrasonic signal of 10 V rms to each ultrasonic element 63 forms a sound pressure of about 0.6 gf (gram weight) at a position above and distant by about 20 cm from the ultrasonic element array 61 (perpendicular direction with respect to the plane on an output side, direction of the ultrasonic wave path). Note that this position distant by about 20 cm is one example corresponding to the performance or the like of the used element, and the position is not limited to this and can be designed. For example, when the sound pressure as similar to that described above is desired to be formed at a longer distance such as a position distant by 30 cm, it is only required to increase the voltage to be applied to the ultrasonic element 63 to voltages of about 17 to 18 V rms.

In the structure of FIG. 17, the standard position where the maximum sound pressure as described above is formed is designed to be a position aligned with the plane of the air floating video 3. With this, the user U can acquire a sufficient operation feeling as a touch feeling when performing touch operation on an object in the plane of the air floating video 3 with his/her own fingertip Uf. The touch operation is operation of making contact with an object by moving the fingertip Uf in the z direction to enter from the front to the depth of the plane of the air floating video 3.

In the present embodiment, when the AM modulation circuit 624 performs the AM modulation on the ultrasonic signal c3 by using the audio signal b2 (for example, the audio of reading out the numeric character), the audio can be emitted from a region in the vicinity of the above-described point M with the maximum sound pressure. In other words, from the vicinity of the fingertip Uf of the user U and the object, the audio signal is demodulated and the audio can be emitted as associated audio. According to this structure, when the fingertip Uf touches (in other words, is positioned at) the object formed by the air floating video 3 although there is practically nothing, the user U can acquire the texture as the touch feeling as if the fingertip Uf physically makes the contact. Besides, the user U can hear the audio associated with the above-described object emitted from the vicinity of the fingertip Uf. With this, the user U can more reliably recognize his/her own operation as the touch operation through both of the tactile sense and the audio.

Regarding the ultrasonic signal for each ultrasonic element 62 in the ultrasonic element array 61, the ultrasonic signal generation circuit 62 performs, based on the audio signal, the AM modulation on the ultrasonic signal of at least a part of the ultrasonic elements 63 corresponding to the regions where the sound pressure based on the ultrasonic wave is formed.

Note that it goes without saying that, when the audio signal b2 is not input to the AM modulation circuit 614, that is, when the AM modulation is not performed, no audio is emitted from the location where the above-described fingertip Uf is positioned. For example, in the touch operation on the object, the touch feeling can be generated by only the above-described sound pressure. In accordance with the contents of the object and so forth of the air floating video 3, in the controller 10, it is only required to set the audio signal b2 in association with the object and operation. Also, for example, when operation A (for example, touch) and operation B (for example, swipe) can be performed on an object A, control can be made such that audio A is emitted when the operation A is performed while audio B is emitted when the operation B is performed.

The ultrasonic signal generation circuit 62 of FIG. 18 is shown as an example of functional block structure based on an analog circuit. However, mounting is not limited to this. For example, the entire ultrasonic signal generation circuit 62 may be mounted by using a digital signal processing circuit. Also, each circuit portion may be mounted by using single or plurality of dedicated circuit. Furthermore, each circuit portion may be mounted by using software program processing.

[Air Floating Video]

Figure 21:
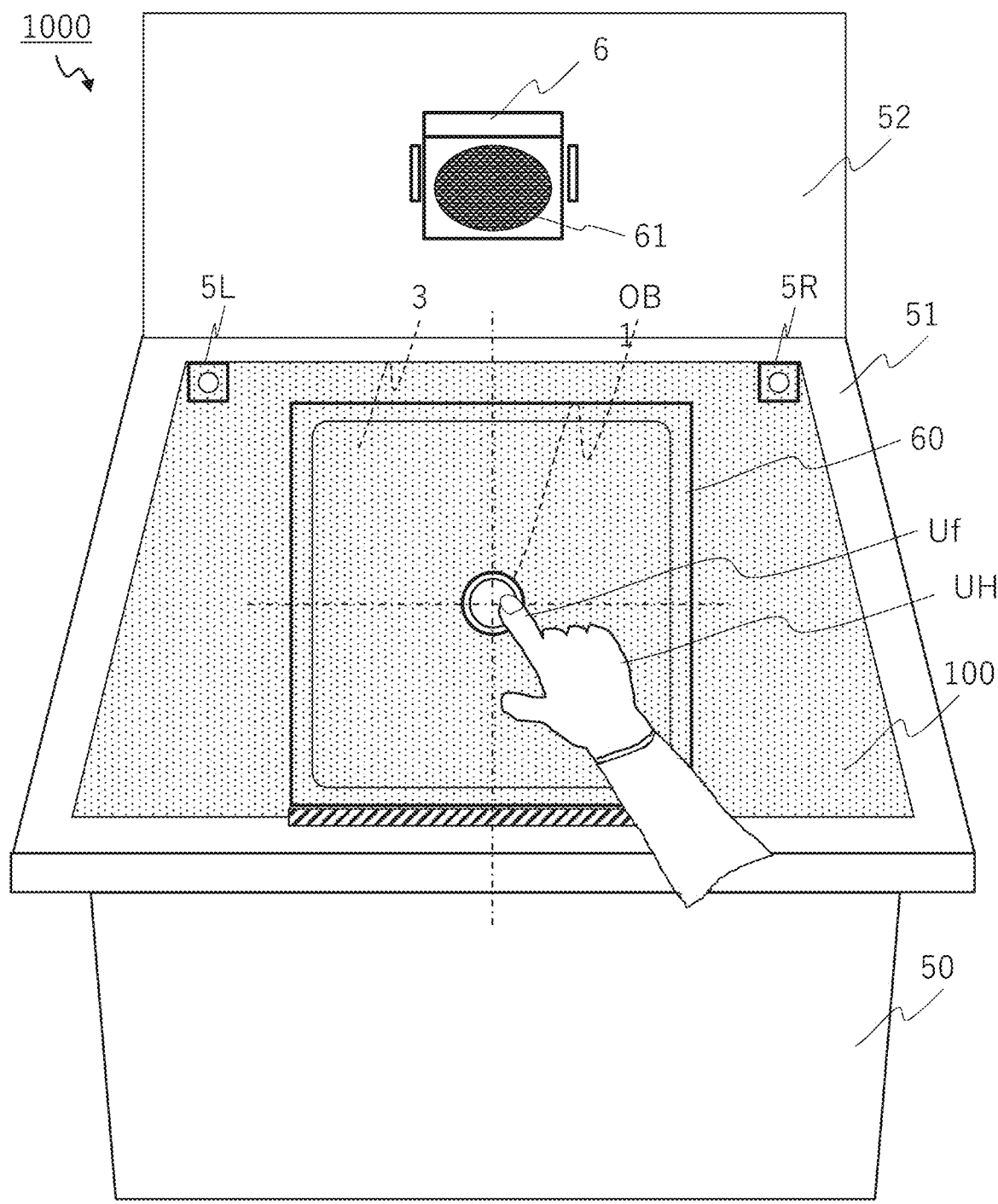
FIG. 21 shows a configurational example of the non-contact user interface based on the air floating video and an example of arrangement of the fingertip tactile sense generator and so forth in the air floating video display apparatus according to one embodiment.

FIG. 21 shows one example of a position relation between the air floating video 3 and the fingertip tactile sense generator 6 in the case of the air floating video 3 made by the air floating video display apparatus 1000 of FIG. 17 viewed from the visual point of the authorized user U. In FIG. 21, the fingertip tactile sense generator 6 is installed at the center position between left and right of the stand 52 (which has a plate shape in the present example, but the shape is not limited to this), and cameras (5L, 5R) are arranged at left and right positions. The linear sensor 4 is arranged at a position on a front side of the stage 51 of the housing 50, a frame-shaped transparent structure member 60 is fixed from obliquely above this position, and the air floating video 3 is formed in the surface of that transparent structure member 60.

In FIG. 21, an object OB1 is displayed as part of the air floating video 3. The object OB1 is displayed at, for example, the center position in the plane (x-y) of the air floating video 3. The object OB1 is, for example, a push button object, and is defined in advance as an object accepting touch operation (or tap operation). FIG. 21 schematically shows a state in which the user U touches the object OB1 with the index finger of the right hand used as the fingertip Uf.

As described above, the fingertip tactile sense generator 6 emits the ultrasonic wave from the ultrasonic element array 61 so that the maximum sound pressure is generated at the position of the fingertip Uf of the user U on the air floating video 3, that is, the touch position on the object OB1 by controlling the phase of the ultrasonic driving signal c5 to be input to each ultrasonic element 63 of the ultrasonic element array 61. As a result, the sound pressure of, for example, about 0.6 gf is generated on the fingertip Uf, and the user U can acquire a touch feeling at the fingertip Uf that is the touch position as if the user touches a substance.

The air floating video display apparatus 1000 of the present embodiment is configured to have a position relation between the air floating video 3 and the fingertip tactile sense generator 6 as shown in FIG. 17 and FIG. 21. With this, the fingertip tactile sense generator 6 can generate a touch feeling based on the ultrasonic wave on the fingertip Uf of the user U without blocking the optical path (such as axis a2) for generating the air floating video 3.

The position of touch between fingertip Uf of the user U and the object OB1 can be detected by the aerial operation detector 1350 of FIG. 1 based on signals emitted from the sensor 4 (aerial operation detection sensor 1351 of FIG. 1) and light-receiving signal as described above. The controller 10 recognizes information about the touch position (for example, position P1 in FIG. 17) and so forth output by that aerial operation detector 1350. The fingertip tactile sense generator 6 performs phase control for the output of the ultrasonic wave, based on the touch position coordinate information received from the controller 10. That is, as shown in FIG. 17, when the ultrasonic wave group output from the ultrasonic element array 61 is emitted toward the touch position, the focal point based on the sound pressure is formed at the touch position, and the touch feeling is generated on the fingertip Uf. On the main plane (x-y) of the air floating video 3 of FIG. 21, the touch feeling can be generated at any position by similar control.

Also, at generation of the touch feeling on the above-described object OB1, the controller 10 and the fingertip tactile sense generator 6 make input of a predetermined audio signal associated with the object OB1 as the audio signal b1 for modulation to be input to the AM modulation circuit 624 of FIG. 18 as described above. With this, since the audio signal is superposed on the ultrasonic wave group, predetermined audio is emitted from the vicinity of the touch position on the object OB1 touched with the fingertip Uf, and the user U can hear that audio.

The predetermined audio signal associated with the object OB1 may be, for example, the operation sound (such as "pop (pong)") indicating that the push button has been pushed, the audio (for example, "one") of reading out the numeric character (for example, "1") or the symbol written on the push button, guidance audio not written on the push button but associated therewith, or the like. With this, the user U can confirm operation on the object OB1 by not only the visual check but also the audio.

[Combined Use of Fingertip Tactile Sense Generator and Super-Directive Loudspeaker]

Figure 22:
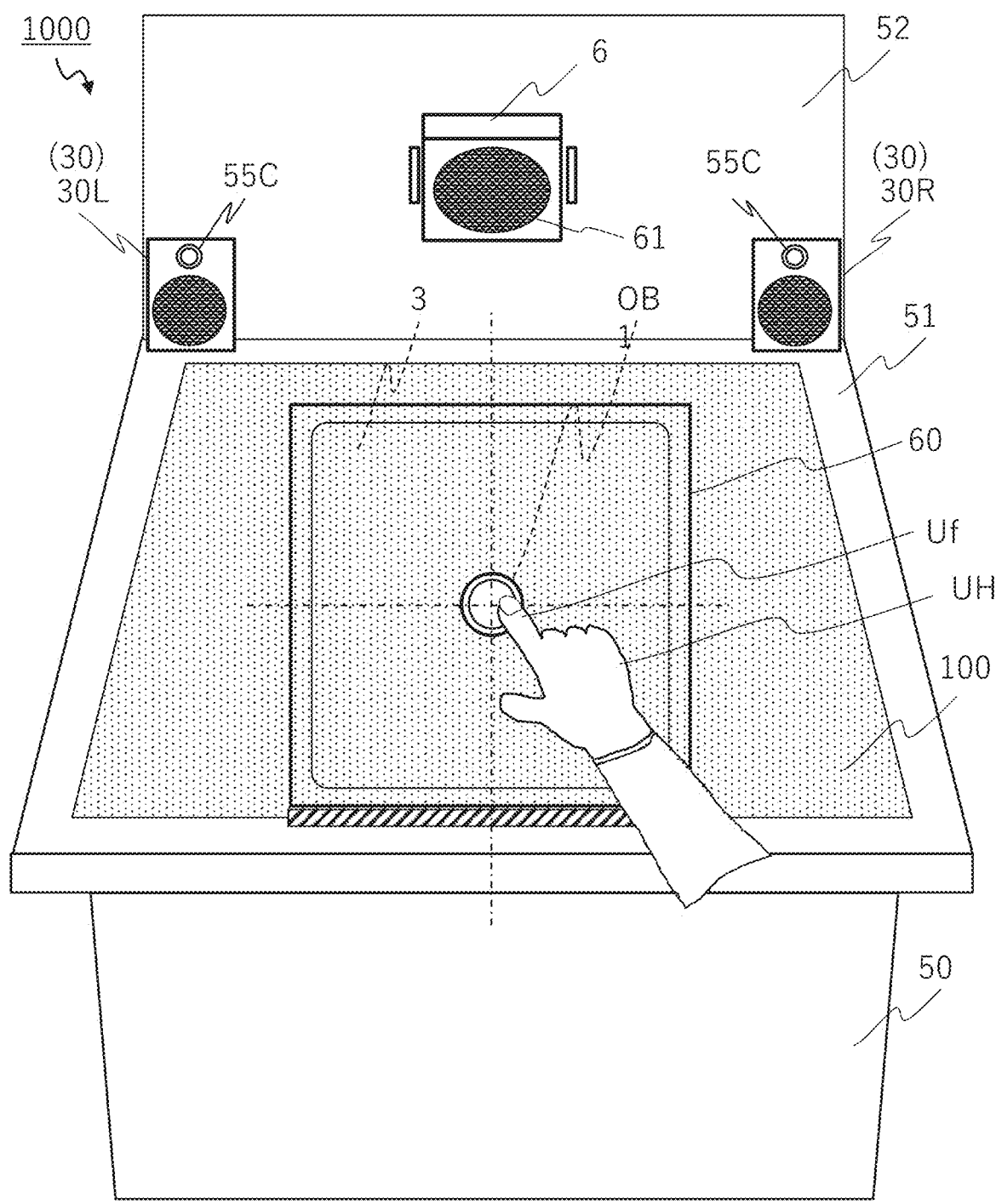
FIG. 22 shows a configurational example of the non-contact user interface based on the air floating video and another example of arrangement of the fingertip tactile sense generator and so forth in the air floating video display apparatus according to one embodiment.

As a modification example of the above-described embodiment, a combined use mode of both of the fingertip tactile sense generator 6 of FIG. 17 and so forth and the super-directive loudspeaker 30 of FIG. 13 and so forth is also applicable. FIG. 22 shows an example of installation of the fingertip tactile sense generator 6 and the super-directive loudspeaker 30 in this combined use mode. In the present example, in addition to the structure of the fingertip tactile sense generator 6 similar to that of FIG. 21, left and right super-directive loudspeakers 30L and 30R similar to those of FIG. 13 are provided.

The controller 10 controls generation of a tactile sense and audio made by the fingertip tactile sense generator 6 and generation of audio made by the super-directive loudspeaker 30, based on detection of the state of the hand finger UH at the sensor 4 and detection of the face or the like at the camera (camera 55C). With combined use of these, for example, the user U can acquire a touch feeling on the fingertip Uf, and only the user U can hear the audio associated with the object OB1 as the audio emitted from the super-directive loudspeaker 30 (30L, 30R) while a different person in the vicinity of the user U cannot hear that audio. The above-described combined use mode is particularly effective when being applied to a system with high confidentiality, for example, to the ATM apparatus or the like.

Furthermore, the above-described combined use mode may be applied to a system not requiring such high confidentiality, for example, to a ticket vending machine at a station or the like. In that case, for example, a station name selection button or the like is set as the object of the air floating video 3, and a station name audio is set as the audio associated with that object. When the user U performs touch operation on a station name button of his/her destination, audio of that station name is output. As a method of outputting audio of this object, the audio may be output by the fingertip tactile sense generator 6, or the audio may be output by the super-directive loudspeaker 30. In particular, when the super-directive loudspeaker 30 is used, there is no risk that information about that station name and so forth is heard by the different person around the user U, and the ticket vending machine system in consideration of privacy can be configured.

Examples of control of combined and selective use of two apparatuses that are the fingertip tactile sense generator 6 and the super-directive loudspeaker 30 are exemplified below.

First Example: When the user U is informed of any audio, the super-directive loudspeaker 30 is turned ON for use. At that time, output of audio by the ultrasonic element array 61 is turned OFF and is not used.

Second Example: In accordance with the type of audio to be output to the user U, either one of output by the super-directive loudspeaker 30 and output of audio by the ultrasonic element array 61 is selectively used. For example, either one of them is selectively used in accordance with a level of confidentiality of target audio. When audio of a type with confidentiality to be high (for example, audio for passcode or the like) is output, the super-directive loudspeaker 30 is used. When audio of a type with confidentiality not required to be high (for example, operation sound or the like) is output, the ultrasonic element array 61 is used.

Also, even in the above-described combined use mode, when outputting the audio to the user U by using the super-directive loudspeaker 30, the air floating video display apparatus 1000 detects the face position and so forth by using the camera 5 of the imager 1180, and performs control of outputting the audio from the super-directive loudspeaker 30 toward the detected face position. With this, effects regarding the super-directive loudspeaker 30 are enhanced more.

[Effects of Fourth Example and so Forth]

As described above, the air floating video display apparatus 1000 of the embodiment (fourth example) includes the following effects. The user U who visually recognizes and operates the air floating video 3 serving as the non-contact user interface can more reliably visually recognize the object such as a push button based on the air floating video 3 without ghost images. Furthermore, when performing touch operation on that object, the user U can acquire a touch feeling that is nearly touching on the physical button. Furthermore, when performing touch operation on that object, the user can hear audio associated with that object, emitted from the vicinity of the fingertip. The embodiment can provide a non-contact user interface with the minimized risk of contact infection, the excellent visual recognition and operability, and being capable of reducing erroneous operation and erroneous input.

According to the air floating video display apparatus of the embodiment, video information with high resolution and high luminance can be displayed as the air floating video while floating in air. In particular, when this air floating video is used as the non-contact user interface including the object such as the push button, the user can easily perform operation without concern about contact infection to the physical button and so forth, and, furthermore, can acquire the texture as if the user has touched the physical button (such as a touch feeling) when the fingertip has touched the object displayed as the air floating video. Still further, when touching that object such as the push button, the user can hear the audio for the numeric character or the like associated with that object from the fingertip and the vicinity of the object. Because of these, it is possible to prevent and reduce the erroneous input or the like onto the air floating video by the user.

According to the air floating video display apparatus of the embodiment, in the case of the display of the object such as the push button as the air floating video 3 and the usage of it as the non-contact user interface, when the user U touches the object, a touch feeling can be generated on the fingertip by the fingertip tactile sense generation portion 1230. Although the object of the air floating video 3 can be visually recognized by the user U, there is practically no substance other than air at that position, and it is difficult to acquire an actual feeling of operation. According to the embodiment, however, when the user U touches such an object, the user U can sense the texture as if the user touches the substance, and can recognize that the touch operation has been exactly performed (in other words, the apparatus side accepts it as touch operation and input) through both of the visual sense and the tactile sense. Therefore, a non-contact user interface excellent also in information confidentiality or the like and more suitable than the related art can be achieved.

Furthermore, according to the embodiment, when a non-contact user interface is used, the ultrasonic signal is modulated based on the audio signal by using the fingertip tactile sense generator 6 to superimpose the audio associated with the object on the ultrasonic signal. With this, when the user U touches the object, in addition to generation of a touch feeling, audio associated with the above-described object can be heard from the vicinity of the fingertip Uf. That is, at operation on the object of the air floating video 3, the user U can recognize that the operation has been exactly performed, through the visual sense, the tactile sense and the auditory sense. Therefore, a more suitable non-contact user interface can be achieved.

The air floating video display apparatus of the embodiment and the air floating video based on it can be applied as a non-contact user interface including various applications such as ticket issuing, acceptance, authorization, and payment in systems used by a large number of unspecified users, such as public facilities such as station, government offices and hospitals, facilities such as banks and department stores, apparatuses such as cash registers and elevators, and so forth. As one example of GUI objects, a push button indicating a station name, passcode, or a destination floor is exemplified. The embodiment can be applied to not only the button but also similarly various objects such as a slide bar. The user does not need to touch a physical panel or button with the fingertip because of this non-contact user interface, and therefore, the risk of contact infection can be minimized, and the applications can be used without the concern. In addition, visual recognition and operability of the non-contact user interface based on the air floating video can be improved more than those of the related art.

Also, the air floating video display apparatus of the embodiment includes the video display apparatus 1 as the video source and the retroreflector 2, and the diffusion angle of video light emitted toward outside is decreased, that is, made as an acute angle. Furthermore, waves are made uniform to specific polarized waves, and therefore, only the regular reflected light is efficiently reflected toward the retroreflector 2. Thus, this air floating video display apparatus has high efficiency of utilization of light, can significantly reduce the occurrence of ghost images occurring in addition to the principal air floating video, which is a problem in the conventional retroreflective scheme, and can provide a clear air floating video. Also, this air floating video display apparatus includes the video display apparatus 1 including the unique light source 13. With this, a novel air floating video display apparatus capable of significantly reducing electric power consumption and excellent in usability can be provided.

Modification Example of Fourth Example

As various modification examples regarding embodiments of the above-described fourth example, the following examples are also applicable.

Figure 23:
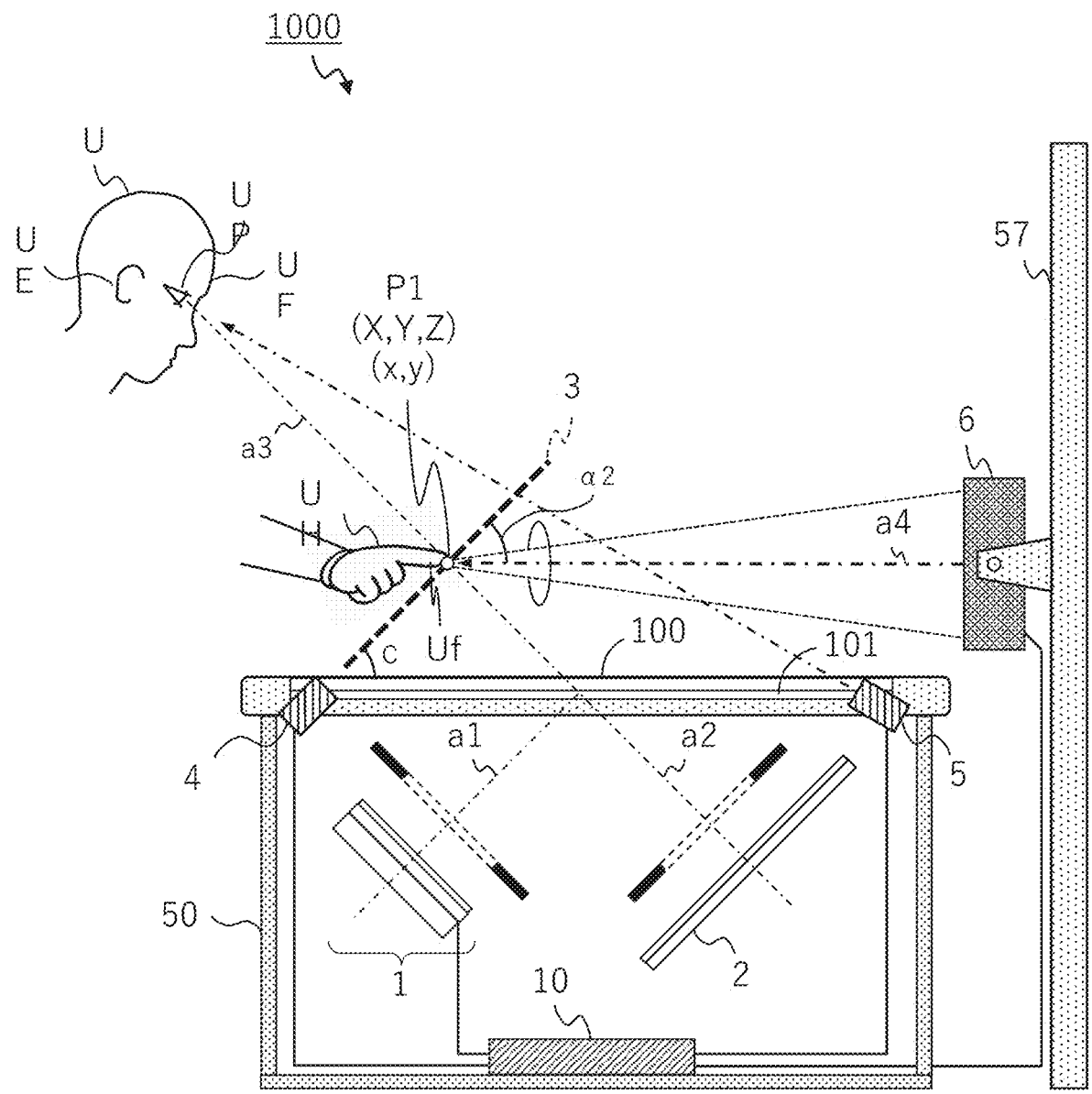
FIG. 23 shows another example of arrangement of the fingertip tactile sense generator in the air floating video display apparatus according to one embodiment.

FIG. 23 shows the structure of the air floating video display apparatus 1000 of a modification example viewed from a side surface. This modification example is different from the structure of FIG. 17 in a structure in which the path of output of the ultrasonic wave from the fingertip tactile sense generator 6 is not of the above-described reflective type but as a straight path in a horizontal direction so as to form the focal point at the fingertip Uf from the back side of the air floating video 3. Also in the present example, the fingertip tactile sense generator 6 is separated from the housing 50, and is installed on a wall 57 (or a surface of another apparatus or the like) at the back of the air floating video display apparatus 1000. The plane of output of the ultrasonic element array 61 is in the vertical direction, and the axis a4 of output of the ultrasonic wave is in the horizontal direction. Also with this structure, the path of the ultrasonic wave does not overlap the path (such as axis a2) of video light emitted from the retroreflector 2 or the like in the housing 50, and is designed not to block the path.

Also in this structure, the angle of irradiation with the ultrasonic wave (in particular, focal point of sound pressure) on the plane (x-y) of the air floating video 3 is, for example, about 45 degrees as shown with the angle α2. Also with this structure, sound pressure can be formed on the fingertip Uf, and therefore, a touch feeling and so forth can be sufficiently provided.

As another modification example, the ultrasonic element array 61 and so forth may be provided in the housing 50. In that case, the ultrasonic element array 61 is arranged so as not to block the components such as the retroreflector 2 in the housing 50. Also in that case, the path of the ultrasonic wave from the ultrasonic element array 61 is required to reach the surface of the air floating video 3 arranged outside without hitting the transparent member 100 and so forth. Thus, for example, a part of the housing 50 or the transparent member 100 is provided with an opening or the like which transmits the ultrasonic wave.

Figure 24:
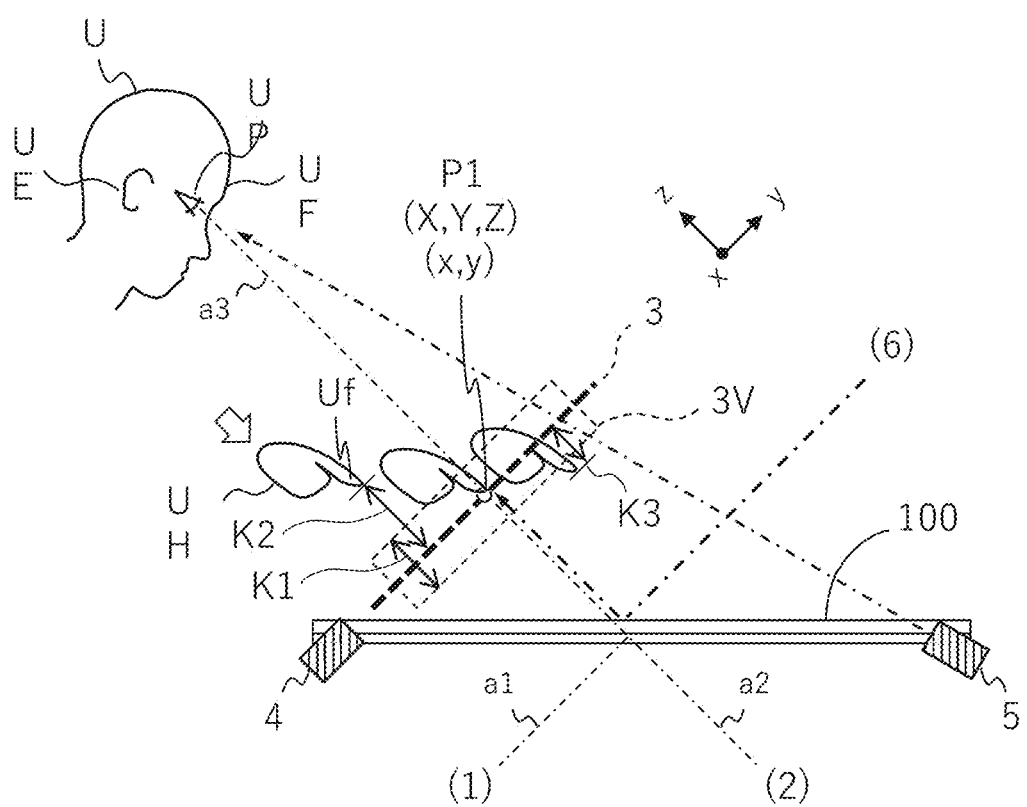
FIG. 24 shows an example of operation on the air floating video in the air floating video display apparatus according to one embodiment.

FIG. 24 shows a state of the air floating video 3 and so forth viewed from a side surface in another modification example. In this modification example, as operation on the air floating video 3 and an object, not only touch operation but also any of various operations is accepted. FIG. 24 shows an air floating video region 3V as a three-dimensional region extended to the outside of the main plane (x-y) of the air floating video 3 while including the main plane. The air floating video region 3V is, for example, a region having a predetermined distance K1 forward and backward in the z direction perpendicular to the plane.

The air floating video display apparatus 1000 accepts various operations with the hand finger UH of the user U on this air floating video region 3V. The air floating video display apparatus 1000 detects a position of the hand finger UH and a state such as movement thereof, based on sensing by the sensor 4, the camera 5, and so forth, and determines various operations. The sensor 4 and so forth detect a state of operation including a three-dimensional position and motion of the hand finger UH on the plane of the air floating video 3 or the air floating video region 3V.

For example, when the hand finger UH of the user U approaches to a front side of the plane of the air floating video 3, a distance between the fingertip Uf and the plane of the air floating video 3 in the z direction is, for example, a distance K2. Also, for example, when the hand finger UH of the user U penetrates in a depth side of the plane of the air floating video 3, a distance between the fingertip Uf and the plane of the air floating video 3 in the z direction is, for example, a distance K3. The controller 10 measures such a distance in a predetermined range of the air floating video region 3V to acquire position coordinates (X, Y, Z) of the fingertip Uf in space. Also, the controller 10 can recognize the movement of the hand finger UH and so forth by acquiring its position at each time point in series.

Operations with the hand finger UH include not only touch operation and tap operation but also swipe operation, flick operation, pinch operation, and so forth. For example, in application to the swipe operation on the object, it is only required to control the position of formation of the focal point based on the ultrasonic wave, based on the position of movement of the fingertip Uf in the x direction and the y direction by the swipe operation. These examples of operation correspond to existing operations on a touch panel, but are not limited to the operations, and any operation (such as a gesture) can be defined. As the operations with the hand finger UH, not only operations with one finger but also operations with two fingers or with the entire hand, and so forth are applicable. As the substance to operate the air floating video 3, not only the hand finger UH but also a substance such as a pen held by the hand finger UH are also applicable (although this case cannot generate the texture on the fingertip).

Also, when operation on the air floating video region 3V as described above is accepted, as the control for the formation of the focal point based on the ultrasonic wave emitted from the fingertip tactile sense generator 6, not only the control of the direction in the above-described plane (x-y) but also control in the z direction perpendicular to the plane are applicable. For example, at touch operation on an object, when the fingertip Uf penetrates to the depth in the air floating video region 3V, the focal point based on the ultrasonic wave may be formed in accordance with the position of the distance at that time. Based on the above-described phase control, movement of the focal point in the z direction is applicable.

Also, in still another modification example, as an example of another operation and control, even when a state in which the hand finger UH is not contact with but sufficiently close to the principal plane of the air floating video 3 is detected, it may be determined that predetermined operation such as touch operation has been performed to generate the texture as the sense of touch.

<Optimization of Diffuse Property of Air Floating Video Display Apparatus>

Next, detailed structure, properties and the like of the video display apparatus and so forth applicable to the air floating video display apparatus of each embodiment described above will be described. A case of use of a large liquid crystal display panel as the liquid crystal display panel of FIG. 2 may adopt a structure in which the liquid crystal display panel is directed inward so that the light on the periphery of the screen is directed toward the user ('s eyes) when the user faces the center of the screen. With this, a full-screen performance in terms of the screen brightness is improved.

Figure 25:
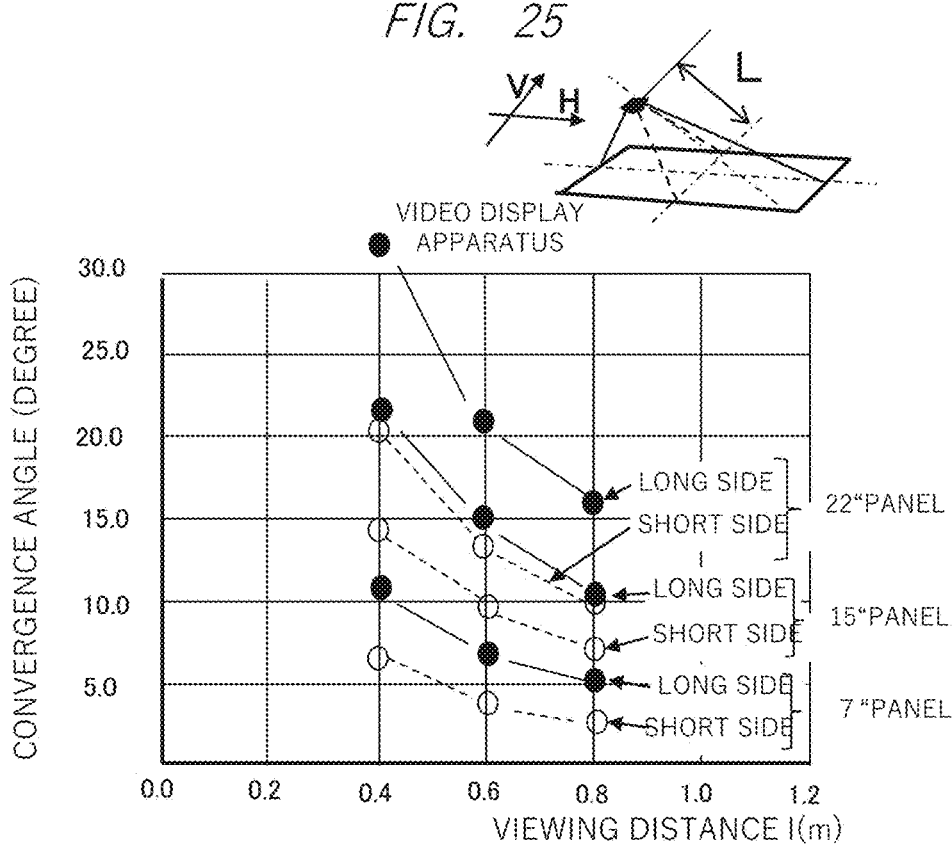
FIG. 25 is a descriptive diagram regarding light source diffuse property of a display apparatus in one embodiment.

FIG. 25 shows a graph of a list of a convergence angle made by a long side of the panel and a short side of the panel when a view distance L from the panel to the user and a panel size (screen ratio (16:10)) taken as a parameter. In the viewing case using the screen in vertically-long use, the convergence angle may be set to match with the short side. For example, in the viewing case of the vertically-long use of the 22-inch panel when the view distance is 0.8 m, if the convergence angle is set to 10 degrees, the video light emitted from four corners of the screen can be effectively directed toward the user.

Similarly, in the viewing case of the vertically-long use of the 15-inch panel when the view distance is 0.8 m, if the convergence angle is set to 7 degrees, the video light emitted from four corners of the screen can be effectively directed toward the user. As described above, depending on the size of the liquid crystal display panel or whether the use is the vertically-long use or the horizontally-long use, the video light on the periphery of the screen is directed toward the user at the optimal position for viewing the center of the screen, and, as a result, the full-screen performance in terms of the screen brightness can be improved.

Figure 26:
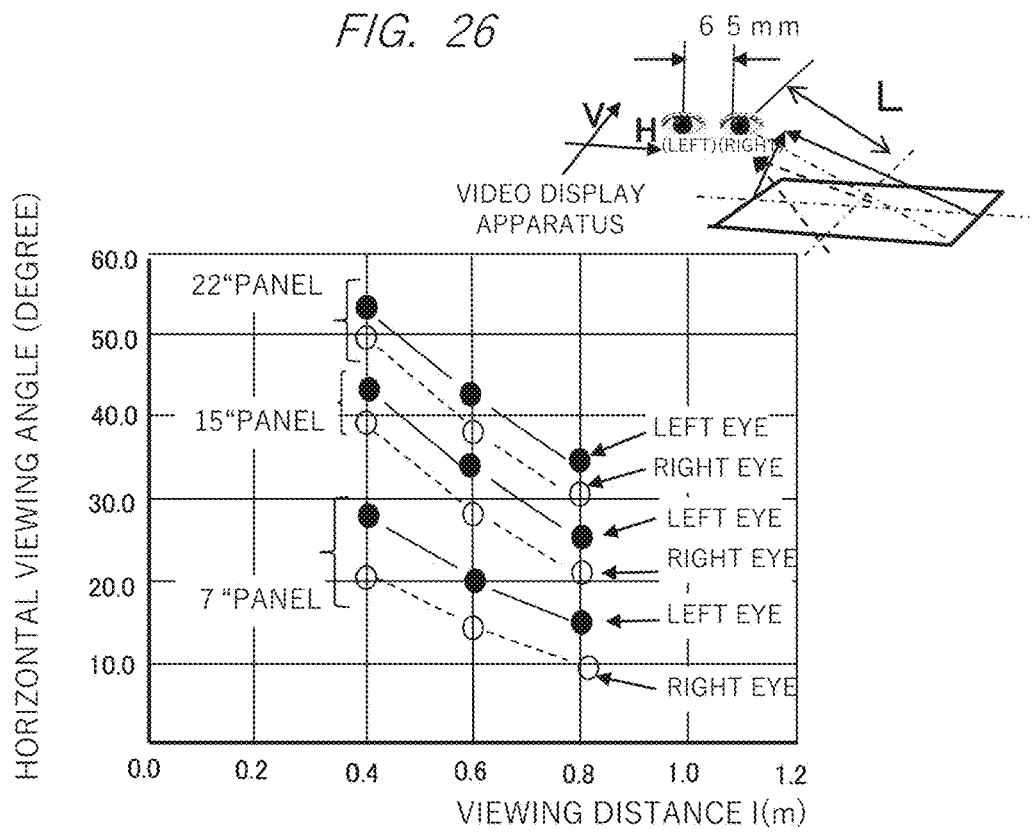
FIG. 26 is a descriptive diagram regarding light source diffuse property of the display apparatus in one embodiment.

Next, as described above, the liquid crystal display panel 11 is directed inward so that the light on the periphery of the screen is directed toward the user when the user faces the center of the screen. Further, when an average value of a distance between both eyes of an adult is set to 65 mm, luminance difference of the air floating video in a screen horizontal direction generated in parallax between left and right eyes is acquired while the view distance is used as the parameter. Its results are shown in FIG. 26. When the shortest view distance in general use is set to 0.8 m, a light source may be used for difference in brightness due to the parallax, the light source having a property not allowing a relative luminance to be equal to or lower than 50% at 12 degrees that is total of the view angle difference (5 degrees) and the convergence angle (7 degrees) on the long side shown in FIG. 25.

The short-side direction of the air floating video display apparatus can be handled by shifting the visual line of the user, and therefore, the full-screen performance of the screen brightness is improved by taking action on the luminance difference based on the parallax in the long-side direction having the tougher condition.

<Reflection-Type Light Polarizer>

In a reflection-type light polarizer having a grid structure of an embodiment (such as a reflection-type light polarizer configuring the polarization splitter 101 of FIG. 2), the property for the light in the direction vertical to the light polarization axis decreases. Therefore, the reflection-type light polarizer is desirable to have specifications along the light polarization axis, and the light source 13 of the present example capable of emitting the video light at the narrow angle emitted from the liquid crystal display panel 11 is an ideal light source. For the light in the oblique direction, the property in the horizontal direction similarly decreases. In consideration of the above-described properties, a configurational example of the present example adopts the light source 13 capable of emitting the video light at the narrow angle emitted from the liquid crystal display panel 11 as a backlight of the liquid crystal display panel 11. In the manner, the air floating video with the high contrast can be provided. The present structure example will be explained below.

<Display Apparatus>

Figure 27:
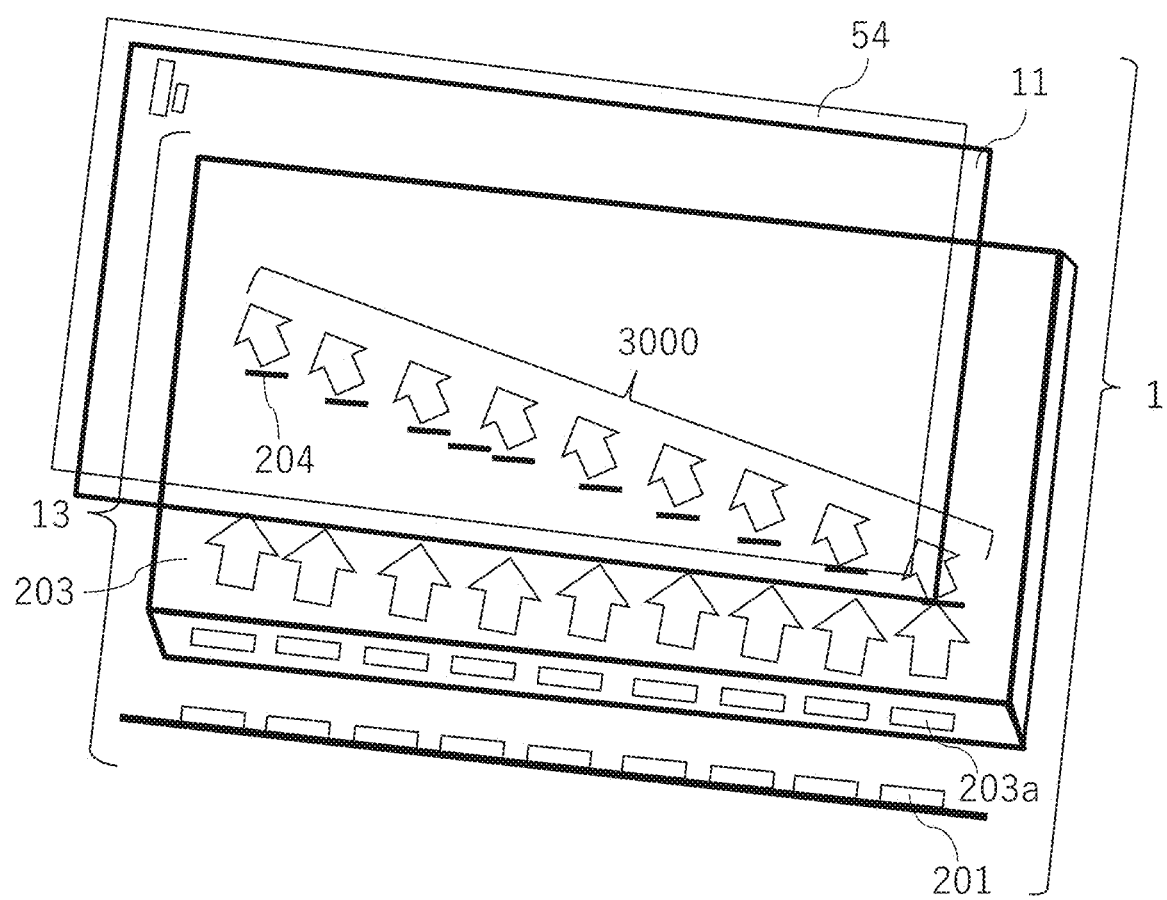
FIG. 27 shows a configurational example of the display apparatus in one embodiment.

An example of structure of the display apparatus 1 will be explained with reference to FIG. 27. This display apparatus 1 includes the liquid crystal display panel 11 serving as the video display component and the light source 13 configuring its light source. FIG. 27 shows the light source 13 together with the liquid crystal display panel 11 in an exploded transparent view. As shown with a direction of an arrow 3000, in this liquid crystal display panel 11, the luminous flux having the narrow-angle diffuse property, that is the illumination luminous flux having the property similar to the laser beam having the intense directionality (in other words, rectilinear propagation) and the unidirectionally-equalized light polarization surface is formed from the light emitted from the light source 13 that is the backlight apparatus. The video light modulated in accordance with the input video signal is emitted based on the luminous flux from the liquid crystal display panel 11. Then, the video light is reflected by the retroreflector 2 and is transmitted through the transparent member 100, and the air floating image 3 is formed as the actual image.

The display apparatus 1 of FIG. 27 is configured to include not only the liquid crystal display panel 11 but also a light-direction converting panel 54 for controlling the directionality of the luminous flux emitted from the light source 13, and a narrow-angle diffuse plate (not illustrated) as necessary. In other words, the light polarizer is arranged on both surface of the liquid crystal display panel 11 to modulate the light intensity of the video light of the specific polarized wave in accordance with the video signal, and the light is emitted (see the arrow 3000). In this manner, a desirable video is projected as the light of the specific polarized wave having the high directionality to the retroreflector 2 through the light-direction converting panel 54, and is reflected by the retroreflector 2, and then, is transmitted toward eyes of the user, and forms the aerial floating video 3.

Figure 28:
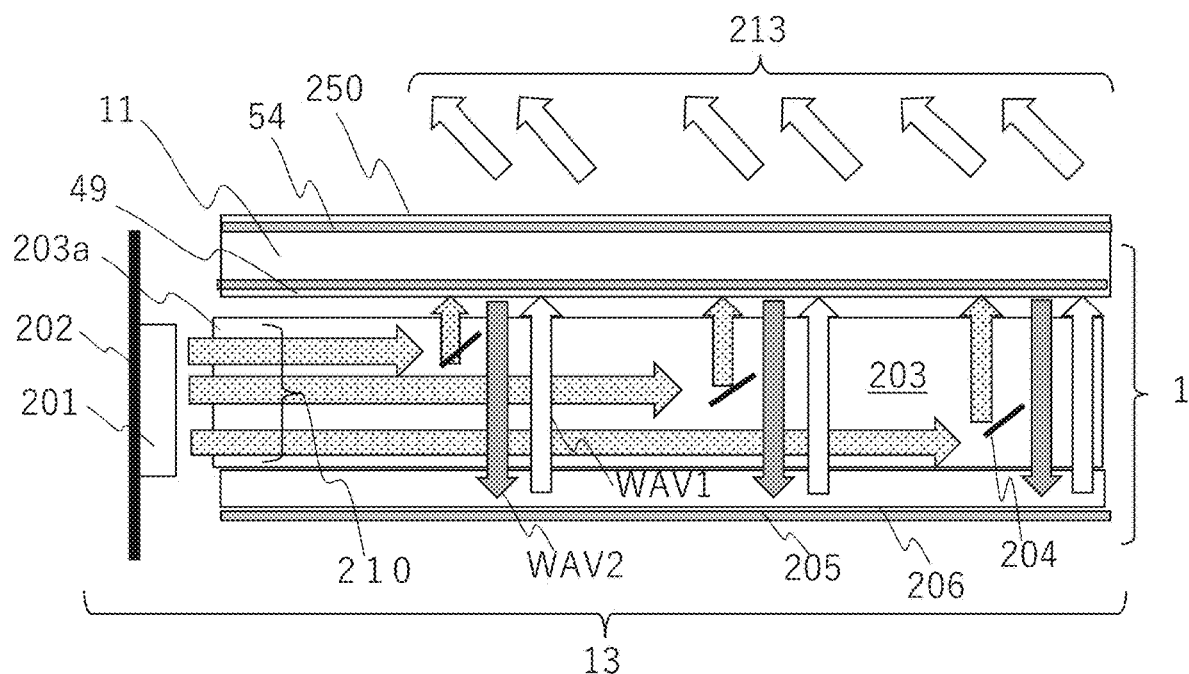
FIG. 28 is a cross-sectional view illustrating a configurational example of a light source in one embodiment.
Figure 29:
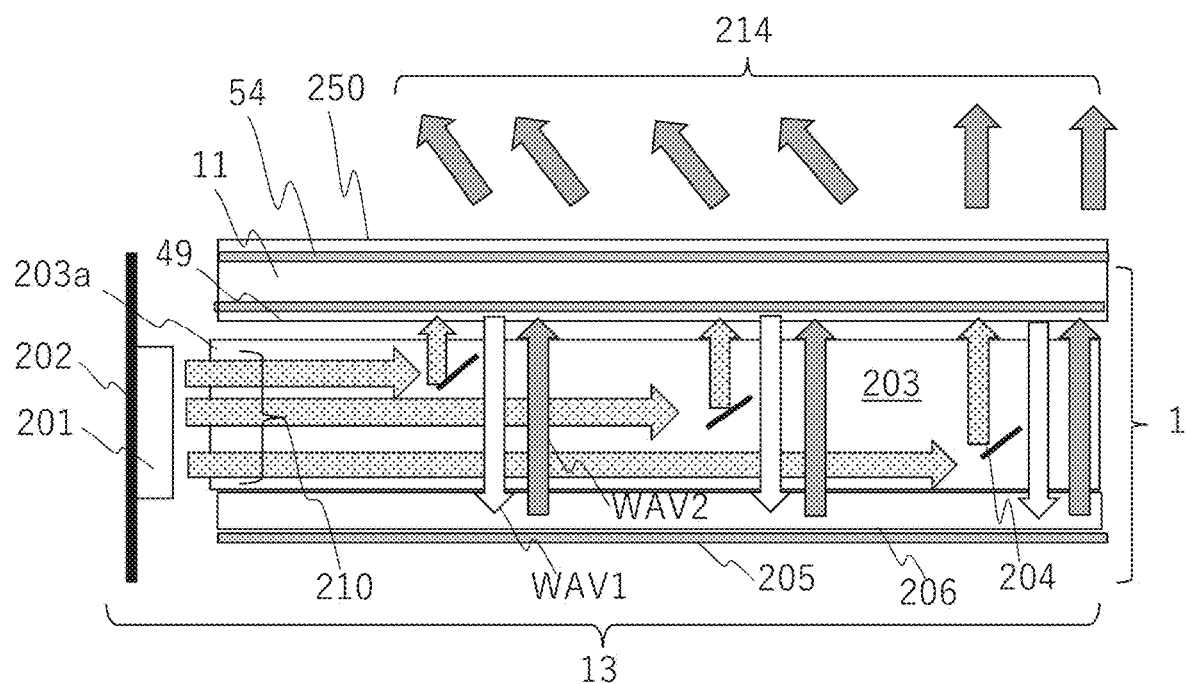
FIG. 29 is a cross-sectional view illustrating a configurational example of the light source in one embodiment.

Note that a protection cover 250 as shown in FIGS. 28 and 29 may be arranged on a surface of the light-direction converting panel 54.

In the present embodiment, in order to improve the use efficiency of the luminous flux (the arrow 3000) emitted from the light source 13 to significantly reduce the power consumption, in the display apparatus 1 configured to include the light source 13 and the liquid crystal display panel 11, the light (the arrow 3000) emitted from the light source 13 can be projected toward the retroreflector 2, and can be reflected by the retroreflector 2, and then, the directionality can be also controlled to form the air floating video at the desirable position by using a transparent sheet (not illustrated) arranged on the surface of the transparent member 100. Specifically, when this transparent sheet is made of an optical component such as a Fresnel lens and a linear Fresnel lens, the forming position of the air floating video can be controlled with the high directionality. In this manner, the video light emitted from the display apparatus 1 and having the high directionality such as laser beam efficiently reaches the user. As a result, the high-quality air floating video with the high resolution can be displayed. Also, the power consumption of the display apparatus 1 including the LED element 201 of the light source 13 can be significantly reduced.

First Structure Example of Display Apparatus

As described above, FIG. 27 shows an example of a specific configuration of the display apparatus 1. FIG. 28 is a cross-sectional view showing an example of specific structure of the light source 13 of FIG. 27 (corresponding to the light source 1105 of FIG. 1). As shown in FIG. 28, the liquid crystal display panel 11 and the light-direction converting panel 54 are arranged above the light source 13 of FIG. 27. This light source 13 made of, for example, plastic or others is formed on a case shown in FIG. 27, and is configured to house an LED element 201 and a light guiding body 203 (corresponding to the light guiding body 1104 of FIG. 1) therein. As shown in FIG. 28 and others, in order to convert the diffuse light emitted from each LED element 201 to be substantially collimated luminous flux, an end surface of the light guiding body 203 has a lens shape, a cross-sectional area of which gradually increases toward a surface facing the light receiver and having a function of making the diffuse angle gradually small through a plurality of total reflections in internal propagation. The liquid crystal display panel 11 is attached onto an upper surface of the light guiding body 203. The LED element 201 that is a semiconductor light source and an LED board 202 on which a control circuit for the LED element 201 is mounted may be attached to one side surface (in this example, a left end surface) of the case of the light source 13. Note that a heat sink that is a member for cooling the heat generated in the LED element and the control circuit may be attached to an outer surface of the LED board 202.

To a frame (not illustrated) of the liquid crystal display panel 11 attached to an upper surface of the case of the light source 13, the liquid crystal display panel 11 attached to this frame, a flexible wiring board (FPC not illustrated) electrically connected to this liquid crystal display panel 11 and others are attached. In other words, the liquid crystal display panel 11 that is the liquid crystal display component generates the display video in corporation with the LED element 201 that is a solid light source by modulating an intensity of the transmission light on the basis of a control signal output from a control circuit (not illustrated) configuring the electronic device. In this case, the generated video light has the narrow diffuse angle, and is made of only the specific polarized wave component, and therefore, a novel video display apparatus that is approximately a surface emission laser video source driven based on the video signal and that is different from the related art can be provided. Currently, note that it is technically and safely impossible to cause a laser apparatus to provide the laser luminous flux having the same size as that of the image provided by the display apparatus 1. Accordingly, in the present embodiment, the light that is approximately the surface emission laser video light is formed from the luminous flux emitted from, for example, a general light source including an LED element.

Subsequently, a configuration of the optical system housed in the case of the light source 13 will be explained in detail with reference to FIG. 29 in addition to FIG. 28. Since each of FIGS. 28 and 29 is a cross-sectional view, only one of a plurality of LED elements 201 configuring the light source is illustrated. In this optical system, the incident light is converted to substantially collimated light by a shape of a light receiving end surface 203a of the light guiding body 203. Therefore, the LED element 201 and the light receiver on the end surface of the light guiding body 203 are attached so as to keep a predetermined positional relation. Note that each light guiding body 203 is made of, for example, a light-transmittable resin such as acrylic resin. The LED light receiving surface of the end of the light guiding body 203 has, for example, a conically convex outer circumferential surface formed by rotation of a paraboloid cross section, its apex has a concave portion with a convex center (in other words, a convex lens surface) formed therein, and center of its plane portion has a convex lens surface (not illustrated) that protrudes outward (or may be a concave lens surface that is recessed inward). Note that the outer shape of the light receiver of the light guiding body 203 to which the LED element 201 is attached is the paraboloid shape forming the conically-shaped outer circumferential surface, and the reflection surface and the angle of the paraboloid surface are set so as to provide an angle allowing the light peripherally emitted from the LED element 201 to be totally reflected inside the light guiding body 203.

Meanwhile, the LED element 201 is arranged at each of predetermined positions on the surface of the LED board 202 that is its circuit board. The LED board 202 is arranged and fixed so that each LED element 201 on its surface is positioned at center of the concave portion to correspond to the LED collimator (light receiving end surface 203a).

In such a configuration, the light emitted from the LED element 201 can be extracted to be the substantially collimated light by the shape of the light receiving end surface 203a of the light guiding body 203, and the use efficiency of the generated light can be improved.

As described above, the light source 13 is configured so that the light source portion including the plurality of LED elements 201 that are the light source is attached to the light receiving end surface 203a that is the light receiver on the end surface of the light guiding body 203, and the diffuse luminous flux emitted from the LED elements 201 is formed to be the substantially collimated light by the lens shape of the light receiving end surface 203a on the end surface of the light guiding body, is guided into the light guiding body 203 as shown with the arrow, and is emitted by a luminous-flux direction converting means 204 toward the liquid crystal display panel 11 arranged in substantially parallel to the light guiding body 203. Since the distribution (in other words, density) of the luminous-flux direction converting means is optimized by a shape of the inside or the surface of the light guiding body, the equalization of the luminous flux entering the liquid crystal display panel 11 can be controlled. When the luminous-flux direction converting means 204 is configured so that the surface shape of the light guiding body 203 or the inside of the light guiding body is provided with, for example, portions having a different refractive index, the luminous flux propagating inside the light guiding body 203 is emitted toward the liquid crystal display panel 11 arranged in substantially parallel to the light guiding body 203. This case is practically acceptable if the relative luminance ratio is equal to or higher than 20% when the luminance is compared between the center of the screen and the peripheral portion of the screen in a state in which the liquid crystal display panel 11 normally faces the center of the screen while a point of view is placed at the same position as that of a diagonal dimension of the screen, and the relative luminance ratio that is higher than 30% is the further excellent property.

Note that each of FIGS. 28 and 29 is a cross-sectional layout diagram for explaining the configuration of the light source of the present embodiment and its function that performs the light polarization conversion in the light source 13 including the light guiding body 203 and the LED element 201. In FIG. 28, the light source 13 includes the light guiding body 203 including the luminous-flux direction converting means 204 being made of, for example, plastic or others on its surface or inside, the LED element 201 functioning as the light source, the reflection sheet 205, the reflection-type light polarizer 206, the lenticular lens and others. The liquid crystal display panel 11 including the light polarizer on the light-source light entering surface and the video-light emission surface is attached to the upper surface of the light source 13.

The light-source light entering surface (the lower surface) of the liquid crystal display panel 11 corresponding to the light source 13 is provided with a film-form or sheet-form reflection-type light polarizer 49. The reflection-type light polarizer 49 selectively reflects one polarized wave WAV2 (such as P wave) of the natural luminous flux 210 emitted from the LED element 201 to reflect it by the reflection sheet 205 on one surface (the lower side) of the light guiding body 203, and is guided toward the liquid crystal display panel 11 again. Accordingly, the $\lambda/4$ waveplate that is a retarder is arranged between the reflection sheet 205 and the light guiding body 203 or between the light guiding body 203 and the reflection-type light polarizer 49, and the reflection luminous flux is converted from the P-polarizing light to the S-polarizing light when transmitted through the $\lambda/4$ waveplate twice because of being reflected by the reflection sheet 205, and the use efficiency of the light-source light functioning as the video light is improved. The video luminous flux (shown with an arrow 213 in FIG. 28), the light intensity of which has been modulated in the liquid crystal display panel 11 in accordance with the image signal, enters the retroreflector 2, and is transmitted through the transparent member 105 after being reflected as shown in FIG. 2, and can provide the air floating video 3 that is the actual image outside.

The light source 13 of FIG. 29 similarly includes the light guiding body 203 including the luminous-flux direction converting means 204 made of, for example, plastic or others on its surface or inside, the LED element 201 functioning as the light source, the reflection sheet 205, the reflection-type light polarizer 206, the lenticular lens and others. Onto the upper surface of the light source 13, the liquid crystal display panel 11 including the light polarizer on the light-source light entering surface and the video-light emission surface is attached as the video display element.

The light-source light entering surface (the lower surface) of the liquid crystal display panel 11 corresponding to the light source 13 is provided with a film-form or sheet-form reflection-type light polarizer 49. One polarized wave WAV1 (such as S wave) of the natural luminous flux 210 emitted from the LED element 201 is selectively reflected by the reflection-type light polarizer 49, and is reflected by the reflection sheet 205 on one surface (the lower side) of the light guiding body 203, and is guided toward the liquid crystal display panel 11 again. The $\lambda/4$ waveplate is a retarder is arranged between the reflection sheet 205 and the light guiding body 203 or between the light guiding body 203 and the reflection-type light polarizer 49, and the reflection luminous flux is converted from the S-polarizing light to the P-polarizing light when one polarized wave of the natural luminous flux 210 emitted from the LED element 201 is transmitted through the $\lambda/4$ waveplate twice because of being reflected by the reflection sheet 205. In the manner, the use efficiency of the light-source light functioning as the video light is improved. The video luminous flux (shown with an arrow 214 in FIG. 29), the light intensity of which has been modulated in the liquid crystal display panel 11 in accordance with the video signal, enters the retroreflector 2, and is transmitted through the transparent member 105 after being reflected as shown in FIG. 2, and can provide the air floating video 3 that is the actual image outside.

In the light source 13 shown in FIGS. 28 and 29, since the one polarized wave component is reflected by the reflection-type light polarizer in addition to the function of the light polarizer arranged on the light entering surface of the corresponding liquid crystal display panel 11, a theoretical contrast ratio is calculated from multiplication of an inverse number of a cross transmittance of the reflection-type light polarizer and a cross transmittance caused by the two light polarizers attached to the liquid crystal display panel 11. Therefore, the high contrast performance is provided. Practically, from experiments, it has been verified that the contrast performance of the display image is improved by ten or more times. As a result, it can be verified that the video with the high quality being equivalent to that of a self-luminous-type organic EL is provided.

Second Structure Example of Display Apparatus

Figure 30:
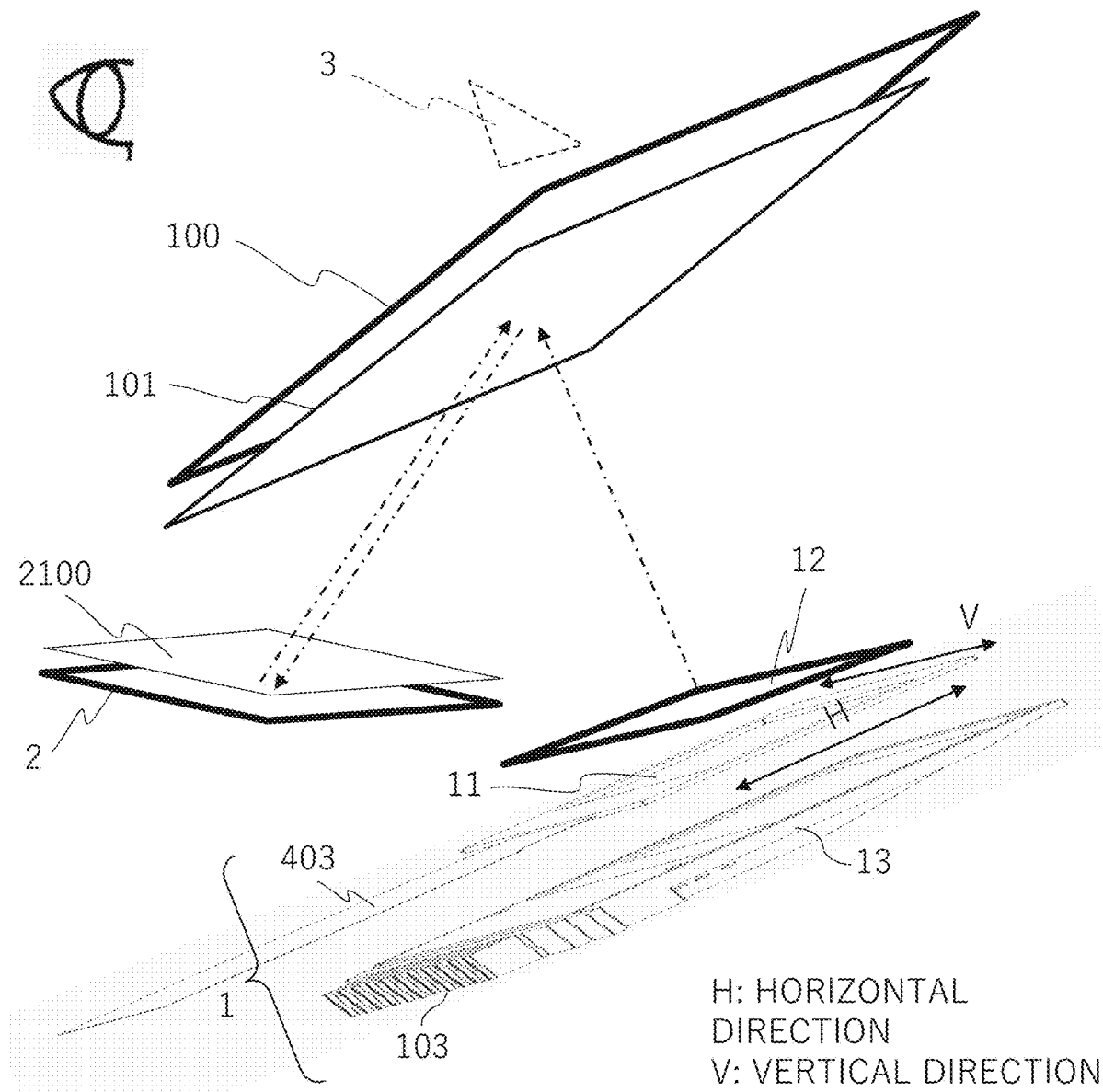
FIG. 30 is a diagram of arrangement showing a principal-part configuration of the air floating video display apparatus according to one embodiment.

FIG. 30 shows another example of the specific structure of the display apparatus 1. The light source 13 of FIG. 30 is similar to the light source of FIG. 29 or others. This light source 13 is configured so that an LED, a collimator, a composite/diffusion block, a light guiding body and others are housed in a case made of, for example, plastic or others. The liquid crystal display panel 11 is attached to an upper surface of the light source 13. An LED element as a semiconductor light source and an LED board on which a control circuit for the LED element is mounted are attached to one side surface of the case of the light source 13. A heat sink 103 that is a member for cooling the heat generated in the LED elements and the control circuit is attached to an outer surface of the LED board.

To a frame of the liquid crystal display panel 11 attached to the upper surface of the case, the liquid crystal display panel 11 attached to this frame, a FPC electrically connected to the liquid crystal display panel 11 and the like are attached. In other words, the liquid crystal display panel 11 that is a liquid crystal display element generates the display video in coordination with the LED element that is the solid light source by modulating the intensity of the transmission light, based on the control signal output from the control circuit configuring the electronic device.

Third Structure Example of Display Apparatus

Figure 31:
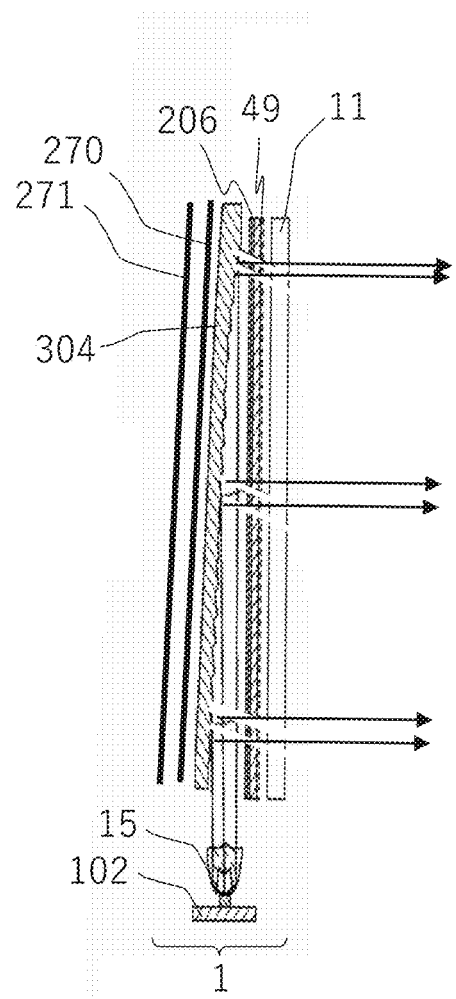
FIG. 31 is a cross-sectional view illustrating a configurational example of a video display apparatus in the air floating video display apparatus according to one embodiment.

Subsequently, still another example of the specific structure of the display apparatus 1 will be explained with reference to FIG. 31. In a light source of this display apparatus 1, the diffuse luminous flux of natural light (that is mixture of the P-polarized light and the S-polarized light) emitted from the LED (LED element of the LED board) is converted to the substantially collimated light by a LED collimator 15, and is reflected toward the liquid crystal display panel 11 by the reflection-type light guiding body 304. The reflection light enters the reflection-type light polarizer 49 and the waveplate arranged between the liquid crystal display panel 11 and the reflection-type light guiding body 304. The specific polarized wave (such as the S-polarized wave) is converted to the polarized wave (such as the P-polarized wave) to be transmitted through the reflection-type light polarizer 49 when being reflected by the reflection-type light polarizer 49, being converted in terms of phase by the waveplate, returning to the reflection surface and being transmitted through the waveplate again.

As a result, the natural light emitted from the LED is equalized to have the specific polarized wave (such as the P-polarized light), and the specific polarized wave enters the liquid crystal display panel 11, is modulated in terms of luminance in accordance with the video signal, and is displayed as the video on the panel surface. As similar to the above-described example, the structure of FIG. 31 includes a plurality of LEDs configuring the light source. However, FIG. 31 shows only single LED for a vertical cross-sectional view. Each of these LEDs is attached at a predetermined position to correspond to the LED collimator 15. Note that each LED collimator 15 is made of, for example, a light-transmittable resin such as acrylic resin or glass. The LED collimator 15 has, for example, a conically convex outer circumferential surface formed by rotation of a paraboloid cross section, and its apex has a concave portion with a convex center (in other words, a convex lens surface) formed therein. And, center of its plane portion has a convex lens surface that protrudes outward (or may be a concave lens surface that is recessed inward). Note that the paraboloid shape forming the conically-shaped outer circumferential surface of the LED collimator 15 is set within a range of an angle allowing the light peripherally emitted from the LED element to be totally reflected inside. Alternatively, the reflection surface is formed within the range of the angle allowing the light peripherally emitted from the LED to be totally reflected inside.

The above-described structure is the same structure as that of the light source 13 of the video display apparatus 1 shown in FIGS. 28 and 29 and others. Further, the light having been converted to the substantially collimated light by the LED collimator 15 shown in FIG. 31 is reflected by the reflection-type light guiding body 304, the specific polarized light is transmitted by the function of the reflection-type light polarizer 49, and other polarized light having been reflected is transmitted through the light guiding body 304 again, and is reflected by the reflection plate 271 arranged on the other surface of the light guiding body, the surface being in not contact with the liquid crystal display panel 11. In this case, this light is converted in terms of light polarization when being transmitted through the retarder (λ/4 waveplate) 270 twice, the waveplate being arranged between the reflection plate 271 and the liquid crystal display panel 11, is transmitted through the reflection-type light guiding body 304 again, is transmitted through the reflection-type light polarizer 49 arranged on the opposite surface, and is made to enter the liquid crystal display panel 11 while being equalized in terms of the light polarization direction. As a result, all the light components of the light source can be used, and therefore, the use efficiency of the light is significantly improved (for example, doubled).

Figure 38:
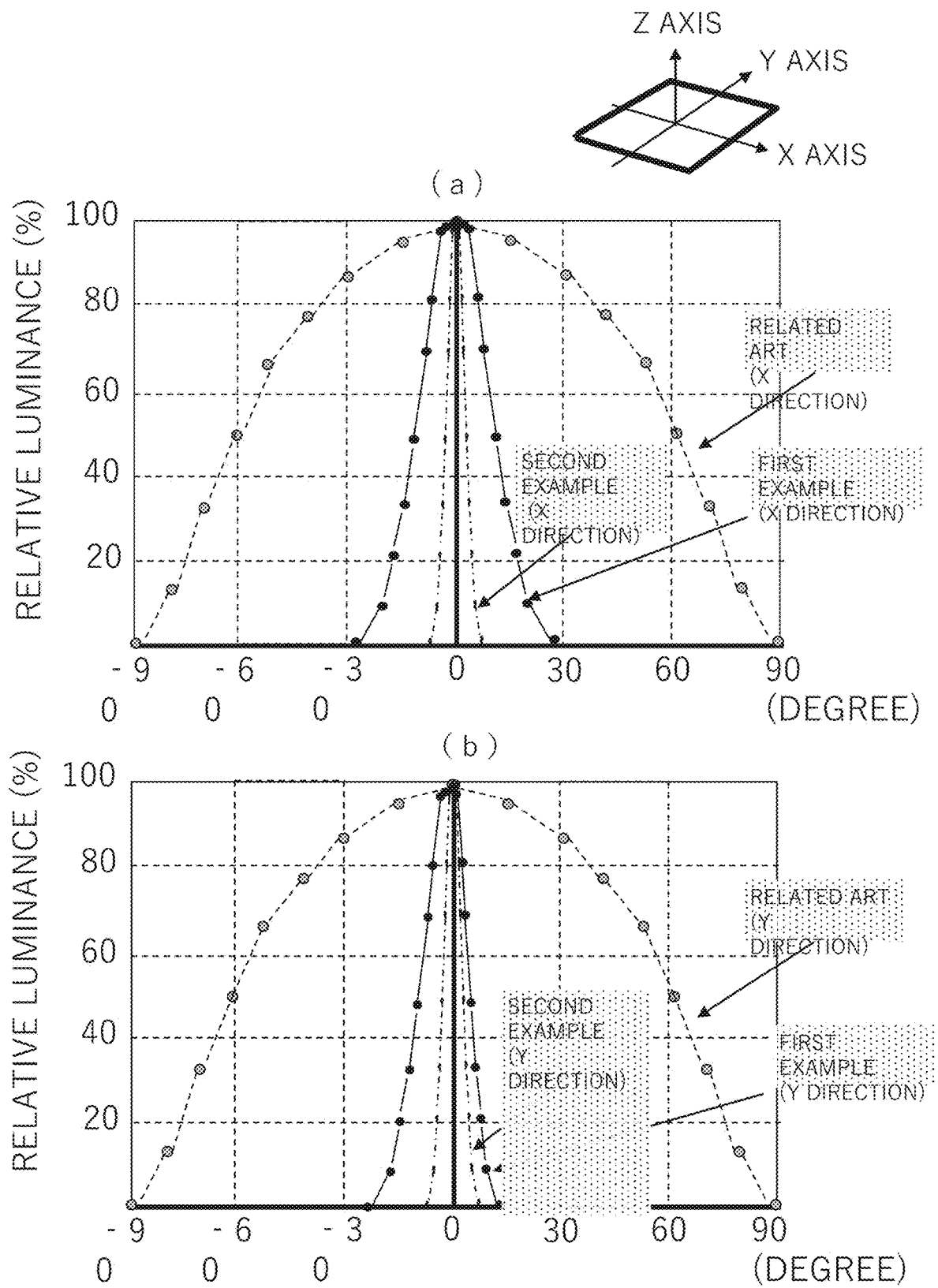
FIG. 38 is a descriptive diagram regarding diffuse property of the display apparatus in one embodiment.

In a related-art TV set, the light emitted from the liquid crystal display panel 11 has a diffuse property that is the same between a screen horizontal direction (illustrated with an X axis that is (a) of FIG. 38) and a screen vertical direction (illustrated with a Y axis that is (b) of FIG. 38). On the other hand, in the diffuse property of the luminous flux emitted from the liquid crystal display panel 11 of the present example, a viewing angle having a luminance that is 50% of a luminance of front view (angle of 0 degree) is set to 13 degrees that is about ⅕ of a related-art viewing angle that is 62 degrees as shown in the first example of FIG. 38. Similarly, a reflection angle of the reflection-type light guiding body, an area of the reflection surface and others are optimized so that the upper viewing angle is reduced to be about ⅓ of the lower viewing angle so that upper and lower viewing angles in the vertical direction are set to be unequal. As a result, light quantity of the video that propagates toward the viewing direction is significantly increased more than that of a related-art liquid crystal TV, and the luminance is equal to or higher than 50 times.

Further, in the case of the viewing-angle property described in the second example of FIG. 38, a viewing angle having a luminance that is 50% of a luminance of front view (angle of 0 degree) is set to 5 degrees that is about 1/12 of the related-art viewing angle that is 62 degrees. Similarly, the reflection angle of the reflection-type light guiding body, the area of the reflection surface and others are optimized so that the upper and lower viewing angles in the vertical direction are set to be unequal to be reduced to be about 1/12 of the related art. As a result, light quantity of the video that propagates toward the viewing direction is significantly increased more than that of a related-art liquid crystal TV, and the luminance is equal to or higher than 100 times.

When the viewing angle is set to the narrow angle as described above, the luminous flux quantity that propagates toward the viewing direction can be concentrated, and therefore, the light use efficiency is significantly improved. As a result, even in the use of the related-art liquid crystal display panel for TV, the significant improvement of the luminance can be achieved at the similar power consumption by the control for the light diffuse property of the light source. In this manner, a video display apparatus handling an information display system for bright outside can be achieved.

First Structure Example of Light Source

Figure 32:
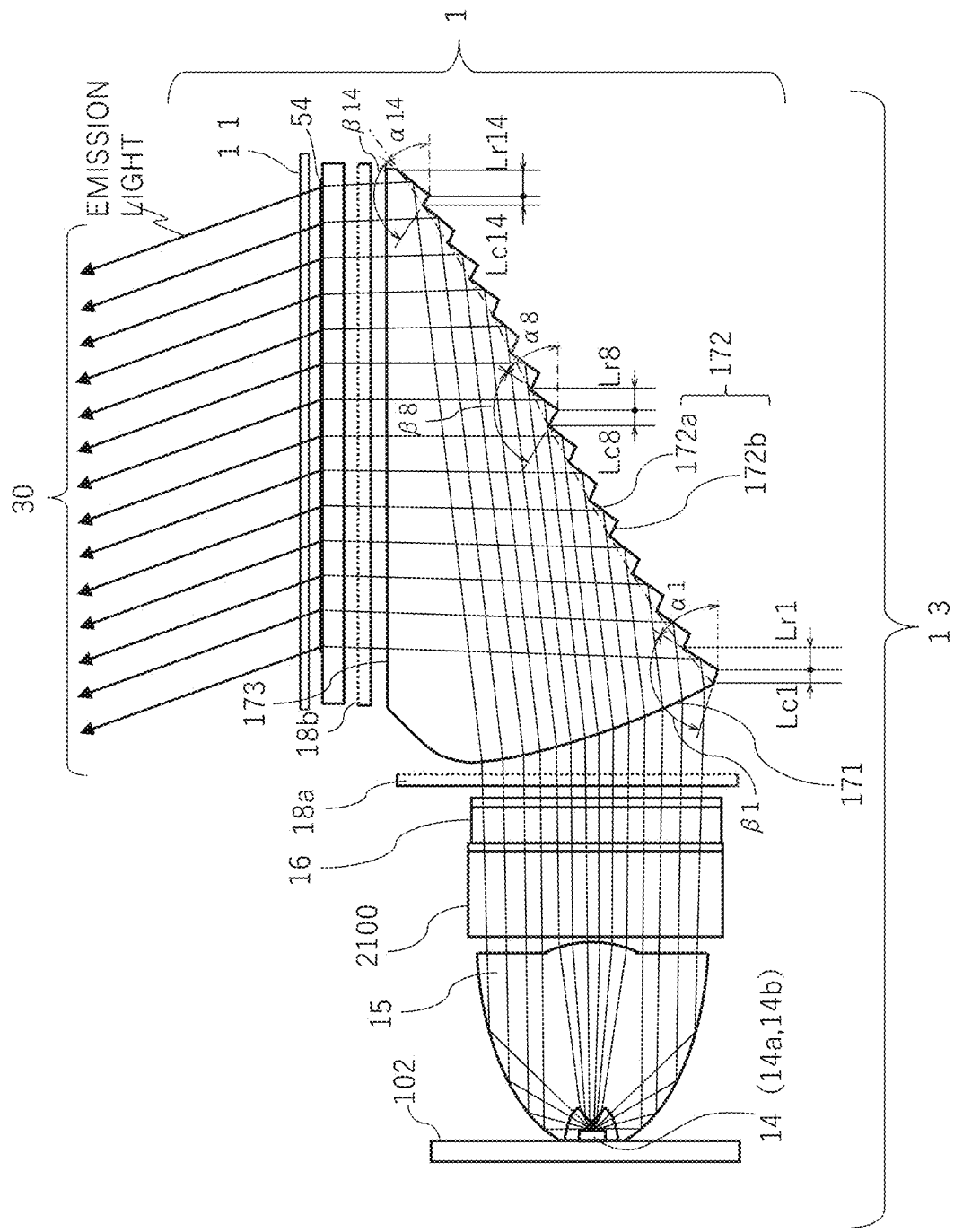
FIG. 32 is a cross-sectional view illustrating a configurational example of the light source in one embodiment.
Figure 33:
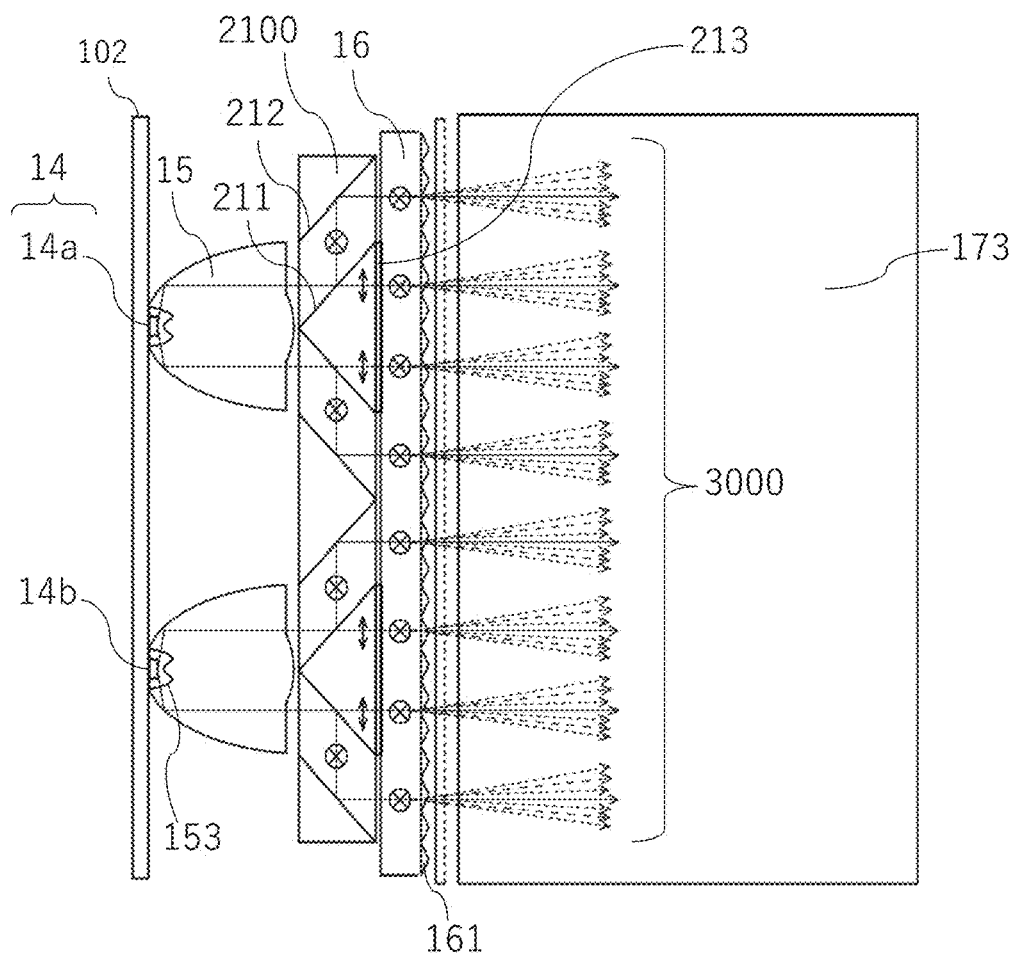
FIG. 33 is a cross-sectional view illustrating a configurational example of the light source in one embodiment.
Figure 34:
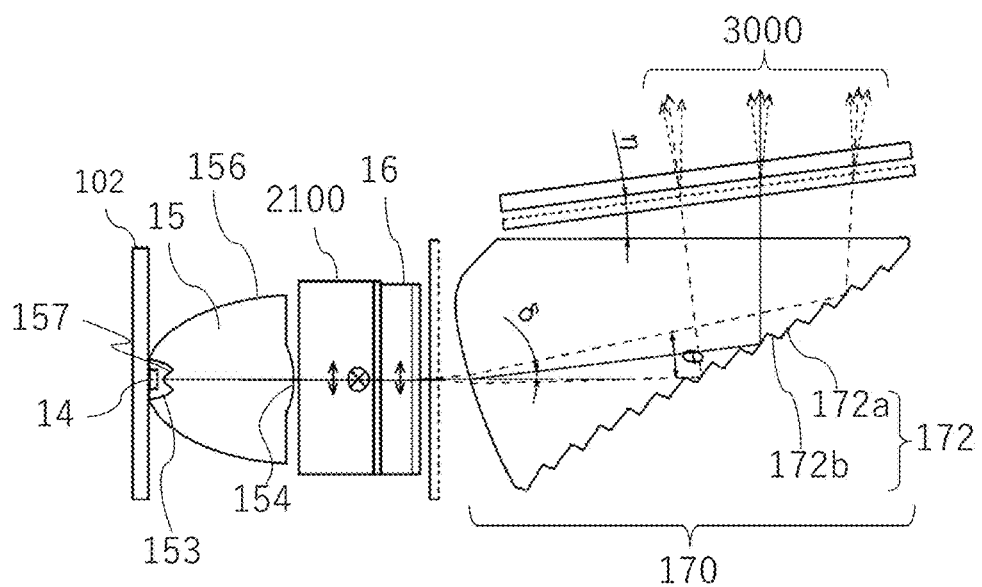
FIG. 34 is a cross-sectional view illustrating a configurational example of the light source in one embodiment.

Subsequently, an example of structure of the optical system such as the light source 13 housed in the case will be described in detail with reference to FIGS. 32, 33 and 34. LED elements 14 (14a and 14b) configuring the light source are illustrated in FIGS. 32 to 34, and are attached at predetermined positions to correspond to the collimator 15. Note that the LED collimator 15 is made of, for example, a light-transmittable resin such as acrylic resin. As shown in FIG. 34, the LED collimator 15 has a conically convex outer circumferential surface 156 formed by rotation of a paraboloid cross section, and its apex has a concave portion 153 with a convex center (in other words, a convex lens surface) 157 formed therein. Note that the paraboloid surface forming the conically-shaped outer circumferential surface 156 of the LED collimator 15 is set within a range of an angle allowing the light peripherally emitted from the LED element 14 to be totally reflected inside, or the reflection surface is formed within the range.

The LED elements 14 are arranged at predetermined positions, respectively, on the surface of the LED board 102 that is its circuit board. The LED board 102 is arranged and fixed so that the LED element 14 (14a and 14b) on the surface is positioned at center of the concave portion 153 to correspond to the LED collimator 15.

In such a configuration, among the light emitted from the LED element 14, particularly the light emitted upward (in the right direction) from its center is collected to form the substantially collimated light by the two convex lens surfaces 157 and 154 forming the outer shape of the LED collimator 15. The light peripherally emitted from other portions is reflected by the paraboloid surface forming the conically-shaped outer circumferential surface of the LED collimator 15, and is similarly collected to form the substantially collimated light. In other words, by the LED collimator 15 having the convex lens formed on its center and the paraboloid surface formed on the peripheral portion, almost all the light components generated by the LED element 14 can be extracted as the collimated light. In this manner, the use efficiency of the generated light can be improved.

Note that a light emission region of the LED collimator 15 is provided with the polarization converter element 2100. As clearly seen from FIG. 33, the polarization converter element 2100 is made of combination of a pillar-shaped light transmittable member having a parallelogram cross section (referred to as parallelogram pillar below) and a pillar-shaped light transmittable member having a triangle cross section (referred to as triangle pillar below), and a plurality of these elements are arranged in an array form in parallel to a surface orthogonal to an optical axis of the collimated light emitted from the LED collimator 15. Further, a polarization beam splitter (PBS film) 211 and a reflection film 212 are alternately arranged at a boundary between the adjacent light transmittable members that are arranged in the array form. The emission surface from which the light having entered the polarization converter element 2100 and been transmitted through the PBS film 211 is emitted includes a λ/2 waveplate 213.

The emission surface of the polarization converter element 2100 further includes the rectangular composite/diffusion block 16 as shown in FIG. 33. In other words, the light emitted from the LED element 14 is formed as the collimated light by the function of the LED collimator 15, enters the composite/diffusion block 16, and is diffused by a texture 161 on the emission side, and then, reaches the light guiding body 17.

The light guiding body 17 is a member made of a light transmittable resin such as acrylic resin and shaped in a bar having a substantially triangle cross section as shown in FIG. 34. As clearly seen from FIG. 32, the light guiding body 17 has a light-guiding-body light entrance portion (including a light-guiding-body entrance surface) 171 facing an emission surface of the composite/diffuse block 16 to interpose a first diffuse plate 18a therebetween, a light-guiding-body light reflection portion (including a light-guiding-body reflection surface) 172 forming an oblique surface, and a light-guiding-body light emission portion (including a light-guiding-body emission surface) 173 facing the liquid crystal display panel 11 that is the liquid crystal display component to interpose a second diffuse plate 18b therebetween.

Figure 36:
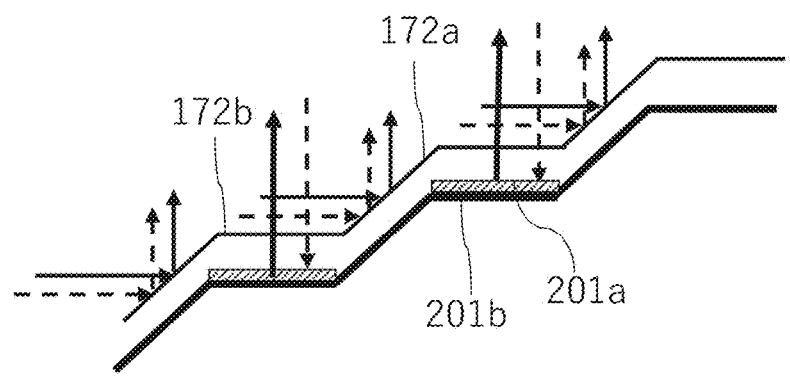
FIG. 36 is an enlarged cross-sectional view of a light guiding body in one embodiment.

As shown in FIG. 36 that is a partial enlarged view of the light-guiding-body light reflection portion (surface) 172 of the light guiding body 17, a lot of reflection surfaces 172a and joint surfaces 172b are alternately formed in a saw-teeth form on the light-guiding-body light reflection portion (surface) 172. And, an angle "αn" (n: a natural number of, for example, 1 to 130 in the present example) is formed by the reflection surface 172a (a right upward line component in the drawing) and a horizontal surface shown with a dashed dotted line in FIG. 32. As its one example, the angle "αn" is set to be equal to or smaller than 43 degrees (but equal to or larger than 0 degree) here.

The light-guiding-body light entrance portion (surface) 171 is formed to have a curved convex shape being oblique toward the light source. In this manner, the collimated light emitted from the light emission surface of the composite/diffuse block 16 is diffused and enters through the first diffuse plate 18a, reaches the light-guiding-body light reflection portion (surface) 172 while slightly bending (in other words, being polarized) upward by the light-guiding-body light entrance portion (surface) 171 as clearly seen from the drawing, is reflected by this light reflection portion, and reaches the liquid crystal display panel 11 arranged on the light emission surface on the upper side.

According to the display apparatus 1 descried in detail above, the light use efficiency and the equalized illumination property can be more improved, and the apparatus including the modularized light source for the S-polarized wave can be manufactured at a low cost to be downsized. In the above-described explanation, note that the polarization converter element 2100 is attached at a subsequent stage of the LED collimator 15. The present invention is not limited to this arrangement. Arrangement in a light path extending to the liquid crystal display panel 11 can also provide the same function and effect.

A lot of reflection surfaces 172a and joint surfaces 172b are alternately formed in the saw-teeth form on the light-guiding-body light reflection portion (surface) 172. The illumination luminous flux is totally reflected on each reflection surface 172a, and propagates upward, and besides, enters the light-direction converting panel 54 for controlling the directionality as the substantially collimated diffuse luminous flux by the narrow-angle diffuse plate arranged on the light-guiding-body light emission portion (surface) 173, and enters the liquid crystal display panel 11 in an oblique direction. In the present embodiment, the light-direction converting panel 54 is arranged between the light-guiding-body light emission portion 173 and the liquid crystal display panel 11. However, its arrangement on the emission surface of the liquid crystal display panel 11 can also provide the same effect.

Second Structure Example of Light Source

Figure 35:
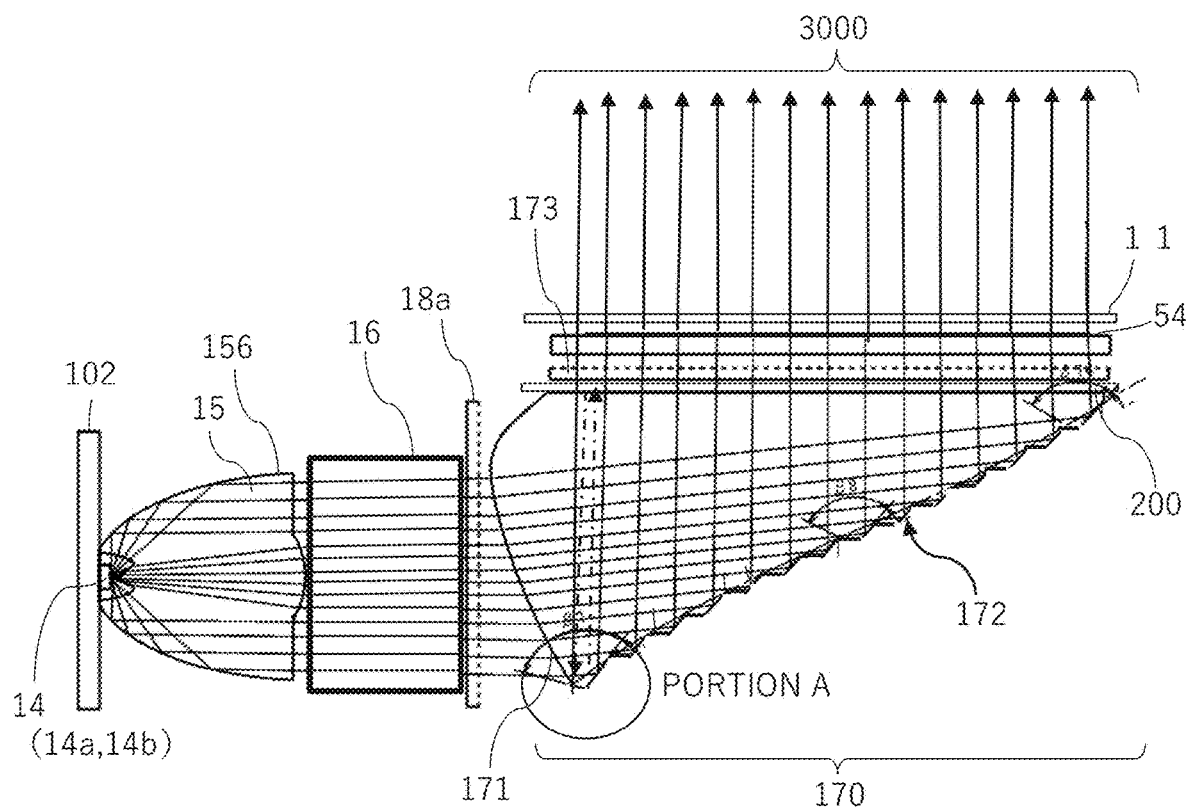
FIG. 35 is a cross-sectional view illustrating a configurational example of the light source in one embodiment.

Another example of structure of the optical system such as the light source 13 is shown in FIG. 35. As similar to the example shown in FIG. 33, a plurality of (in this example, two) LEDs 14 (14a and 14b) configuring the light source are illustrated in FIG. 35, and are attached at predetermined positions to correspond to the LED collimator 15. Note that the LED collimator 15 is made of, for example, a light-transmittable resin such as acrylic resin. As similar to the example shown in FIG. 33, the LED collimator 15 has a conically convex outer circumferential surface 156 formed by rotation of a paraboloid cross section, and its apex has a concave portion 153 with a convex center (in other words, a convex lens surface) 157 formed therein. Note that the paraboloid surface forming the conically-shaped outer circumferential surface 156 of the LED collimator 15 is set within a range of an angle allowing the light peripherally emitted from the LED element 14a to be totally reflected inside, or the reflection surface is formed within the range.

The LED elements 14 (14a and 14b) are arranged at predetermined positions, respectively, on the surface of the LED board 102 that is its circuit board. The LED board 102 is arranged and fixed so that each of the LED elements 14 on the surface is positioned at center of the concave portion 153 to correspond to the LED collimator 15.

In such a configuration, among the light emitted from the LED element 14, particularly the light emitted upward (in the right direction) from its center is collected by the two convex lens surfaces 157 and 154 forming the outer shape of the LED collimator 15 to form the collimated light. The light peripherally emitted from other portions is reflected by the paraboloid surface forming the conically-shaped outer circumferential surface of the LED collimator 15, and is similarly collected to form the collimated light. In other words, by the LED collimator 15 having the convex lens formed on its center and the paraboloid surface formed on the peripheral portion, almost all the light components generated by the LED element 14 can be extracted as the collimated light. In the manner, the use efficiency of the generated light can be improved.

Note that a light emission region of the LED collimator 15 is provided with the light guiding body 170 to interpose the first diffuse plate 18a therebetween. The light guiding body 170 is a member made of a light transmittable resin such as acrylic resin and shaped in a bar having a substantially triangle cross section as shown in FIG. 35. As clearly seen from FIG. 35, the light guiding body 170 has a light-guiding-body light entrance portion 171 which faces an emission surface of the diffuse block 16 to interpose the first diffuse plate 18a therebetween and which is an entrance portion of the light guiding body 17, a light-guiding-body light reflection portion 172 forming an oblique surface, and a light-guiding-body light emission portion 173 which faces the liquid crystal display panel 11 to interpose a reflection-type light polarizer 200 therebetween.

For example, if a member having a property reflecting the P-polarized light but transmitting the S-polarized light is adopted as the reflection-type light polarizer 200, the P-polarized light of the natural light emitted from the LED that is the light source is converted to the S-polarized light when being reflected by the reflection-type light polarizer 200, being transmitted through the λ/4 waveplate 201a arranged on the light-guiding-body light reflection portion 172 shown in FIG. 34, being reflected by the reflecting surface 201b, and being transmitted through the λ/4 waveplate 201a again. In this manner, all the luminous fluxes entering the liquid crystal display panel 11 are equalized to the S-polarized light.

Similarly, if a member having a property reflecting the S-polarized light but transmitting the P-polarized light is adopted as the reflection-type light polarizer 200, the S-polarized light of the natural light emitted from the LED that is the light source is converted to the P-polarized light when being reflected by the reflection-type light polarizer 200, being transmitted through the λ/4 waveplate 201a arranged on the light-guiding-body light reflection portion 172 shown in FIG. 34, being reflected by the reflecting surface 201b, and being transmitted through the λ/4 waveplate 201a again. In the manner, all the luminous fluxes entering a liquid crystal display panel 52 are equalized to the P-polarized light. Even by the above-described structure, the light-polarization conversion is achieved.

Third Structure Example of Light Source

Another example of structure of the optical system such as the light source 13 will be explained with reference to FIG. 31. In the present example, as shown in FIG. 31, the diffuse luminous flux of natural light (that is mixture of the P-polarized light and the S-polarized light) emitted from the LED of the LED board 102 is converted to the substantially collimated light by the LED collimator 15, and is reflected by the reflection-type light guiding body 304 toward the liquid crystal display panel 11. The reflection light enters the reflection-type light polarizer 206 arranged between the liquid crystal display panel 11 and the reflection-type light guiding body 304. The specific polarized wave (such as the S-polarized wave) is converted in terms of light polarization when being reflected by the reflection-type light polarizer 206, being transmitted through a surface connecting the reflection surface of the reflection-type light guiding body 304, and being reflected by the reflection plate 271 facing the opposite surface of the reflection-type light guiding body 304 to be transmitted through the waveplate (λ/4 waveplate) 270 twice, and then, is transmitted through the light guiding body and the reflection-type light polarizer, and enters the liquid crystal display panel 11, and is modulated into the video light. By the combination use of the specific polarized wave and the polarization-converted polarized wave plane, the light use efficiency is doubled compared to the general one, and a polarization degree (extinction ratio) of the reflection-type light polarizer is also included in an extinction ratio of the entire system. Therefore, when the light source 13 of the present embodiment is used, the contrast ratio of the information display system can be significantly improved.

As a result, the natural light emitted from the LED is equalized to have the specific polarized wave (such as the P-polarized wave). As similar to the above-described example, a plurality of LEDs (although FIG. 31 shows only single LED for a vertical cross-sectional view) configuring the light source are provided, and are attached at predetermined respective positions to correspond to the LED collimators 15. Note that the LED collimator 15 is made of, for example, a light-transmittable resin such as acrylic resin or glass. The LED collimator 15 has, for example, a conically convex outer circumferential surface formed by rotation of a paraboloid cross section, and its apex has a concave portion with a convex center (in other words, a convex lens surface) formed therein. And, center of its plane portion has a convex lens surface that protrudes outward (or may be a concave lens surface that is recessed inward). Note that the paraboloid shape forming the conically-shaped outer circumferential surface of the LED collimator 15 is set within a range of an angle allowing the light peripherally emitted from the LED element to be totally reflected inside. Alternatively, the reflection surface is formed within the range.

The LEDs are arranged at predetermined positions, respectively, on the surface of the LED board 102 that is its circuit board. The LED board 102 is arranged and fixed so that the LED on the surface is positioned at center of the concave portion to correspond to the collimator 15.

In such a configuration, among the light emitted from the LED, particularly the light emitted from its center is collected by the two convex lens surfaces forming the outer shape of the LED collimator 15 to form the collimated light. The light peripherally emitted from other portions is reflected by the paraboloid surface forming the conically-shaped outer circumferential surface of the LED collimator 15, and is similarly collected to form the collimated light. In other words, by the LED collimator 15 having the convex lens formed on its center and the paraboloid surface formed on the peripheral portion, almost all the light components generated by the LED can be extracted as the collimated light. In this manner, the use efficiency of the generated light can be improved.

Fourth Structure Example of Light Source

Figure 39:
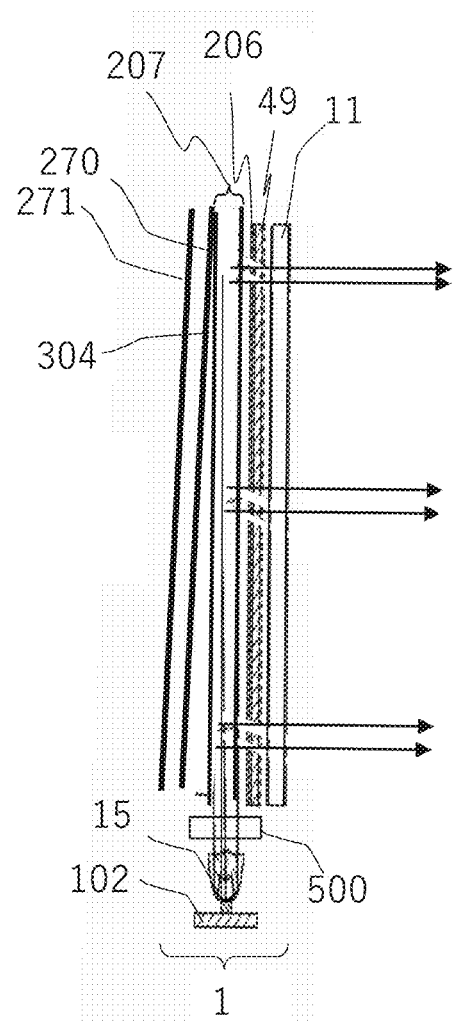
FIG. 39 is a cross-sectional view illustrating a configurational example of the display apparatus in one embodiment.

Further, another example of structure of the optical system such as the light source 13 will be explained with reference to FIG. 39. In the configuration of FIG. 39, two optical sheets (in other words, diffuse sheets) 207 that convert the diffuse properties in the vertical direction and the horizontal direction in the drawing are used for the light emission region of the LED collimator 15, and the light emitted from the LED collimator 15 is caused to enter a gap between the two optical sheets 207. When the optical sheet 207 is made of one sheet, the diffuse properties in the vertical direction and the horizontal direction are controlled by fine shapes of its front and back surfaces. Alternatively, a plurality of diffuse sheets may be used so that the diffuse sheets separately play roles of the functions, respectively. By the front and back surface shapes of the optical sheet 207, the diffuse angle of the light in the screen vertical direction emitted from the LED collimator 15 is matched with the width of the vertical surface of the reflection surface of the diffuse sheet. While taking the number of LEDs and the diffuse angle from the optical element 500 as design parameters, the horizontal direction may be optimally designed so that the surface density of the luminous flux emitted from the liquid crystal display panel 11 is equalized. In other words, the diffuse properties in the present structure are controlled by the surface shapes of the plurality of diffuse sheets in place of the light guiding body. In the present embodiment, the light polarization is converted by the same method as that of the third structure example of the light source. On the other hand, the light polarization may be first converted by the polarization converter element 2100 (FIG. 30) arranged between the LED collimator 15 and the optical sheet 207, and then, the light-source light may be caused to enter the optical sheet 207.

When the reflection-type light polarizer 206 having the property reflecting the S-polarized wave but transmitting the P-polarized wave is adopted, the S-polarized light of the natural light emitted from the LED that is the light source is converted to the P-polarized wave when being reflected, being transmitted through the waveplate 270 shown in FIG. 39, being reflected by the reflection plate 271, and being transmitted through the waveplate 270 again, and then, the light enters the liquid crystal display panel 11. An optimal value of a thickness of this waveplate is required to be adopted based on an incident angle of the light beam on the waveplate, and the optimal value is in a range of λ/16 to λ/4.

In the foregoing, various embodiments have been concretely described. The present invention is not limited to the foregoing embodiments, and includes various modification examples. In the above-described embodiments, the entire system and so forth have been explained in detail for easily understanding the present invention. However, the above-described embodiments do not always include all components explained above. The components of each embodiment except for the essential components can be added/eliminated/replaced. The number of each component may be single or plural when being not particularly limited.

In the technique according to the present embodiments, the air floating video is displayed in a state where the high-resolution and high-luminance video information is floated in air, and, as a result, for example, the user can perform operations without concern about contact infection in illness. When the technique according to the present embodiments is applied to the system that is used by unspecified users, a non-contact user interface having the less risk of the contact infection in illness and being available without the concern can be provided. The technique contributes to "the third goal: Good Health and Well-being (for all people)" of the sustainable development goals (SDGs) advocated by the United Nations. And, since only the normal reflection light is efficiently reflected with respect to the retroreflector by the technique according to the present embodiment of making the diffuse angle of the emitted video light small and equalizing the specific polarized wave, the light use efficiency is high, and the bright and clear air floating video can be provided. The technique according to the present embodiment can provide a non-contact user interface being excellent in availability and capable of significantly reducing the power consumption. The technique contributes to "the ninth goal: Industry, Innovation and Infrastructure" and "the eleventh goal: Sustainable Cities and Communities" of the sustainable development goals (SDGs) advocated by the United Nations. Further, the technique according to the present embodiment can form the air floating video based on the video light having the high directionality (rectilinear propagation). In the technique according to the present embodiment, even in case of display of the video that requires the high security in an ATM at bank, a ticketing machine at station and so forth or the video that needs high security in an ATM at bank or a ticketing machine at station and so forth or display of the video having high confidentiality that needs to be confidential to a person who faces the user, the technique can provide a non-contact user interface having the less risk of the peek of the air floating video by the different person from the user. The technique contributes to "the eleventh goal: Sustainable Cities and Communities" of the sustainable development goals (SDGs) advocated by the United Nations.

EXPLANATION OF REFERENCE CHARACTERS

1 . . . display apparatus (video display apparatus), 2 . . . retroreflector, 3 . . . air floating video, 4 . . . sensor (aerial operation detection sensor), 5 . . . camera, 6 . . . fingertip tactile sense generation portion, 10 . . . controller, 11 . . . liquid crystal display panel, 12 . . . absorption-type light polarizer, 13 . . . light source, 50 . . . housing, 61 . . . ultrasonic element array, 62 . . . ultrasonic signal generation circuit, 100 . . . transparent member, 101 . . . polarization splitter, 1000 . . . air floating video display apparatus, U . . . user, Uf . . . fingertip

The invention claimed is:

1. An air floating video display apparatus configured to form an air floating video, comprising:
   a display apparatus configured to display video;
   a retroreflector configured to retroreflect video light emitted from the display apparatus;
   the air floating video being formed based on reflection light reflected from the retroreflector,
   a sensor configured to detect a state of operation including a position of a hand finger of a user or a substance held by the user with respect to a space region including a plane of the air floating video or an object displayed on the plane;
   a tactile sense generator configured to generate texture of a sense of touch on the hand finger or the substance held by the user by forming, based on information detected by the sensor, sound pressure based on an ultrasonic wave in vicinity of the position of the hand finger or the substance held by the user; and
   a super-directive loudspeaker configured to output super-directive audio toward vicinity of a face of the user, wherein
   when audio of a type requiring high confidentiality is output, a position of the face of the user is detected based on an image of the user captured by an image-capturing apparatus, and super-directive audio is output toward the vicinity of the face of the user by the super-directive loudspeaker, and
   when audio of a type not requiring the high confidentiality is output, the audio is output by the tactile sense generator from the vicinity of the position of the hand finger of the user or the substance held by the user.

2. The air floating video display apparatus according to claim 1,
   wherein the tactile sense generator modulates a signal of the ultrasonic wave with an audio signal to produce audio from the vicinity of the position of the hand finger or the substance held by the user.

3. The air floating video display apparatus according to claim 1,
   wherein the tactile sense generator has
   an ultrasonic element array with a plurality of ultrasonic elements arranged thereon, and
   an ultrasonic signal generation circuit configured to generate an ultrasonic driving signal to be input to each of the ultrasonic elements of the ultrasonic element array based on the information detected by the sensor, and
   the ultrasonic signal generation circuit generates, for each of the ultrasonic elements, the ultrasonic driving signal so as to provide one ultrasonic signal selected from ultrasonic signals having phases of a plurality of different types.

4. The air floating video display apparatus according to claim 1,
   wherein, as the object, an object which accepts touch operation with the hand finger or the substance held by the user is provided, and
   sound pressure based on the ultrasonic wave is formed on the plane of the air floating video in vicinity of the hand finger or the touch position of the substance held by the user.

5. The air floating video display apparatus according to claim 3 comprising:
   a housing configured to house the display apparatus and the retroreflector; and a transparent member provided to part of the housing and configured to transmit the reflection light reflected from the retroreflector,
wherein the ultrasonic element array is arranged at a position outside the transparent member so as to form a path in which the ultrasonic wave emitted from the ultrasonic element array is reflected by the transparent member and is then applied from a back side of the plane of the air floating video.

6. The air floating video display apparatus according to claim 3 comprising:
a housing configured to house the display apparatus and the retroreflector; and
a transparent member provided to part of the housing and configured to transmit the reflection light reflected from the retroreflector,
wherein the ultrasonic element array is arranged at a position outside the transparent member so as to form a path in which the ultrasonic wave emitted from the ultrasonic element array is not reflected by the transparent member but is applied from a back side of the plane of the air floating video.

7. The air floating video display apparatus according to claim 2,
wherein the modulation is amplification modulation.

8. The air floating video display apparatus according to claim 2,
wherein the audio signal is an audio signal of predetermined audio associated with the plane of the air floating video or the object, or operation on the plane or the object.

9. The air floating video display apparatus according to claim 1,
wherein the texture of the sense of touch is generated on the hand finger of the user or the substance held by the user by the tactile sense generator.

10. The air floating video display apparatus according to claim 1,
wherein the display apparatus includes:
a liquid-crystal display panel configured to display the video; and
a light source configured to supply light in a specific polarizing direction to the liquid-crystal display panel,
the retroreflector retroreflects a video luminous flux having a narrow diffuse angle as video light emitted from the liquid-crystal display panel, and
the apparatus includes a light-blocking member arranged in space on an optical path connecting the liquid-crystal display panel and the retroreflector to block video light having a diffuse angle exceeding a specific angle from the liquid-crystal display panel from entering the retroreflector.

11. A method of forming an air floating video, the method comprising:
detecting a state of operation including a position of a hand finger of a user or a substance held by the user with respect to a space region including a plane of an air floating video or an object displayed on the plane;
detecting an ultrasonic wave in vicinity of the position of the hand finger or the substance held by the user;
generating texture of a sense of touch on the hand finger or the substance held by the user by forming sound pressure based on the ultrasonic wave in vicinity of the position of the hand finger or the substance held by the user; and
controlling output of audio including determining whether audio to be output requires high confidentiality, wherein
in response to the audio requiring high confidentiality, detecting a position of a face of the user based on an image of the user captured by an image-capturing apparatus, and outputting audio toward the vicinity of the face of the user, and
in response to the audio not requiring high confidentiality, outputting the audio to the vicinity of the position of the hand finger of the user or the substance held by the user.

12. The method according to claim 11, wherein generating texture includes modulating a signal of the ultrasonic wave with an audio signal to produce audio from the vicinity of the position of the hand finger or the substance held by the user.

13. The method according to claim 11, wherein outputting audio toward the vicinity of the face of the user includes using a super-directive loudspeaker.

14. The method according to claim 13, wherein outputting audio toward the vicinity of the finger of the user includes using a different loudspeaker than the super-directive loudspeaker.

15. A non-transitory computer readable storage device having computer readable instructions that when executed by circuitry cause the circuitry to:
detect a state of operation including a position of a hand finger of a user or a substance held by the user with respect to a space region including a plane of an air floating video or an object displayed on the plane;
detect an ultrasonic wave in vicinity of the position of the hand finger or the substance held by the user;
generate texture of a sense of touch on the hand finger or the substance held by the user by forming sound pressure based on the ultrasonic wave in vicinity of the position of the hand finger or the substance held by the user; and
control output of audio including determining whether audio to be output requires high confidentiality, wherein
in response to the audio requiring high confidentiality, detect a position of a face of the user based on an image of the user captured by an image-capturing apparatus, and output audio toward the vicinity of the face of the user using a super-directive loudspeaker, and
in response to the audio not requiring high confidentiality, output the audio from the vicinity of the position of the hand finger of the user or the substance held by the user.

16. The non-transitory computer readable storage device according to claim 15, wherein the circuitry is caused to generate texture by modulating a signal of the ultrasonic wave with an audio signal to produce audio from the vicinity of the position of the hand finger or the substance held by the user.

17. The non-transitory computer readable storage device according to claim 15, wherein the circuitry is caused to output audio toward the vicinity of the face of the user using a super-directive loudspeaker.

18. The non-transitory computer readable storage device according to claim 17, wherein the circuitry is caused to output audio toward the vicinity of the finger of the user includes using a different loudspeaker than the super-directive loudspeaker.

* * * * *